(12) United States Patent
Burkhard et al.

(10) Patent No.: US 10,558,201 B2
(45) Date of Patent: Feb. 11, 2020

(54) SYSTEM AND METHOD FOR PRODUCING PRODUCTS BASED UPON DEMAND

(71) Applicant: The Procter & Gamble Company, Cincinnati, OH (US)

(72) Inventors: Ryan Andrew Burkhard, West Chester, OH (US); Nathan E Moore, Montgomery, OH (US); Elizabeth Marie Fikes, Cincinnati, OH (US); Daniel Richard Royce, Blue Ash, OH (US); Kyle Christopher Ballman, West Chester, OH (US); Julie Elizabeth Tysen, Loveland, OH (US)

(73) Assignee: The Procter & Gamble Company, Cincinnati, OH (US)

(*) Notice: Subject to any disclaimer, the term of this patent is extended or adjusted under 35 U.S.C. 154(b) by 8 days.

(21) Appl. No.: 15/698,677

(22) Filed: Sep. 8, 2017

(65) Prior Publication Data
US 2018/0074478 A1 Mar. 15, 2018

Related U.S. Application Data

(60) Provisional application No. 62/385,314, filed on Sep. 9, 2016.

(51) Int. Cl.
*G05B 19/418* (2006.01)
*G06Q 50/04* (2012.01)
*G06Q 10/06* (2012.01)

(52) U.S. Cl.
CPC . *G05B 19/41805* (2013.01); *G06Q 10/06315* (2013.01); *G06Q 50/04* (2013.01); *G05B 2219/33064* (2013.01)

(58) Field of Classification Search
CPC .......... G05B 19/41805; G05B 19/4189; G05B 19/41865; G05B 19/418; G05B 2219/33064; G06Q 10/06315; G06Q 50/04

See application file for complete search history.

(56) References Cited

U.S. PATENT DOCUMENTS

| 3,403,634 A | 10/1968 | Crowder |
| 3,601,246 A | 8/1971 | Dubois |

(Continued)

FOREIGN PATENT DOCUMENTS

| CN | 201080430 U | 7/2008 |
| DE | 19546870 A1 | 6/1996 |

(Continued)

OTHER PUBLICATIONS

Website, Siemens, Overview, "What makes mass production so flexible that it can meet individual demands?" http://www.siemens.com/ingenuity-for-life/en/optima/.

(Continued)

*Primary Examiner* — Charles R Kasenge
(74) *Attorney, Agent, or Firm* — Andres E. Velarde; Jeffrey V. Bamber

(57) ABSTRACT

A system and method for producing products based upon demand are disclosed. In some cases, the products include containers and the contents therein. The containers are disposed on vehicles and are independently routable along a track system and are deliverable to at least one unit operation station. A control system: receives demand for finished products; determines a route for vehicles based upon the status of one or more unit operation stations; and causes a vehicle to progress along a determined route to create one or more of the demanded finished products. The system may be used to produce the same fluent products, different fluent (Continued)

products, and other types of products including assembled products.

47 Claims, 18 Drawing Sheets

(56) References Cited

U.S. PATENT DOCUMENTS

| | | |
|---|---|---|
| 3,687,082 A | 8/1972 | Burke, Jr. |
| 3,796,163 A | 3/1974 | Meyer et al. |
| 3,878,821 A | 4/1975 | White |
| 4,511,025 A | 4/1985 | Nakayama |
| 4,805,761 A | 2/1989 | Totsch |
| 4,841,869 A | 6/1989 | Takeuchi |
| 5,023,495 A | 6/1991 | Miyao |
| 5,208,762 A | 5/1993 | Charhut et al. |
| 5,233,534 A | 8/1993 | Osthus et al. |
| 5,237,510 A | 8/1993 | Kakizawa et al. |
| 5,251,741 A | 10/1993 | Morishita et al. |
| 5,555,504 A | 9/1996 | Lepper et al. |
| 5,607,045 A | 3/1997 | Hermann Kronseder |
| 5,713,180 A | 2/1998 | Lewis |
| 5,797,330 A | 8/1998 | Li |
| 5,803,797 A | 9/1998 | Piper |
| 5,869,139 A | 2/1999 | Biggs et al. |
| 6,011,508 A | 1/2000 | Perrault et al. |
| 6,101,952 A | 8/2000 | Thornton et al. |
| 6,104,966 A | 8/2000 | Haagensen |
| 6,191,507 B1 | 2/2001 | Peltier et al. |
| 6,240,335 B1 | 5/2001 | Wehrung et al. |
| 6,317,648 B1 | 11/2001 | Sleep et al. |
| 6,354,781 B1 | 3/2002 | Pan |
| 6,499,701 B1 | 12/2002 | Thornton et al. |
| 6,522,945 B2 | 2/2003 | Sleep et al. |
| 6,571,934 B1 | 6/2003 | Thompson et al. |
| 6,578,495 B1 | 6/2003 | Yitts et al. |
| 6,581,650 B2 | 6/2003 | Parks et al. |
| 6,591,756 B2 | 7/2003 | Mayer et al. |
| 6,625,517 B1 | 9/2003 | Bogdanov et al. |
| 6,781,524 B1 | 8/2004 | Clark et al. |
| 6,876,107 B2 | 4/2005 | Jacobs |
| 6,876,869 B1 | 4/2005 | Fujii |
| 6,917,136 B2 | 7/2005 | Thornton et al. |
| 6,983,701 B2 | 1/2006 | Thornton et al. |
| 7,011,728 B2 | 3/2006 | Dewig et al. |
| 7,103,450 B2 | 9/2006 | Kubiak et al. |
| 7,110,861 B2 | 9/2006 | Nelson et al. |
| 7,134,258 B2 | 11/2006 | Kalany et al. |
| 7,204,192 B2 | 4/2007 | Lamb et al. |
| 7,248,938 B2 | 7/2007 | Sclafani et al. |
| 7,264,426 B2 | 9/2007 | Buttrick, Jr. et al. |
| 7,430,838 B2 | 10/2008 | McErlean et al. |
| 7,448,327 B2 | 11/2008 | Thornton et al. |
| 7,456,593 B1 | 11/2008 | Floresta et al. |
| 7,458,454 B2 | 12/2008 | Mendenhall |
| 7,478,749 B2 | 1/2009 | Clothier et al. |
| 7,538,469 B2 | 5/2009 | Thornton et al. |
| 7,555,875 B2 | 7/2009 | Kim |
| 7,654,203 B2 | 2/2010 | Roop et al. |
| 7,668,618 B2 | 2/2010 | McErlean et al. |
| 7,761,180 B2 | 7/2010 | Scalfani et al. |
| 7,885,821 B2 | 2/2011 | Tait |
| 7,912,574 B2 | 3/2011 | Wurman et al. |
| 7,926,644 B2 | 4/2011 | Mendenhall |
| 7,954,712 B2 | 6/2011 | Babcock et al. |
| 7,988,398 B2 | 8/2011 | Hofmeister |
| RE42,937 E | 11/2011 | Lasher et al. |
| 8,074,578 B2 | 12/2011 | Thornton |
| 8,087,579 B2 | 1/2012 | Leu et al. |
| 8,096,409 B2 | 1/2012 | Wipf et al. |
| 8,109,066 B2 | 2/2012 | Leu et al. |
| 8,204,621 B2 | 6/2012 | Imai et al. |
| 8,271,139 B2 | 9/2012 | Bellafiore et al. |
| 8,281,888 B2 | 10/2012 | Bergmann |
| 8,308,418 B2 | 11/2012 | Ma et al. |
| 8,336,700 B2 | 12/2012 | Warecki et al. |
| 8,453,821 B2 | 6/2013 | Hutter et al. |
| 8,474,603 B2 | 7/2013 | Warecki et al. |
| 8,483,869 B2 | 7/2013 | Wurman et al. |
| 8,511,555 B2 | 8/2013 | Babcock et al. |
| 8,591,779 B2 | 11/2013 | Senn et al. |
| 8,609,371 B2 | 12/2013 | Julien et al. |
| 8,616,134 B2 | 12/2013 | King et al. |
| 8,627,639 B2 | 1/2014 | Ali et al. |
| 8,684,652 B2 | 4/2014 | Byrne et al. |
| 8,738,804 B2 | 5/2014 | Childress et al. |
| 8,763,792 B2 | 7/2014 | Iwasaki et al. |
| 8,776,985 B2 | 7/2014 | Huettner et al. |
| 8,805,574 B2 | 8/2014 | Stevens et al. |
| 8,807,330 B2 | 8/2014 | Kraus |
| 8,813,951 B2 | 8/2014 | Forsthoevel et al. |
| 8,863,669 B2 | 10/2014 | Young et al. |
| 8,875,865 B2 | 11/2014 | Terzini |
| 8,966,864 B2 | 3/2015 | Rabec |
| 8,967,051 B2 | 3/2015 | King et al. |
| 8,972,037 B2 | 3/2015 | Scalfani et al. |
| 9,032,880 B2 | 5/2015 | King et al. |
| 9,045,183 B2 | 6/2015 | Laurence et al. |
| 9,045,291 B2 | 6/2015 | Konrad et al. |
| 9,046,890 B2 | 6/2015 | Krause et al. |
| 9,122,566 B2 | 9/2015 | Bastian, II et al. |
| 9,132,873 B1 | 9/2015 | Laurence et al. |
| 9,139,377 B2 | 9/2015 | Assante et al. |
| 9,150,366 B2 | 10/2015 | Rudick et al. |
| 9,187,268 B2 | 11/2015 | Denninger et al. |
| 9,193,108 B2 | 11/2015 | Seger et al. |
| 9,204,920 B2 | 12/2015 | McPherson et al. |
| 9,221,482 B2 | 12/2015 | Gatterbauer et al. |
| 9,233,800 B2 | 1/2016 | Senn et al. |
| 9,239,335 B2 | 1/2016 | Heise et al. |
| 9,260,741 B2 | 2/2016 | Williams, Jr. |
| 9,272,847 B2 | 3/2016 | Varhaniovsky |
| 9,274,529 B2 | 3/2016 | Ben-Shachar et al. |
| 9,283,709 B2 | 3/2016 | Lindner et al. |
| 9,292,018 B2 | 3/2016 | Hanaka et al. |
| 9,315,334 B2 | 4/2016 | Mellars et al. |
| 9,316,659 B2 | 4/2016 | Dumitrescu |
| 9,327,855 B2 | 5/2016 | Hurni et al. |
| 9,346,371 B2 | 5/2016 | King et al. |
| 9,382,109 B2 | 7/2016 | Johansen et al. |
| 9,415,441 B2 | 8/2016 | Heinecke et al. |
| 9,457,856 B2 | 10/2016 | Yao et al. |
| 9,459,273 B2 | 10/2016 | Eberhardt et al. |
| 9,469,309 B2 | 10/2016 | Yagci et al. |
| 9,470,702 B2 | 10/2016 | Pollack et al. |
| 9,494,609 B2 | 11/2016 | Gelbman et al. |
| 9,511,947 B2 | 12/2016 | Pollack et al. |
| 9,611,107 B2 | 4/2017 | Wernersbach |
| 9,617,089 B2 | 4/2017 | Josefowitz et al. |
| 9,658,241 B2 | 5/2017 | Riether et al. |
| 9,664,703 B2 | 5/2017 | Heise et al. |
| 9,671,418 B2 | 6/2017 | Mellars |
| 9,676,560 B2 | 6/2017 | Senn et al. |
| 9,701,487 B2 | 7/2017 | Unterseher |
| 9,704,096 B2 | 7/2017 | Hudson et al. |
| 9,802,507 B2 | 10/2017 | Clark |
| 9,809,392 B2 | 11/2017 | Walter |
| 9,847,742 B2 | 12/2017 | Suzuki |
| 9,914,994 B2 | 3/2018 | Leahey |
| 10,158,304 B2 | 12/2018 | Suzuki |
| 10,167,143 B2 | 1/2019 | Senn |
| 2003/0176942 A1 | 9/2003 | Sleep et al. |
| 2004/0111339 A1* | 6/2004 | Wehrung ............ G06Q 10/02 705/30 |
| 2004/0122570 A1* | 6/2004 | Sonoyama ........... G05D 1/0297 701/23 |
| 2004/0218521 A1 | 11/2004 | Bolinth et al. |
| 2004/0254674 A1* | 12/2004 | Nojo ................ G05B 19/4189 700/213 |
| 2005/0095087 A1 | 5/2005 | Sullivan et al. |
| 2007/0044676 A1 | 3/2007 | Clark et al. |
| 2007/0205220 A1 | 9/2007 | Rudick et al. |
| 2008/0128374 A1 | 6/2008 | Kyutoku |
| 2010/0140052 A1 | 6/2010 | Martini |

(56) References Cited

U.S. PATENT DOCUMENTS

| | | | |
|---|---|---|---|
| 2011/0019877 A1 | 1/2011 | Kasemann et al. | |
| 2011/0215109 A1 | 9/2011 | Bailey | |
| 2011/0241845 A1 | 10/2011 | Sullivan et al. | |
| 2011/0282476 A1 | 11/2011 | Hegemier et al. | |
| 2012/0065762 A1* | 3/2012 | Pillarisetti | G06Q 10/06 |
| | | | 700/108 |
| 2012/0295358 A1 | 11/2012 | Ariff et al. | |
| 2013/0015610 A1 | 1/2013 | Seger et al. | |
| 2013/0018850 A1 | 1/2013 | Houlihan et al. | |
| 2013/0026005 A1 | 1/2013 | Senn | |
| 2013/0084259 A1 | 4/2013 | Lee | |
| 2013/0144430 A1 | 6/2013 | Tao et al. | |
| 2013/0152516 A1 | 6/2013 | Sammons et al. | |
| 2014/0100715 A1* | 4/2014 | Mountz | G06Q 10/087 |
| | | | 701/2 |
| 2014/0100998 A1* | 4/2014 | Mountz | G06Q 10/08 |
| | | | 705/28 |
| 2014/0100999 A1* | 4/2014 | Mountz | G06Q 10/087 |
| | | | 705/28 |
| 2014/0157732 A1 | 6/2014 | Gasber | |
| 2014/0170085 A1 | 6/2014 | Peters et al. | |
| 2014/0202831 A1 | 7/2014 | Varhaniovsky | |
| 2014/0230660 A1 | 8/2014 | He | |
| 2014/0316546 A1 | 10/2014 | Walsh et al. | |
| 2015/0010437 A1 | 1/2015 | Mellars et al. | |
| 2015/0066189 A1 | 3/2015 | Mulligan et al. | |
| 2015/0079220 A1 | 3/2015 | Lindner et al. | |
| 2015/0083018 A1 | 3/2015 | Clark et al. | |
| 2015/0140668 A1 | 5/2015 | Mellars et al. | |
| 2015/0158611 A1 | 6/2015 | Kalany et al. | |
| 2015/0159585 A1 | 6/2015 | Kinney et al. | |
| 2015/0175281 A1 | 6/2015 | Py | |
| 2015/0246777 A1 | 9/2015 | Trebbi et al. | |
| 2015/0273691 A1 | 10/2015 | Pollack | |
| 2015/0276774 A1 | 10/2015 | Pollack | |
| 2015/0301072 A1 | 10/2015 | Gelbman | |
| 2015/0303841 A1 | 10/2015 | Suzuki et al. | |
| 2015/0353219 A1 | 12/2015 | Kohl | |
| 2015/0355207 A1 | 12/2015 | Pollack et al. | |
| 2015/0355208 A1 | 12/2015 | German et al. | |
| 2015/0355211 A1 | 12/2015 | Mellars | |
| 2015/0369832 A1 | 12/2015 | Sacco | |
| 2016/0007720 A1 | 1/2016 | Kemp et al. | |
| 2016/0011224 A1 | 1/2016 | Pollack | |
| 2016/0031154 A1 | 2/2016 | Haas et al. | |
| 2016/0086118 A1 | 3/2016 | Reed | |
| 2016/0101940 A1* | 4/2016 | Grinnell | G05D 1/0297 |
| | | | 700/216 |
| 2016/0114988 A1 | 4/2016 | Unterseher | |
| 2016/0122063 A1 | 5/2016 | Garriga Jimenez et al. | |
| 2016/0167888 A1* | 6/2016 | Messina | B65G 41/008 |
| | | | 198/315 |
| 2016/0167899 A1 | 6/2016 | Prinz | |
| 2016/0176559 A1 | 6/2016 | Aumann et al. | |
| 2016/0176560 A1 | 6/2016 | Aumann et al. | |
| 2016/0194158 A1 | 7/2016 | Senn | |
| 2016/0207717 A1* | 7/2016 | Senn | B65G 37/02 |
| 2016/0214799 A1* | 7/2016 | Walter | B65G 37/02 |
| 2016/0325938 A1 | 11/2016 | King et al. | |
| 2016/0334799 A1 | 11/2016 | D'Andrea et al. | |
| 2016/0341751 A1 | 11/2016 | Huber et al. | |
| 2016/0355350 A1 | 12/2016 | Yamamoto | |
| 2016/0380562 A1 | 12/2016 | Weber et al. | |
| 2017/0050332 A1 | 2/2017 | Bauer et al. | |
| 2017/0168079 A1 | 6/2017 | Sinz | |
| 2017/0184622 A1 | 6/2017 | Sinz et al. | |
| 2017/0225590 A1 | 8/2017 | Duvel et al. | |
| 2017/0225900 A1 | 8/2017 | Radak et al. | |
| 2017/0225911 A1 | 8/2017 | Baechle et al. | |
| 2018/0071923 A1 | 3/2018 | Lyman et al. | |
| 2018/0072445 A1 | 3/2018 | Burkhard et al. | |
| 2018/0072505 A1 | 3/2018 | Lyman et al. | |
| 2018/0072551 A1 | 3/2018 | Burkhard et al. | |
| 2018/0072552 A1 | 3/2018 | Orndorff et al. | |
| 2018/0073912 A1 | 3/2018 | Lyman et al. | |
| 2018/0074086 A1 | 3/2018 | Moore et al. | |
| 2018/0074477 A1 | 3/2018 | Burkhard et al. | |
| 2018/0074478 A1 | 3/2018 | Burkhard et al. | |
| 2018/0075506 A1 | 3/2018 | Burkhard et al. | |
| 2018/0076069 A1 | 3/2018 | Burkhard et al. | |

FOREIGN PATENT DOCUMENTS

| | | |
|---|---|---|
| DE | 19505997 | 8/1996 |
| DE | 19859955 A1 | 7/2000 |
| EP | 0619267 A1 | 10/1994 |
| EP | 0820862 B1 | 4/2001 |
| EP | 1163156 B1 | 11/2003 |
| EP | 1123886 B1 | 8/2004 |
| EP | 1837419 A1 | 9/2007 |
| EP | 1645340 B1 | 10/2010 |
| EP | 2420450 A1 | 2/2012 |
| EP | 2070843 | 10/2012 |
| EP | 2746165 A1 | 6/2014 |
| EP | 2865602 A1 | 4/2015 |
| EP | 2915521 A1 | 9/2015 |
| EP | 2921433 B1 | 9/2016 |
| EP | 3002222 B1 | 4/2017 |
| EP | 3173887 A1 | 5/2017 |
| EP | 2973369 B1 | 11/2017 |
| JP | H0551087 | 3/1993 |
| JP | H10315960 A | 12/1998 |
| JP | 2000289834 A | 10/2000 |
| JP | 2010132405 A | 6/2010 |
| JP | 2014133609 A | 7/2014 |
| WO | WO 2004030975 | 4/2004 |
| WO | WO2010058382 A1 | 5/2010 |
| WO | WO2012145789 A1 | 11/2012 |
| WO | WO2012152556 A2 | 11/2012 |
| WO | WO2013098202 A1 | 7/2013 |
| WO | WO 2014047104 | 3/2014 |
| WO | WO 2015101862 | 7/2015 |
| WO | WO2015117722 A1 | 8/2015 |
| WO | WO 2015126839 | 8/2015 |
| WO | WO 2016011464 A2 | 1/2016 |
| WO | WO2016012157 A1 | 1/2016 |
| WO | WO2016146213 A1 | 9/2016 |
| WO | WO2017013095 A1 | 1/2017 |
| WO | WO2017089182 A1 | 6/2017 |
| WO | WO2017103827 A1 | 6/2017 |
| WO | WO2017108421 A1 | 6/2017 |
| WO | WO2017108423 A1 | 6/2017 |
| WO | WO2017149377 A1 | 9/2017 |

OTHER PUBLICATIONS

Website, Siemens, Overview, "Specialist for packaging technology" http://w3.siemens.com/mcms/mc-solutions/en/mechanical-engineering/packaging-machine/mcs/mcs-video/Pages/mcs-videos.aspx.

Website, Siemens, Thomas, "What makes mass production so flexible that it can meet individual demands?" Packaging Digest, Automation, Sep. 27, 2016, http://www.packagingdigest.com/automation/masspackaging-production-flexible-meets-individual-demands1609?cid=nl.x.pkg01.edt.aud.packdgst.20160928.

YouTube video, XTS and KUKA robot, EtherCAT demo at the ETG booth at SPS/ IPC/ Drive show 2013, Published on Nov. 29, 2013 https://www.youtube.com/watch?v=UTWCIo7UEMA.

YouTube video, Beckhoff XTS application example: Bottling plant, Published on Jan. 21, 2013 https://www.youtube.com/watch?v=_HiA111v3-U.

International Search Report and Written Opinion dated Dec. 19, 2017, 11 pgs, U.S. Appl. No. 15/698,669.

International Search Report and Written Opinion dated Dec. 21, 2017, 16 pgs, U.S. Appl. No. 15/698,700.

International Search Report and Written Opinion dated Feb. 26, 2018, 14 pgs, U.S. Appl. No. 15/698,677.

International Search Report and Written Opinion dated Feb. 9, 2018, 11 pgs, U.S. Appl. No. 15/698,676.

International Search Report and Written Opinion dated Jan. 25, 2018, 10 pgs, U.S. Appl. No. 15/698,681.

(56) References Cited

OTHER PUBLICATIONS

International Search Report and Written Opinion dated Nov. 29, 2017, 13 pgs, U.S. Appl. No. 15/698,671.
International Search Report and Written Opinion dated Nov. 30, 2017, U.S. Appl. No. 15/698,673, 12 pgs.
International Search Report and Written Opinion dated Dec. 4, 2017, 13 pgs, U.S. Appl. No. 15/698,674.
Brochure, MagneMotion, A Rockwell Automation Company, "Independent Cart Technology", 16 pgs., Nov. 2016.

* cited by examiner

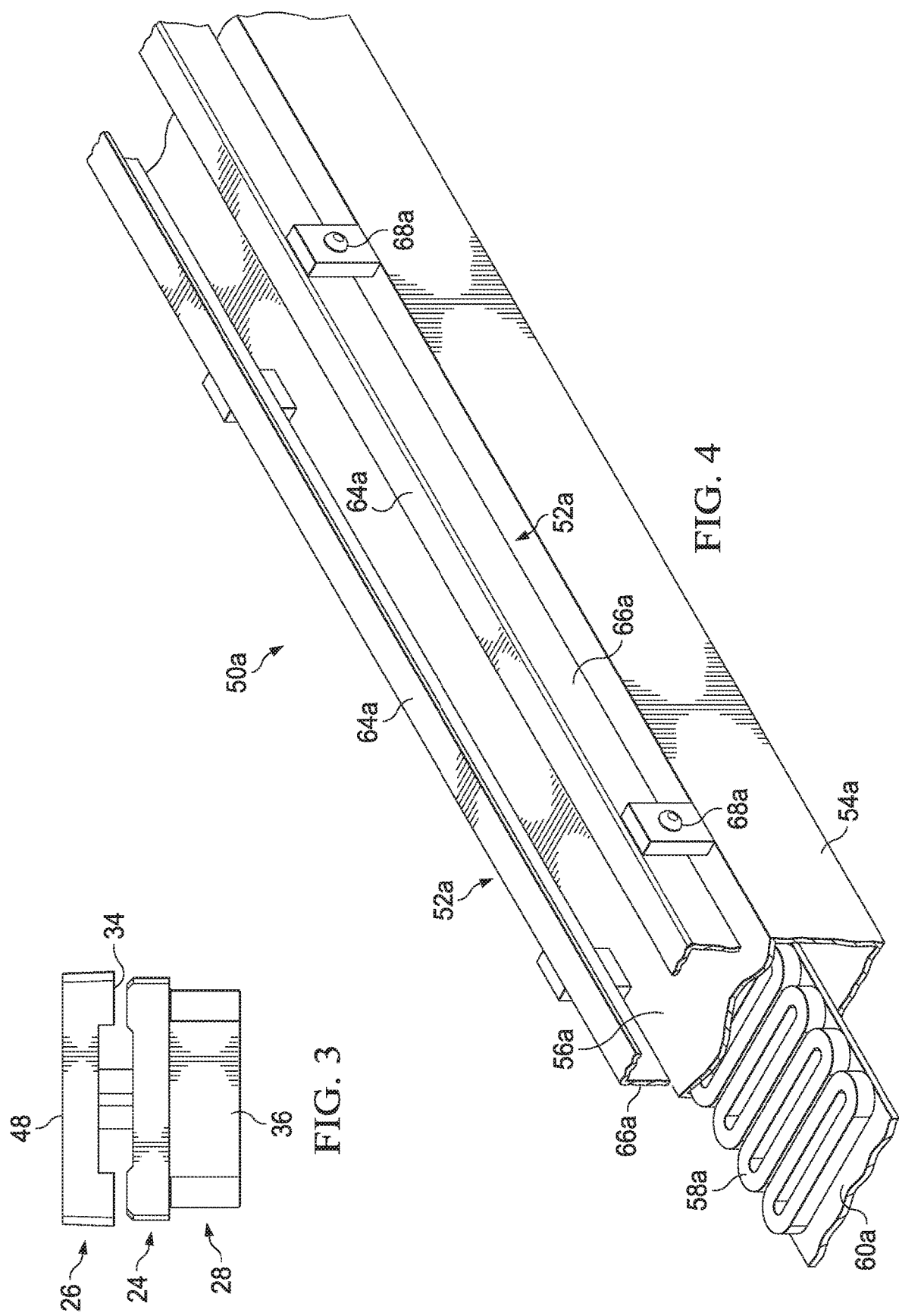

SYSTEM AND METHOD FOR PRODUCING PRODUCTS BASED UPON DEMAND

TECHNICAL FIELD

The systems and methods described below generally relate to a track system and methods for producing products based upon demand.

BACKGROUND

Many types of systems and methods for producing various products are currently in use. Many current types of manufacturing processes are mass production processes that are designed to produce large quantities of a single type of product on a large scale on one or more manufacturing lines. While such manufacturing lines generally serve the purpose of making a single type of product very well, these manufacturing lines are not well suited to make different types of products, or for making changes to a given product. To provide consumers with a diverse product line, a manufacturer must employ many different high speed manufacturing lines which can be expensive and space intensive. Alternatively, a manufacturer has to stop production on a manufacturing line to make changes to the same in order to make changes to a product. Such changeovers are often time consuming and expensive due to the associated equipment downtime.

For example, high speed container filling systems are well known and used in many different industries. In many of the systems, fluids are supplied to containers to be filled through a series of pumps, pressurized tanks and flow meters, fluid filling nozzles, and/or valves to help ensure the correct amount of fluid is dispensed into the containers. These high speed container filling systems are typically systems that are configured to only fill one type of container with one type of fluid. When a different container type and/or different fluid is desired from the system, the configuration of the system must be changed (e.g., different nozzles, different carrier systems, etc.) which can be time consuming, costly, and can result in increased downtimes.

These high speed container filling systems are also typically incapable of providing different containers and arrangements of containers in a package without manual handling of the containers and/or packaging which can be time consuming, expensive, and frequently inaccurate.

Thus, it would be advantageous to provide systems and methods of producing products based on demand. It would also be advantageous to provide a system and a method of producing products that are versatile and can different products simultaneously on a single production line. It would also be advantageous to provide a system and a method that allows for on-demand fulfillment of orders without requiring manual packing.

SUMMARY

Systems and methods for producing products based on demand are disclosed.

The systems and methods can be used to produce any suitable type of product. Such products can comprise fluent products or assembled products. Several non-limiting examples of systems and methods for producing fluent products and assembled products are summarized below.

The systems and methods utilize an automated track system and a plurality of vehicles, at least some of which may be independently routable along the track system. The track system comprises a primary transport path and at least one secondary transport path. A plurality of articles are provided which comprise at least a first article and a second article. The first and second articles comprise components of the products to be produced. At least some of the vehicles may be independently routable along the track system to deliver the first and second articles to at least one of at least two unit operation stations.

In some embodiments, a system for making products based on demand data is provided which comprises a plurality of vehicles for articles, a track system comprising a track on which article-loaded vehicles are propellable, a plurality of unit operation stations disposed along the track system and configured to cooperate to create at least one finished product. Each article is disposed on a vehicle, and the plurality of vehicles are independently routable along the track system to deliver at least some of the articles to at least one unit operation station. The system further comprises a control system comprising one or more controller units which: receives demand for finished products to be made; determines a route for a vehicle, where said route is determined based on a status of one or more unit operation stations; causes a vehicle to be propelled to progress along said determined route so as to create one or more of said demanded finished products; and, delivers one or more finished products to an unloading station.

In another embodiment, a system for making fluent products is provided which comprises a plurality of containers for holding a fluent material, a plurality of vehicles for containers, and a track system comprising a track on which container-loaded vehicles are propellable. The track system comprises a primary transport portion that defines a primary path comprised of track that forms a closed loop that is configured to permit at least one container-loaded vehicle to travel in a holding pattern. The track system further comprises at least one secondary transport portion that extends from the primary transport portion and defines a secondary path that intersects the primary path at an ingress location and at an egress location. The system also comprises at least one unit operation station disposed along a secondary transport portion configured to perform a container treatment operation on at least one container or the contents thereof, of a container-loaded vehicle. The plurality of container-loaded vehicles are independently routable along the track system to deliver at least some of the containers to the at least one unit operation station for performing a container treatment operation on at least some of the containers.

In another embodiment, a system for making fluent products is provided which comprises a plurality of first containers, a plurality of second containers, a track system, at least two unit operation stations disposed along the track system, and a plurality of vehicles propellable along the track system. Each of the plurality of first containers has a shape, and appearance, an opening, and a volume for holding a fluent material. Each of the plurality of second containers has a shape, an appearance, an opening, and a volume for holding a fluent material. One or more of the shape, appearance, and the volume of each of the second containers is different from one or more of the shape, appearance, and the volume, respectively, of each of the first containers. One or more of the first containers and one or more of the second containers are disposed on respective vehicles, and the one or more first containers and second containers are empty at the time they first become disposed on respective vehicles. The plurality of vehicles are routable along the track system to facilitate simultaneous delivery of the first containers and the second containers to different unit operation stations.

In another embodiment, a system for making fluent products is provided which comprises at least one container for holding a fluent material, a track system, a plurality of unit operation stations, and a plurality of vehicles propellable along the track system. The container has at least one opening and at least one closure is provided for selectively sealing the opening(s) of the container. One of the plurality of unit operation stations is disposed along the track system and configured to dispense fluent material into a container. Each container is disposed on a respective vehicle, and the plurality of vehicles are independently routable along the track system to deliver at least one container and at least one closure to at least one unit operation station for applying a closure onto a container.

In another embodiment, a system for making fluent products is provided which comprises at least one first container and at least one second container for holding a fluent material, a track system, at least one unit operation station for dispensing fluent material disposed along the track system, and a plurality of vehicles propellable along the track system. A first container and a second container are disposed on the same or different vehicles. Each vehicle is independently routable along the track system to deliver the first and second containers to the at least one unit operation station. The first container and the second container receive one or more fluent materials dispensed by one or more filling unit operation stations, wherein the filling unit operation stations are configured to dispense fluent material so that the first and second fluent compositions in the first and second containers differ from one another. The first and second fluent compositions may differ in one or more of the following ways. There may be a difference in the presence or type of at least one ingredient in the fluent composition in the first container and that the fluent composition in the second container. In addition, or alternatively, the fluent compositions in the first and second containers have at least one common ingredient, and at least one of the following relationships is present: (a) the difference in weight percentage of the same ingredient in the two fluent compositions is greater than or equal to about 1.1 as determined by dividing the weight percent of the ingredient that is present in the greater amount in the two fluent compositions by the weight percent of the same ingredient that is present in the lesser amount in the two fluent compositions; and (b) when the weight percentage of at least one of the ingredients common to both the first and second containers is present in the two fluent composition in an amount of at least 2%, and the difference of the weight percent of the same ingredient in the two fluent compositions is greater than or equal to 2%.

In another embodiment, a system for making fluent products is provided which comprises a plurality of containers for holding a fluent material, a track system, a plurality of unit operation stations disposed along the track system, and a plurality of vehicles propellable along the track system. Each container is disposed on one of the vehicles, and each vehicle is independently routable along the track system to deliver the containers to at least one operation station. At least some of the vehicles have associated therewith a unique route along the track system assigned by a control system to facilitate simultaneous production of different finished products.

In another embodiment, a method of producing different fluent products on a single production line is provided. The method comprises the steps of: (a) providing a track system comprising a track on which container-loaded vehicles are propellable; (b) providing a plurality of empty containers comprising a first container and a second container; (c) providing a plurality of vehicles; (d) loading the first and second empty containers onto one or two vehicles; and (e) sending one of the container-loaded vehicles to a filling unit operation station wherein a fluent product is dispensed into the first container and another one of the container-loaded vehicles to a filling unit operation station where a different fluent product is simultaneously dispensed into the second container. Steps (a)-(c) may occur in any suitable order.

In another embodiment, a system for making assembled products is provided which comprises a holder on which a product will be assembled, a track system, a plurality of unit operation stations disposed along the track system configured to assemble components to create a finished product, and a plurality of vehicles propellable along the track system. Each holder is disposed on one of the vehicles, and each vehicle may be independently routable along the track system to deliver the holders to at least one unit operation station where an assembly operation is performed. Components for assembly can be supplied to the unit operation stations by an external supply system or delivered by one of the plurality of vehicles.

In another embodiment, the first vehicle carrying the first article and the second vehicle carrying the second article may be routable so that: the first vehicle carrying the first article is routable to form a customized product; and the second vehicle carrying the second article is routable in a separate stream of products from the first article to form a second stream of mass produced products.

BRIEF DESCRIPTION OF THE DRAWINGS

It is believed that certain embodiments will be better understood from the following description taken in conjunction with the accompanying drawings in which:

FIG. 3 is a side view of the vehicle of FIG. 2.

FIG. 4 is an isometric view depicting a straight portion of the track of FIG. 1.

DETAILED DESCRIPTION

Definitions

Figure 1:
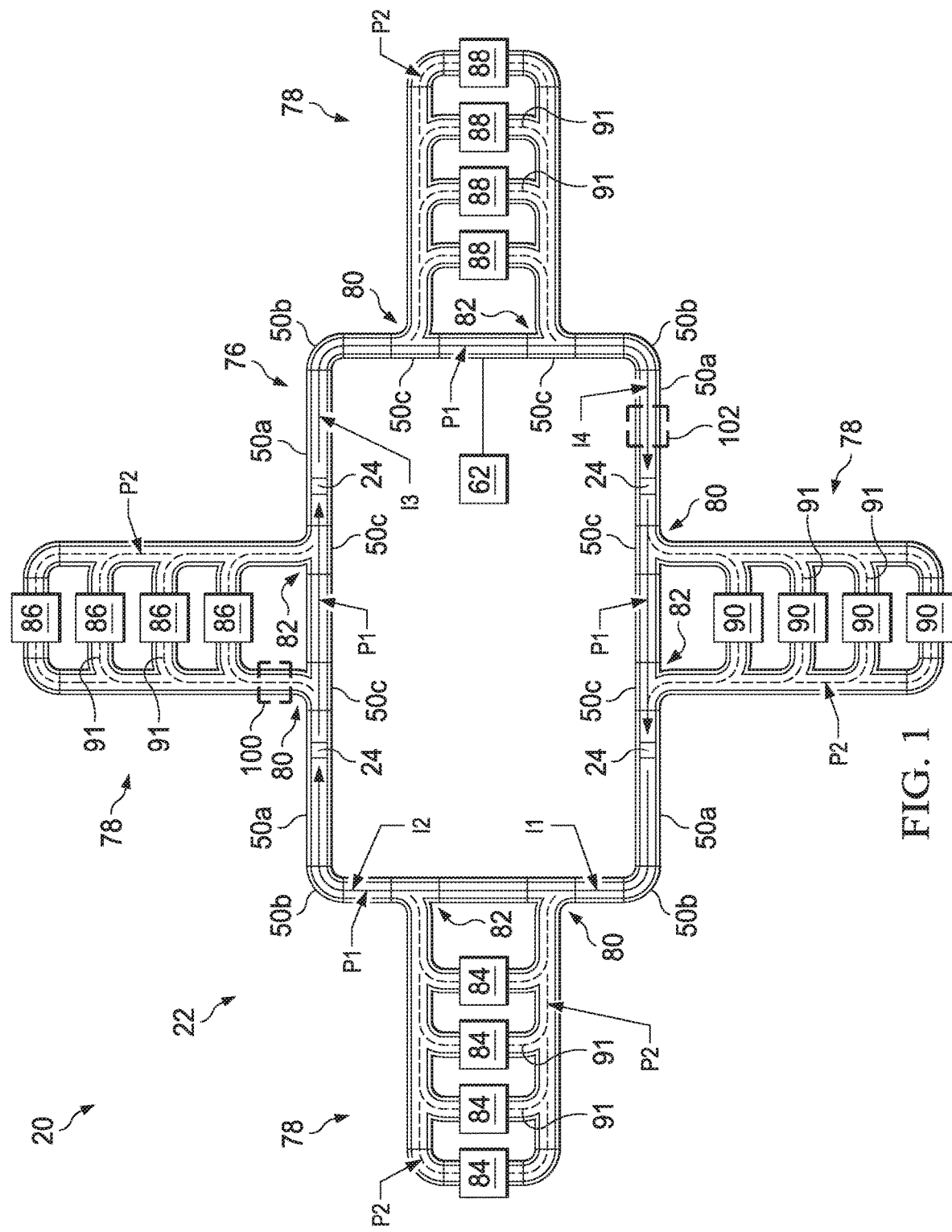
FIG. 1 is a schematic view depicting a track system having a track and a control system, in accordance with one embodiment.

The term "article", as used herein, refers to a product, a package, a label, or any portion, component, or partially formed part of any of the foregoing. In the case of fluent products, the article may comprise a container and/or its contents. When there are multiple articles, they may be referred to as a first article, a second article, a third article, etc.

The term "assembled products", as used herein, refers to products that are formed by assembling (that is, mechanically joining) different components to form a complete article. As used herein, the filling of containers with fluent products, labeling such containers, and applying closures to the same, are not considered to cause fluent products to be "assembled products" since the fluent product itself is not formed by mechanically joining components together.

The term "capping", as used herein, refers to applying any suitable type of closure to a container, and includes but is not limited to applying a cap to a container.

The term "constraints", as used herein as in "constraints on arriving at one or more unit operation stations", refers to limitations or restrictions on a vehicle arriving at one or more unit operation stations. Examples of constraints on arriving at one or more unit operation stations include: the infeed queue not being full; and requirements that one or more containers arrive before one or more other containers in order to form a specific package.

The term "consumer", as used herein, refers to an intended user of a product.

The term "consumer product", as used herein, includes, but is not limited to consumable products that are regularly and frequently consumed by a consumer and need to be replenished. Components of consumer products that comprise one or more components that are less frequently consumed (such as razor blade handles) and components that are more frequently replenished (such as razor blades) are together and alone considered to comprise consumer products. The term "consumer product" may include those known in the industry as "fast moving consumer goods" (FMCG's). The term "consumer product" may, in some cases, be specified as excluding durable consumer products (such as shoes and textile goods that are intended to be worn and reworn). Even though prescription pharmaceuticals are consumed on a frequent basis, in some cases, the term "consumer products" may be specified as excluding prescription pharmaceuticals.

The term "container", as used herein, refers to an article that is capable of holding a material, such as a fluent material, and includes, but is not limited to bottles, unit dose pods, pouches, sachets, boxes, packages, cans, and cartons. The containers can have a rigid, flexi-resilient, or flexible structure in whole or in part.

The term "container-loaded", as used herein, means having one or more containers disposed thereon.

The term "container treatment operation", as used herein, refers to one or more of the following unit operations: (a) a filling operation station for dispensing fluent material into a container; (b) a decorating operation; and (c) a capping operation. The term "container treatment operation" does not include the operations of loading and/or unloading containers onto the vehicles. When the term "container treatment operation" is said to be performed on a container-loaded vehicle, it is understood that the operation can be performed on the container and/or its contents, as appropriate.

The term "customer", as used herein, refers to a distributor, or a retailer such as a store, or a chain of stores.

The term "customized product(s)", as used herein, refers to articles that have properties and/or features that are selected by a customer or consumer, and then (thereafter) the articles are produced with the customer or consumer's choices of properties and/or features. Customized products are distinguishable from mass produced products (defined below). The properties or features can include, but are not limited to: the size or quantity of a product (but at least one other property or feature should be combined with size or quantity in order to qualify as a customized product and be distinguishable from a manufacturer's usual mass production (e.g., volume or count) product offerings of a product; the version of a product (e.g., "high intensity", "for dry hair", "for oily hair", etc.); SKU number; the decoration, label, or image on a product, container, or package; name to be placed on the product, container, or package, which can be the name of the product and/or user (e.g., "Dad's laundry", person's given name selected from a list of common given names, etc.); the color of the product; and for fluent products any of the foregoing as applicable, as well as the formulation, scent, container type, container shape, color of the container, decoration on the container, and closure and/or dispenser type. The customer or consumer can also be provided with the choice to have the product be free of certain properties or features (e.g., no scent, no bleach, etc.)

The properties and/or features can be selected from a predefined (limited) number of options (that is, from a pick list) provided by the manufacturer. Alternatively, the customer or consumer can be provided with the ability to select properties and/or features from a substantially unlimited number of possible options (to create personalized products, defined below). The term "customized product(s)" includes both non-personalized products and personalized products. In some cases, it may be desirable to exclude one of more of the foregoing properties or features when referring to "customized products".

The term "decoration", as used herein, refers to a visual, tactile, or olfactory effect applied by means of material deposition that is applied directly, or transferred to an article, or by transforming a property of an article, or combinations thereof. Examples of a material deposition that is applied directly to an article include, but are not limited to applying a label to an article (labelling), and/or printing and/or spray-coating at least a portion of the article or on a component of an article. An example of transforming a property of an article without transferring a material to the surface of the article is imparting an image on the surface of an article by a laser. The term "decorating", as used herein, refers to the act of applying a decoration.

The term "different finished products", as used herein with respect to fluent products, includes, but is not limited to: differing in container volume, container shape, container size, contained material volume or mass, contained ingredients, contained fluent product composition, container or closure appearance, closure type, container composition, closure composition, or other finished product attribute. The "appearance" of a container (and a closure) refers to its color, and any decoration thereon including any label or label contents thereon. The term "different finished products", as used herein with respect to assembled products, includes, but is not limited to: differing in appearance; the presence or absence of a feature (e.g., personalization) or in the presence or absence of a component (e.g., whether the product is provided with an optional component); differing in the components comprising the product (e.g., one product may have components A, B, and C, and another product may have components A, B, and C'; or A, B, and D); or, other finished product attribute. When the finished products are described as differing from each other in one of more of the foregoing properties, it is meant to include those differences other than minor differences that are the result of variations within manufacturing tolerances.

The term "different fluent products", as used herein, means differing in at least one property such as: state (e.g., liquid, solid, or non-headspace gas), differing amounts of one or more states of matter in the fluent products, differences in ingredients, differing amounts of one or more ingredients in the fluent products, observable properties (as perceived or measured by an observer such as color, scent, viscosity), particle size of any solid particles, and other properties. When the fluent products are described as differing from each other in one or more of the foregoing properties, it is meant to include those differences other than minor differences that are the result of variations within manufacturing tolerances. With respect to differences between two different fluent products based on their respective ingredient(s), it means when one of the two fluent products comprises an ingredient that is absent from the other fluent product. With respect to differing amounts of at least one same ingredient in two different fluent products, it means when the two different fluent products each contain the at least one same ingredient with a minimum or greater difference based on weight, as determined by one or both of the following methods. Both methods rely on knowledge of the proportion of said same ingredient in each different formula as a weight percent of the total fluent product weight of the total amount fluent product(s) contained with each fluent product's respective container associated with their respective finished product. Method 1 determines that two fluent products are different if the ratio of the weight percent of the same ingredient in the two fluent products is greater than or equal to about 1.1 (and, thus, greater than or equal to about 1.25) as determined by dividing the weight percent that is the greater of the two fluent products by the weight percent that is the lesser of the two fluent products. Method 2 applies to when the weight percent of the same ingredients are each present in each of the fluent materials is minimally equal to or greater than 2% (as expressed as a weight percent) and the difference of the weight percent of the same ingredient in the two fluent products is about equal or greater than 2%, or any integer % value up to and including 99%, as determined by subtracting the weight percent that is the greater of the two fluent products by the weight percent that is the lesser of the two fluent products. Different fluent products refer to the entirety of the weight sum of fluent product(s) contained within a finished product wherein the fluent product(s) may be contained within one or multiple fluent product-containing chambers. Non-headspace gas refers to pressurized gas of which examples include: propellant gas such as for aerosol products and pressurized gas for a sealed chamber to provide structural support or shape definition to a container.

The terms "disposed on" or "disposed thereon", as used herein with reference to the articles on the vehicles (such as containers on container-loaded vehicles), means any of the following: held by, affixed to, or otherwise coupled to in a removable manner. When the articles (such as containers) are described as being disposed on the vehicles, the article(s) can be in any suitable orientation with respect to the vehicles including, but not limited to: on top of the vehicles, underneath the vehicles, adjacent to one or more of the sides of the vehicles, or (if there are more than one article disposed on a vehicle) any combinations thereof.

The term "fast cycle", with respect to stations, refers to inspection stations, such as weighing stations, scanners (e.g., for scanning bar codes, QR codes, RFID codes, etc.), vision systems, metal detectors, and other types of stations in which the task performed at such stations are carried out in a minimal amount of time relative to at least some other unit operation stations.

The term "finished product", as used herein, refers to a product in its final form or condition for delivery to a customer or consumer. In the case of products that require assembly (assembled products), such products will be completely assembled and have any desired decorations thereon. Such finished assembled products may include any primary packaging in which the product is typically placed on a customer's store shelf in a retail environment. In the case of fluent products, such products will be finished fluent products as defined below.

The term "finished fluent product", as used herein, comprises a container, the fluent material (or contents) therein, any decoration on the container, and the closure on the container. Finished fluent products may in part or whole be flowable or fluent.

The term "fluent product" (or "fluent material"), as used herein, refers to any of the following: liquid products, gels, slurries, flowable pastes, pourable solid products (including, but not limited to granular materials, powders, beads, and pods), and/or gaseous products (including, but not limited to those used in aerosols).

The term "holding pattern", as used herein, means that at least one (empty) vehicle or article transporting vehicle (such as a container-loaded vehicle) travels past at least one point on a closed loop (of a main closed loop or sub-loop) twice while traveling in the same direction without an intervening trip in the opposite direction past said point. In addition, the term "holding pattern" means that the article transporting vehicle also does not unload an article or component thereof (and in the case of a container-loaded vehicle, does not unload a container) in between passing through the point twice. Thus, a typical operation of recirculating a vehicle to make a second product after using the vehicle to make a first product would not be considered moving the vehicle in a holding pattern. When it is said that a container is "empty", the container will be considered to be empty even though it contains atmospheric air therein.

The term "infeed queue", as used herein, refers to an area where vehicles wait for a unit operation station to become ready to receive the vehicles. The infeed queue can be expressed in terms of a length of track or a number of vehicles that can be queued in this area. Different unit operation stations may either have the same or different infeed queue lengths. Therefore, the queue lengths of some unit operation stations may be shorter or longer than the queue lengths at other unit operation stations. The infeed queue can (if using the number of vehicles) range from 0 (if no vehicles are able to wait in front of a given vehicle), up to hundreds of vehicles. In some cases, the queue length may be between about 2-10 vehicles.

The term "inspection", as used herein, may include any of the following: scanning; weighing; detecting the presence or orientation of an article (which may be a component of a product; or, in the case of fluent products, the article may be a container); detecting defects or faults, detecting wear and tear on equipment and/or vehicles; or, other types of inspection. Inspections may be performed by weighing stations, scanners (e.g., for scanning bar codes, QR codes, RFID codes, etc.), vision systems, metal detectors, and other types of stations or devices.

The term "interface point", as used herein, refers to a specific location on a track. The interface point location is pre-selected, for the purpose of the product scheduling controller. In some embodiments, exactly one (a single) interface point can be defined along the track between adjacent unit operation station groups, such that it could be said that a unit operation station group has an upstream interface point located between the unit operation stations of the unit operation station group and the unit operation stations of an upstream unit operation station group, and that a unit operation station group has a downstream interface point located between the unit operation stations of the unit operation station group and the unit operation stations of a downstream unit operation station group. As an example, the unit operation stations 86 of FIG. 1 comprise a unit operation station group. This unit operation station group has an upstream interface point I2 (FIG. 1) and a downstream interface point I3 (FIG. 1). Elaborating on the same example, the unit operation stations 88 of FIG. 1 comprise a second unit operation station group. The second unit operation station group has an upstream interface point I3 (FIG. 1) and a downstream interface point I4 (FIG. 1). Thus, an interface point may serve as both a downstream interface point for a first unit operation station group and an upstream interface point for a second unit operation station group.

Interface points need not (and often do not) correspond to the location of ingress or egress switches. Interface points may be on either the primary transport path or the secondary transport path(s). In other embodiments, the delineation between adjacent unit operation station groups may comprise a plurality of interface points, such that every possible span of track connecting the unit operation station groups has exactly one interface point defined upon the span of track, and that there exists no span of track connecting adjacent unit operation station groups where there has been no interface point defined. For example, FIG. 1E shows a section of track having multiple interface points P1 between fillers 86A and cappers 86B where fillers 86A and cappers 86B are on the same "rung" of a unit transport segment 91. In embodiments where there exists more than one interface point defined between adjacent unit operation station groups, it is advantageous to configure the system such that a unit operation station is located such that a vehicle will always visit a specific interface point upstream of the unit operation station, and a specific interface point downstream of the unit operation station. Such specific interface points need not be the same interface point for all unit operation stations in a given unit operation station group, but a given unit operation station should have a single upstream interface point visited by vehicles prior to arrival at the unit operation station, and a single downstream interface point visited by vehicles after arrival at the unit operation station. It should furthermore be noted that in any embodiment an upstream or downstream interface point need not be positioned any particular distance away from the unit operation station, so it is possible for an upstream or downstream interface point to be at the location of a unit operation station, such that it is considered "upstream" or "downstream" only in a logical sense, but not in a physical layout sense. It should be noted that the embodiment of there being only a single interface point defined between adjacent unit operation station groups and the embodiment of there being more than one interface point defined between adjacent unit operation station groups need not be mutually exclusive, such that in the same system some adjacent unit operation station groups may have a single interface point defined between them, and other adjacent unit operation station groups in the same system may have multiple interface points defined between them.

The term "intermixed", as used herein to describe the system and method of production, refers to production that takes place on the same system (e.g., manufacturing line) during a period of time (e.g., simultaneously). The term "intermixed" production includes producing different finished products, or any parts or portions thereof, on the same track system during a period of time. For example, an intermixed production may comprise producing on the same manufacturing line product A and product B, which comprise different finished products. The products may be at the same stage of completion, or at different stages of completion at any given time during production. At any given time, the manufacturing line may be producing products A and products B in any sequence and producing an output of such products in any sequence (e.g., ABA; ABBA; etc.). The intermixed production is not limited to producing two different finished products. The intermixed production can make any suitable number of different products (e.g., products A, B, C, D, etc.) from two different products up to a virtually unlimited number of different products in any sequence (e.g., products A, B, and C; or, products A, B, and G). Such different possible products, if personalized, could number as many as 10,000, or more up to 10 million, or more. The term "intermixed" production, thus, does not include: (1) manufacturing different finished products on different production/manufacturing lines (at either the same or at different manufacturing sites); or (2) making one product, product A, on a manufacturing line, and changing over the manufacturing line to stop production of product A to make product B (sequential change overs). Such sequential changeovers that do not comprise "intermixed" production are those where such changeovers occur no more often than at intervals greater than every few (e.g., 3) minutes.

The term "joined to" as used throughout this disclosure, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element.

The terms "mass production", "mass produced", and the like, as used herein, refer to an automated or semi-automated process in which at least hundreds (and in some cases thousands) of the same product are produced on a given day. As used in the definition of "mass production" and "mass produced", the "same product" refers to multiple copies of a version of a product that is the same in all material aspects (size, shape, decoration, etc.), with the exception of any variations within manufacturing tolerances, serialization code, or expiration dates. Mass produced products have characteristics that are chosen by the manufacturer or producer of the products, rather than by that specific product's customer or consumer. Typically, mass produced products are produced before a customer or consumer selects or places an order for the same.

The term "non-personalized customized products", as used herein, refers to customized products that are not personalized products (as defined below). Thus, non-personalized customized products are those in which the properties and/or features can be selected from a pre-defined (limited) number of options (that is, from a pick list) provided by the manufacturer.

The term "operation", as used herein with respect to an activity that occurs at a unit operation station, includes transformations and inspections.

The term "packaging", as used herein, means a structure or material that is at least partially disposed on or about a consumer product. "Primary packaging", in the case of fluent products, for example, means the container in which the consumer product is in direct contact and includes its closure, pump, cap, or other peripheral items. "Primary packaging", in the case of assembled products, for example, means the box, blister pack, or other package in direct contact with the consumer product in which the product is typically provided to place the product on a customer's store shelf in a retail environment. "Secondary packaging" means any additional materials that are associated with the primary packaging, such as, for example, a container such as a box or polymeric sleeve that at least partially surrounds, contains, or contacts the primary packaging.

The term "personalized products", as used herein, refers to articles that are uniquely customized and have properties and/or features that are selected by a customer or consumer from a substantially unlimited number of possible options, and then (thereafter) the articles are produced with the customer or consumer's choices of properties and/or features. Thus, personalized products are typically made (or partially made and then completed) after being selected by a customer or consumer. Some examples of properties and/or features of personalized products include, but are not limited to: for liquid products, the additive(s) added to the product where the customer or consumer is able to define the weight percentage of the additive(s) from any percentage from 0% (e.g., no dye) to less than 100%, with a virtually unlimited number of decimal places (but typically up to about 3 decimal places); the color of the product or a portion thereof selected from any combination of a full color gamut; a scent of a product selected by mixing scents in any desired amount and combinations; adding a decoration supplied by a customer or consumer (such as a picture supplied by a customer or consumer, matching a consumer's wall paper, etc.); and, adding a customer's or consumer's text (e.g., name or other desired wording) to the article, container, package, or label. The customer or consumer's picture may be provided in any suitable form including, but not limited to digitally. In some cases, it may be desirable to exclude one of more of the foregoing properties or features when referring to "personalized products".

The term "plurality", as used herein, means more than one.

The phrase "preparing a product for distribution", as used herein, means placing one or more products into groups and/or containers (e.g., secondary packaging and/or shipping containers) for shipment to a customer, a consumer, or a warehouse.

The term "products", as used herein, means any type of product that is sold or provided to a consumer or customer across a variety of industries. The term "products" includes assembled products and fluent products. The following products can take any product form described herein or known in the art.

Non-limiting examples of consumer products include: baby care products (e.g. soaps, shampoos, and lotions); beauty care products for cleaning, treating, beautifying, and/or decorating human or animal hair (e.g. hair shampoos, hair conditioners, hair dyes, hair colorants, hair repair products, hair growth products, hair removal products, hair minimization products, etc.); beauty care products for cleaning, treating, beautifying, and/or decorating human or animal skin (e.g. soaps, body washes, body scrubs, facial cleansers, astringents, sunscreens, sun block lotions, lip balms, cosmetics, skin conditioners, cold creams, skin moisturizers, antiperspirants, deodorants, etc.); beauty care products for cleaning, treating, beautifying, and/or decorating human or animal nails (e.g. nail polishes, nail polish removers, etc.); grooming products for cleaning, treating, beautifying, and/or decorating human facial hair (e.g. shaving products, pre-shaving products, after shaving products, etc.); health care products for cleaning, treating, beautifying, and/or decorating human or animal oral cavities (e.g. toothpaste, mouthwash, breath freshening products, anti-plaque products, tooth whitening products, etc.); health care products for treating human and/or animal health conditions (e.g. medicines, medicaments, pharmaceuticals, vitamins, nutraceuticals, nutrient supplements (for calcium, fiber, etc.), cough treatment products, cold remedies, lozenges, treatments for respiratory and/or allergy conditions, pain relievers, sleep aids, gastrointestinal treatment products (for heartburn, upset stomach, diarrhea, irritable bowel syndrome, etc.), purified water, treated water, etc.); pet care products for feeding and/or caring for animals (e.g. pet food, pet vitamins, pet medicines, pet chews, pet treats, etc.); fabric care products for cleaning, conditioning, refreshing and/or treating fabrics, clothes and/or laundry (e.g. laundry detergents, fabric conditioners, fabric dyes, fabric bleaches, etc.);

dish care products for home, commercial, and/or industrial use (e.g. dish soaps and rinse aids for hand-washing and/or machine washing); cleaning and/or deodorizing products for home, commercial, and/or industrial use (e.g. soft surface cleaners, hard surface cleaners, glass cleaners, ceramic tile cleaners, carpet cleaner, wood cleaners, multi-surface cleaners, surface disinfectants, kitchen cleaners, bath cleaners (e.g. sink, toilet, tub, and/or shower cleaners), appliance cleaning products, appliance treatment products, car cleaning products, car deodorizing products, air cleaners, air deodorizers, air disinfectants, etc.), and the like. If desired certain of these products including, but not limited to fabric care products, dish care products, and personal care products may include beads comprised of any suitable material for any suitable purpose.

Further examples of products include those that are intended to be used across additional areas of home, commercial, and/or industrial, building and/or grounds, construction and/or maintenance, including any of the following products: products for establishing, maintaining, modifying, treating, and/or improving lawns, gardens, and/or grounds (e.g. grass seeds, vegetable seeds, plant seeds, birdseed, other kinds of seeds, plant food, fertilizer, soil nutrients and/or soil conditions (e.g. nitrogen, phosphate, potash, lime, etc.), soil sterilants, herbicides, weed preventers, pesticides, pest repellents, insecticides, insect repellents, etc.); products for landscaping use (e.g. top soils, potting soils, general use soils, mulches, wood chips, tree bark nuggets, sands, natural stones and/or rocks (e.g. decorative stones, pea gravel, gravel, etc.) of all kinds, man-made compositions based on stones and rocks (e.g. paver bases, etc.)); products for starting and/or fueling fires in grills, fire pits, fireplaces, etc. (e.g. fire logs, fire starting nuggets, charcoal, lighter fluid, matches, etc.); lighting products (e.g. light bulbs and light tubes or all kinds including: incandescents, compact fluorescents, fluorescents, halogens, light emitting diodes, of all sizes, shapes, and uses); chemical products for construction, maintenance, remodeling, and/or decorating (e.g. concretes, cements, mortars, mix colorants, concrete curers/sealants, concrete protectants, grouts, blacktop sealants, crack filler/repair products, spackles, joint compounds, primers, paints, stains, topcoats, sealants, caulks, adhesives, epoxies, drain cleaning/declogging products, septic treatment products, etc.); chemical products (e.g. thinners, solvents, and strippers/removers including alcohols, mineral spirits, turpentines, linseed oils, etc.); water treatment products (e.g. water softening products such as salts, bacteriostats, fungicides, etc.); fasteners of all kinds (e.g. screws, bolts, nuts, washers, nails, staples, tacks, hangers, pins, pegs, rivets, clips, rings, and the like, for use with/in/on wood, metal, plastic, concrete, concrete, etc.); and the like.

Further examples of products include those that are intended to be used across the food and beverage industry, including any of the following products: foods such as basic ingredients (e.g. grains such as rice, wheat, corn, beans, and derivative ingredients made from any of these, as well as nuts, seeds, and legumes, etc.), cooking ingredients (e.g. sugar, spices such as salt and pepper, cooking oils, vinegars, tomato pastes, natural and artificial sweeteners, flavorings, seasonings, etc.), baking ingredients (e.g. baking powders, starches, shortenings, syrups, food colorings, fillings, gelatins, chocolate chips and other kinds of chips, frostings, sprinkles, toppings, etc.), dairy foods (e.g. creams, yogurts, sour creams, wheys, caseins, etc.), spreads (e.g. jams, jellies, etc.), sauces (e.g. barbecue sauces, salad dressings, tomato sauces, etc.), condiments (e.g. ketchups, mustards, relishes, mayonnaises, etc.), processed foods (noodles and pastas, dry cereals, cereal mixes, premade mixes, snack chips and snacks and snack mixes of all kinds, pretzels, crackers, cookies, candies, chocolates of all kinds, marshmallows, puddings, etc.); beverages such as water, milks, juices, flavored and/or carbonated beverages (e.g. soda), sports drinks, coffees, teas, spirits, alcoholic beverages (e.g. beer, wine, etc.), etc.; and ingredients for making or mixing into beverages (e.g. coffee beans, ground coffees, cocoas, tea leaves, dehydrated beverages, powders for making beverages, natural and artificial sweeteners, flavorings, etc.). Further, prepared foods, fruits, vegetables, soups, meats, pastas, microwavable and or frozen foods as well as produce, eggs, milk, and other fresh foods.

Further examples of products include those that are intended to be used across the medical industry, in the areas of medicines, medical devices, and medical treatment, including uses for receiving, containing, storing and/or dispensing, any of the following products, in any form known in the art: bodily fluids from humans and/or animals (e.g. amniotic fluid, aqueous humour, vitreous humour, bile, blood, blood plasma, blood serum, breast milk, cerebrospinal fluid, cerumen (earwax), chyle, chime, endolymph (and perilymph), ejaculate, runny feces, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, tears, sweat, vaginal secretion, vomit, urine, etc.); fluids for intravenous therapy to human or animal bodies (e.g. volume expanders (e.g. crystalloids and colloids), blood-based products including blood substitutes, buffer solutions, liquid-based medications (which can include pharmaceuticals), parenteral nutritional formulas (e.g. for intravenous feeding, wherein such formulas can include salts, glucose, amino acids, lipids, supplements, nutrients, and/or vitamins); other medicinal fluids for administering to human or animal bodies (e.g. medicines, medicaments, nutrients, nutraceuticals, pharmaceuticals, etc.) by any suitable method of administration (e.g. orally (in solid, liquid, or pill form), topically, intra-nasally, by inhalation, or rectally.

Further examples of products include those that are intended to be used across any and all industries that use internal combustion engines (such as the transportation industry, the power equipment industry, the power generation industry, etc.), including vehicles and/or parts or products for vehicles such as cars, trucks, automobiles, boats, aircraft, etc., containers useful for receiving, containing, storing, and/or dispensing, any of the following fluent products, in any form known in the art: engine oil, engine oil additives, fuel additives, brake fluids, transmission fluids, engine coolants, power steering fluids, windshield wiper fluids, products for vehicle care (e.g. for body, tires, wheels, windows, trims, upholsteries, etc.), as well as other fluids configured to clean, penetrate, degrease, lubricate, and/or protect one or more parts of any and all kinds of engines, power equipment, and/or transportation vehicles.

The products described herein can also be non-fluent products (or assembled products) including, but not limited to in any of the following categories: Baby Care products, including disposable wearable absorbent articles, diapers, training pants, infant and toddler care wipes, etc. and the like; Beauty Care products including applicators for applying compositions to human or animal hair, skin, and/or nails, etc. and the like; Home Care products including wipes and scrubbers for all kinds of cleaning applications and the like; Family Care products including wet or dry bath tissue, facial tissue, disposable handkerchiefs, disposable towels, wipes, etc. and the like; Feminine Care products including catamenial pads, incontinence pads, interlabial pads, panty liners, pessaries, sanitary napkins, tampons, tampon applicators, wipes, etc. and the like; Health Care products including oral care products such as oral cleaning devices, dental floss, flossing devices, toothbrushes, etc. and the like; Pet Care products including grooming aids, pet training aids, pet devices, pet toys, etc. and the like; Portable Power products including electrochemical cells, batteries, battery current interrupters, battery testers, battery chargers, battery charge monitoring equipment, battery charge/discharge rate controlling equipment, "smart" battery electronics, flashlights, etc. and the like; Small Appliance Products including hair removal appliances (including, e.g. electric foil shavers for men and women, charging and/or cleaning stations, electric hair trimmers, electric beard trimmers, electric epilator devices, cleaning fluid cartridges, shaving conditioner cartridges, shaving foils, and cutter blocks); oral care appliances (including, e.g., electric toothbrushes with accumulator or battery, refill brush heads, interdental cleaners, tongue cleaners, charging stations, electric oral irrigators, and irrigator clip on jets); small electric household appliances (including, e.g., coffee makers, water kettles, hand blenders, hand mixers, food processors, steam cookers, juicers, citrus presses, toasters, coffee or meat grinders, vacuum pumps, irons, steam pressure stations for irons and in general non electric attachments therefore, hair care appliances (including, e.g., electric hair driers, hair stylers, hair curlers, hair straighteners, cordless gas heated styler/irons and gas cartridges therefore, and air filter attachments); personal diagnostic appliances (including, e.g., blood pressure monitors, ear thermometers, and lens filters therefore); clock appliances and watch appliances (including, e.g., alarm clocks, travel alarm clocks combined with radios, wall clocks, wristwatches, and pocket calculators), etc. and the like.

In some cases, the term "products" may be further specified as excluding any one or more of the products, or categories of products, listed above.

The term "propellable", as used herein, means able to be propelled in any manner. Vehicles can be propellable, for example, by gravity, or by a propulsive force which may be mechanical, electrical, magnetic, or other form of propulsion.

The term "route", as used herein, refers to an ordered list of unit operation stations for an article transporting vehicle to visit and operations to be completed at such unit operation stations in order to create finished products.

The term "semi-autonomous", as used herein, refers to a process that has both automated operations and manual operations. For example, a production system may be automated with the exception of infeeding of materials (e.g., empty containers) and/or removing finished articles from the production line for packaging, one or both of which may be done manually.

The term "simultaneous", as used herein, not only means something that starts at the (exact) same time, but also something that may not start and/or end at the exact same time, but which takes place during the same time frame. One or more of the following may be specified to occur simultaneously in the systems and methods described herein: the routing of vehicles; the delivery of different vehicles to unit operation stations; the carrying out of operations at the same or different unit operation stations; the process of (or any steps in the process of) creating a plurality of (the same or different) finished products; and, in the case of fluent products, placing fluent compositions in the same type of container or in different types of containers.

The term "stream of products", as used herein, refers to a number of products produced one after another.

The term "system", as used herein with respect to the track, refers to a (single) network on which one or more article transporting vehicles can be routed to one or more unit operations. The tracks and paths in a system will, therefore, typically be joined (at least indirectly) to each other. In contrast, separate unconnected processing lines in the same building or facility, or in a different building or facility, would not be considered to comprise a system. Thus, two unconnected filling lines in the same building that are being operated to fill containers with different fluids would not be considered to comprise a system.

The terms "transformation", as used herein, includes physical, chemical, and biological changes to an article. Examples of transformations include, but are not limited to: assembling components of a product (joining at least two components together), loading, dispensing, filling, mixing, capping, sealing, decorating, labelling, emptying, unloading, heating, cooling, pasteurizing, fermenting, sterilizing, wrapping, rotating or inverting, printing, cutting, separating, pausing to allow mechanical settling or mechanical separation or chemical reaction, or etching. The term "transformation" does not include inspection of an article.

The term "unique", as used herein to modify the term "route", means the number, type, or sequence of unit operation stations or operations completed at the unit operation stations differs from that of another article transporting vehicle. The term "unique" does not require that the number, type, or sequence of unit operation stations or operations completed at the unit operation stations differ from that of all article transporting vehicles.

The term "unit operation station", as used herein, means a location where an article undergoes an operation which may be a transformation or an inspection. The types of transformations defined above may each be carried out at separate unit operation stations; or one or more transformations and/or inspections may be described as one operation that is carried out at a single unit operation station. In one non-limiting example of the latter for fluent products, the transformations of uncapping, filling, and capping could be carried out at a single filling/capping unit operation station.

All percentages and ratios of compositions are calculated by weight of the total composition, unless otherwise indicated.

Systems and methods for producing products based upon demand are disclosed.

The systems and methods can be used to produce any suitable type of product. Such products can comprise fluent products, assembled products, or any desired combinations thereof. Several non-limiting examples of systems and methods for producing fluent products and assembled products are provided below.

The systems and methods utilize an automated track system and a plurality of vehicles, at least some of which may be independently routable along the track system. The track system comprises a primary transport path and at least one secondary transport path. A plurality of articles are provided which comprise at least a first article and a second article. The first and second articles comprise components of the products to be produced. At least some of the vehicles may be independently routable along the track system to deliver the first and second articles to at least one of at least two unit operation stations.

In connection with the views and examples of FIGS. 1-9 (including FIGS. 1A to 1L), wherein like numbers indicate the same or corresponding elements throughout the views, a track system 20 is shown in FIG. 1 to include a track 22 and a plurality of vehicles 24 that are propellable along the track 22. The track system 20 can comprise any suitable type of system. In some embodiments, the track system 20 can be a linear synchronous motor (LSM) based system that facilitates propulsion of the vehicles 24 along the track 22 using electromagnetic force (EMF). In other embodiments, the track system can be a system in which the vehicles are propelled in some other manner, such as by individual servo motors. In the embodiment shown, however the vehicles are propelled by a linear synchronous motor (LSM) based system.

Figure 2:
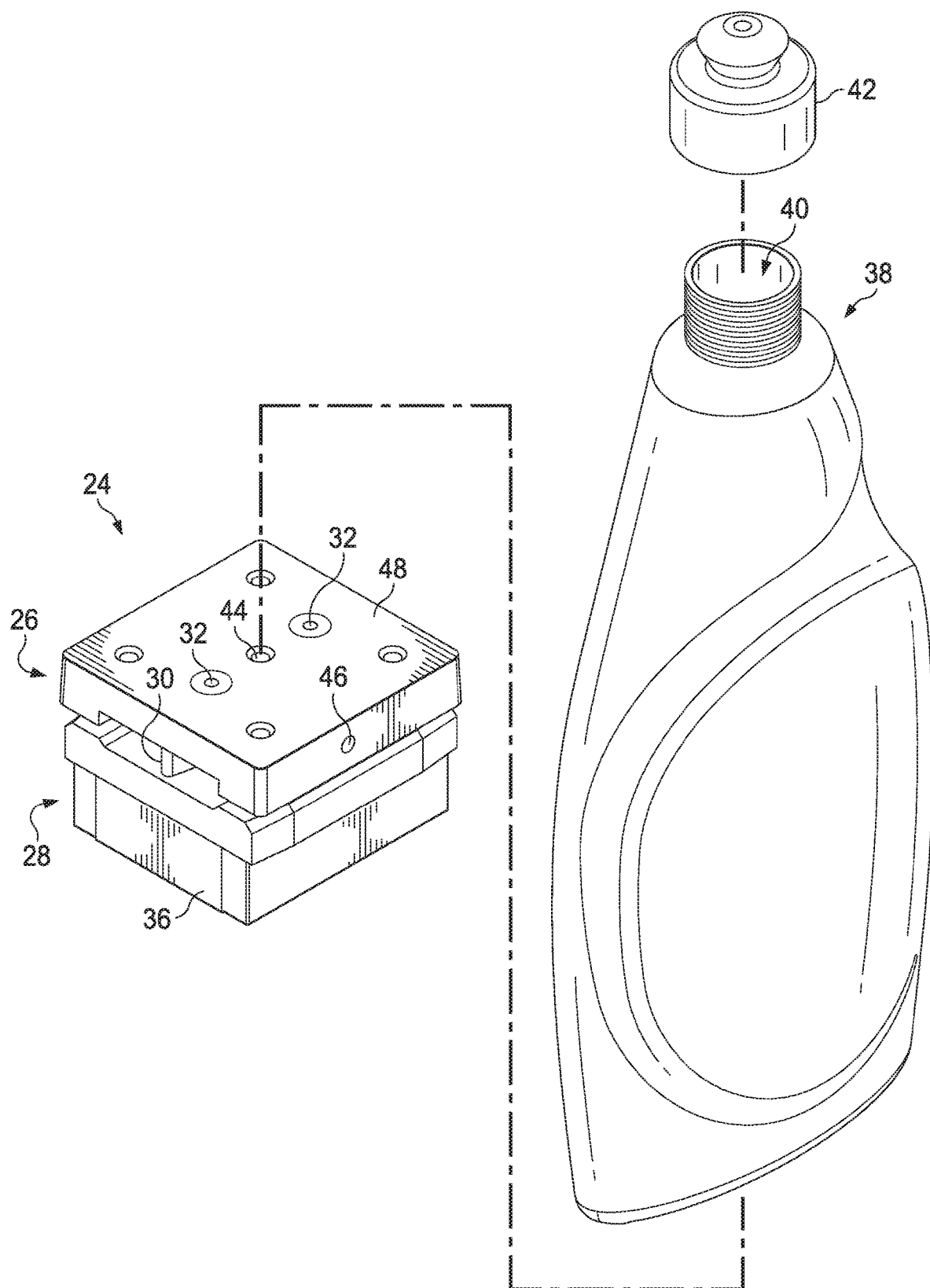
FIG. 2 is an exploded isometric view depicting a vehicle for the track system of FIG. 1 associated with a container.

One of the vehicles 24 is illustrated in FIG. 2 and is shown to include an upper portion 26 and a lower portion 28 that are coupled together by a central rib 30. In one embodiment, the upper and lower portions 26, 28 can be releasably coupled together with fasteners 32. The upper and lower portions 26, 28 can be spaced from each other by the central rib 30. As illustrated in FIG. 3, the upper portion 26 can include a wear surface or running surface 34 that is adjacent to the central rib 30 and faces the lower portion 28. The lower portion 28 can include a magnet 36 that facilitates LSM propulsion of the vehicle 24 along the track 22. In one embodiment, the magnet 36 can be a magnet array having a central magnet that is formed of a south pole and sandwiched between two ends that are each formed as a north pole. It is to be appreciated that the vehicles 24 can be any of a variety of suitable alternative arrangements for facilitating LSM propulsion along a track system. Some examples of these alternative arrangements are described in U.S. Pat. Nos. 6,011,508; 6,101,952; 6,499,701; 6,578,495; 6,781,524; 6,917,136; 6,983,701; 7,448,327; 7,458,454; and 9,032,880.

A container 38 can be provided on the vehicle 24 for routing of the container 38 around the track 22 to facilitate filling of the container 38 with fluent material and/or performing other operations on the container and/or its contents. The container 38 can define at least one opening 40 for receiving and dispensing fluent material. When it is said that the container has an opening 40, embodiments with multiple openings (such as multi-compartment containers with separate closures or a single closure, press-tab vent and dispenser containers, and the like) are also included. There can be multiple containers on a single vehicle, or on different vehicles.

When there is more than one container on the track system 20, the containers 24 may be all of the same type or geometric form (that is, the containers are of the same size, shape, appearance, and have the same volume), or any of the containers may differ from the other in one or more of size, shape, appearance, or volume. When reference is made to the "shape" of a container, it is understood that this means the exterior shape of the container. When reference is made to the "volume" of a container, it is understood that this means the interior volume of the container. The multiple containers can be identified as first, second, third, etc. containers. On the track system at any given time, more than two containers may differ and/or hold fluent materials that differ from other containers. In some embodiments, there may be 3, 4, 5, 6, 7, 8, 9, 10, or more, different types of containers, or groups of different types of containers (that may differ from each other in container type and/or in the fluent materials contained therein) that are disposed along the track system at any given time. (The same applies to different types of articles in the case of assembled products described below.)

A closure 42 can be joined to the container to close the opening 40 until it is desired to dispense the product from the container (that is, the closure "selectively seals" the opening). Closures include, but are not limited to: caps, such as snap caps, threaded-screw caps, caps comprising multiple parts like a hinge and top or a transition spout, drain-back caps, glued-on caps (such as those used on some laundry detergent containers with spouts), caps that serve metering functions like oral rinse caps, pumps or triggers, and aerosol nozzles. The closures have a shape, a size, and appearance. Similarly to the containers, the closures may all be of the same type, or any of the closures may differ from others in one or more of type, shape, size, or appearance. The multiple closures can be identified as first, second, third, etc. closures.

The different vehicles 24 on the track at any given time may be the same or different in size and/or type. In some embodiments, the vehicles 24 may comprise vehicles known as "pucks" that are sold by MagneMotion of Devens, Mass., U.S.A. The vehicles 24 can further comprise a holder for holding an article (such as container 38). The holder can be of any suitable type or configuration. The holders can comprise mechanical holders of any suitable size and configuration. In other embodiments, the holders can comprise a unique holder that operates by vacuum. The different vehicles 24 on the track at any given time may have holders that are the same or different in size and/or type.

In one embodiment, as shown in FIG. 2, the container 38 can be releasably secured to the vehicle 24 by a vacuum holder via a vacuum port 44 defined by the upper portion 26 of the vehicle 24. In such an embodiment, when the container 38 is placed on the upper portion 26 of the vehicle 24, a vacuum can be drawn on the vacuum port 44 by drawing a vacuum on a primary port 46. When the container 38 is provided over the vacuum port 44 and a vacuum is drawn on the primary port 46, the vacuum can secure the container 38 to the vehicle 24. The primary port 46 can include a valve, such as a Schrader valve (not shown) that selectively fluidically isolates the primary port 46 from the vacuum port 44 such that once a vacuum is drawn on the container 38, the valve prevents the vacuum from releasing until the valve is subsequently actuated.

In some embodiments, an upper surface 48 of the upper portion 26 can be formed of an elastomeric or other similar material that encourages an effective seal between the container 38 and the upper surface 48. Such a vehicle which comprises a vacuum holder is described in a U.S. patent application filed on the same day as the present application, which claims the benefit of provisional U.S. Patent Application Ser. No. 62/385,324, filed on Sep. 9, 2016.

It should be understood that although part of the vehicle 24 is described herein as the upper portion 26, this portion of the vehicle (which comprises a retaining surface for the container), and need not always be oriented upward. The retaining surface can be oriented in any suitable direction, including downward (upside down) or sideways at any suitable stage of the processes described herein. (Of course, a container with fluent material therein and its opening unsealed, will typically not be conveyed in an upside down condition, but an empty container or a closed container, or a closure for a container, could be conveyed upside down or sideways.)

In some embodiments, a vehicle 24 with a vacuum holder may further comprise a gauge or sensor that measures the strength of the vacuum, for example in pressure units of psig or kPa, to ensure that the vacuum is of sufficient strength to secure the container. Target values may be placed upon the vacuum strength so that a reading which is outside those target values can be used to signal that the container 38 is not sufficiently secured to the vehicle 24. The vacuum holder may further comprise a communication means between the gauge or sensor that communicates with the system so that any container that is not sufficiently secured to its vehicle may be identified remotely and routed to an inspection and/or rejection station or to a vacuum station where the vacuum may be re-charged.

The containers can be any of a variety of configurations and can be used across a variety of industries to hold a variety of products. For example, any embodiment of containers, as described herein, may be used across the consumer products industry and the industrial products industry, wherein said containers contain a fluent product. The containers may be filled in one or multiple filling operations to contain, after partial or complete intended filling, a portion, or multiple ingredients of, or all ingredients of, a finished product.

The containers can be formed of any of a variety of suitable materials, such as, for example, a polymeric composition. The polymeric composition can be formed (e.g., molded into various articles such as containers, formed into one or more pieces of film that are joined together to form a container, or otherwise formed) into containers.

In some cases (such as to form bottles), the composition may be extrusion blow molded or injection molded. Typically, high density polyethylene (HDPE) is extrusion blow molded and polyethylene terephthalate (PET) is injection stretch blow molded. A completely assembled container may comprise one or more elements which include, but are not limited to a container, a closure, a nozzle, a drain-back feature, and/or a handle.

Examples of containers that are formed from one or more pieces of film to form flexible containers, and methods of making the same, are described in the following U.S. Patent Publications and applications: US 2013/0292353; US 2013/0292415; US 2014/0033654; US 2015/0122840; US 2015/0125099; US 2015/0121810; US 2016/0325518; US 2017/0001782; and U.S. patent application Ser. No. 15/466,901 (The Procter & Gamble Flexible Inflatable Container patent publications).

The vehicles 24 can be configured to accommodate certain types of articles (such as containers). As such, different vehicle types can be provided on the track 22 to allow for simultaneous routing of different types of articles along the track 22. The vehicles 24 are also not limited to conveying the articles set forth above. In some cases, the vehicles 24 can be used for other purposes which may include, but are not limited to: delivering raw materials to a unit operation station; and delivering tools such as changeover tools and the like to various locations around the track system. For example, a vehicle may be used to carry a tool that removes a roll of labels from a decoration unit operation station prior to replacing the same.

Referring again to FIG. 1, the track 22 can be formed by a plurality of straight portions 50a, a plurality of curved portions 50b, and a plurality of transition portions 50c. One of the straight portions 50a is illustrated in FIG. 4 and is shown to include a pair of rails 52a that are coupled with a base 54a. The base 54a can include a running surface 56a and a plurality of conductive propulsion coils 58a disposed beneath the running surface 56a. The conductive propulsion coils facilitate routing of the vehicles along the track 22 in a direction of travel. Each conductive propulsion coil defines a common axis and comprises a conductor having one or more turns that are disposed about the common axis. The respective common axes of the plurality of conductive propulsion coils may be substantially parallel with one another and substantially orthogonal to the desired direction of travel. The plurality of coils 58a can be mounted on an underlying substrate 60a, which in some embodiments can be a printed circuit board (PCB). The plurality of coils 58a can be electrically coupled with a power source (not shown) that can facilitate energization of the power coils 58a to propel the vehicles 24 along the track 22. The propulsion coils 58a may be disposed on at least one of the opposing sides of the magnet of a vehicle to facilitate propulsion of the vehicle along the track system. A control system 62 (FIG. 1) can control the energization of the coils 58a to control the propulsion of the vehicles 24 along the track 22. In one embodiment, each coil 58a can be electrically coupled to a transistor (e.g., a MOSFET or IGBT) which is coupled with an output of an "H-bridge". The control system 62 can control the propulsion of each of the vehicles 24 along the track 22 through operation of the H-bridge which controls the amount and direction of current in each coil 58a. Hall effect sensors (not shown) can be distributed along the base 54a to facilitate detection of the magnetic field produced by the vehicles 24 on the track 22. The control system 62 can be in electrical communication with the Hall effect sensors to facilitate selective control of various propulsion characteristics of the vehicles 24 (e.g., speed, direction, position).

Each rail 52a can have an upper portion 64a and a side portion 66a that cooperate together to form an L-shape when viewed from the end. Each of the rails 52a are coupled at the side portions 66a to the base 54a with fasteners 68a. When each vehicle 24 is provided on the track 22, the upper portions 64a of each of the rails 52a can extend into the space between the upper and lower portions 26, 28 of the vehicle 24 such that the wear surface 34 of the upper portion 26 of the vehicle 24 can ride on the upper portion 64a of the rails 52a. In alternative embodiments, the wear surface can have wheels extending therefrom, and the wheels can travel over the upper portion 64a of the rails 52a. The side portions 66a of each of the rails 52a can extend along opposite sides of the lower portion 28 of the vehicle 24. During operation of the vehicles 24 along the track 22, the rails 52a can facilitate guidance of the vehicles 24 along the running surface 56a while suspending the vehicle 24 above the running surface 56a enough to allow the vehicles 24 to be magnetically propelled along the track 22.

Figure 5:
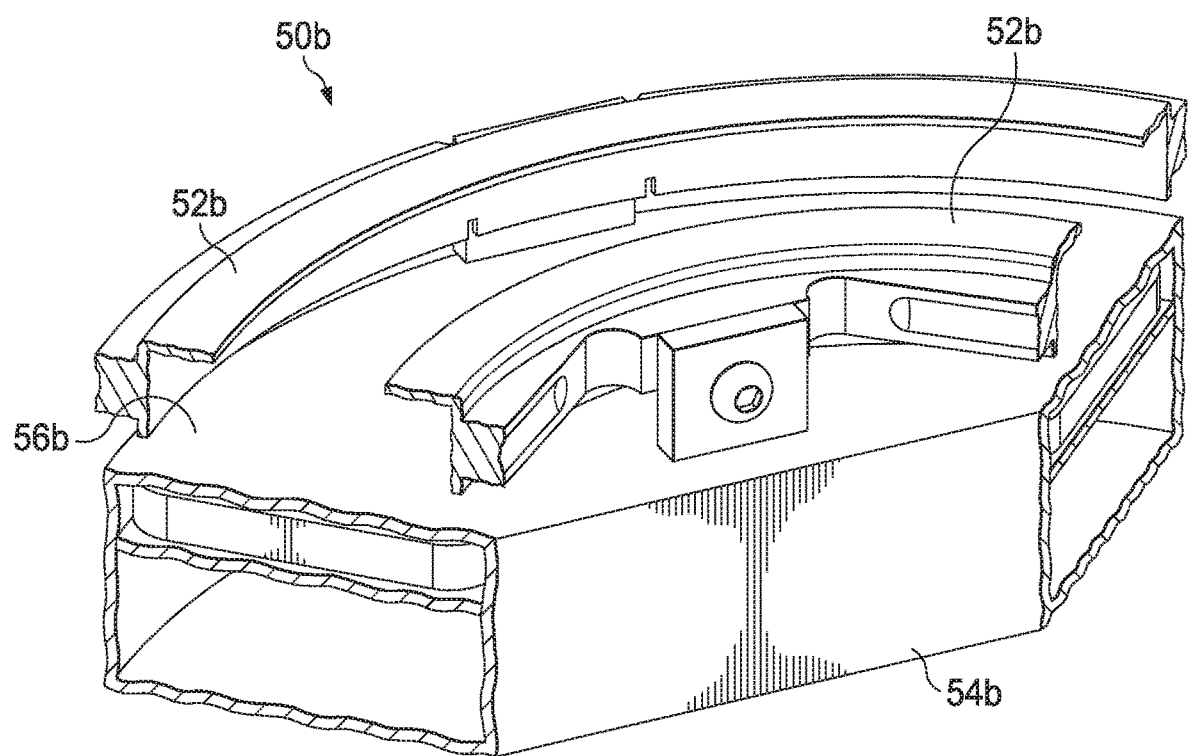
FIG. 5 is an isometric view depicting a curved portion of the track of FIG. 1.

Referring now to FIG. 5, one of the curved portions 50b is illustrated, which is similar to, or the same as in many respects as the straight portion 50a illustrated in FIG. 4. For example, the curved portion 50b can include a pair of rails 52b that are coupled with a base 54b. The base 54b can include a running surface 56b and a plurality of coils (not shown) that are disposed beneath the running surface 56b. However, the curved portion 50b can be angled by about 90 degrees to facilitate turning of the vehicles 24 along the track 22.

Figure 6:
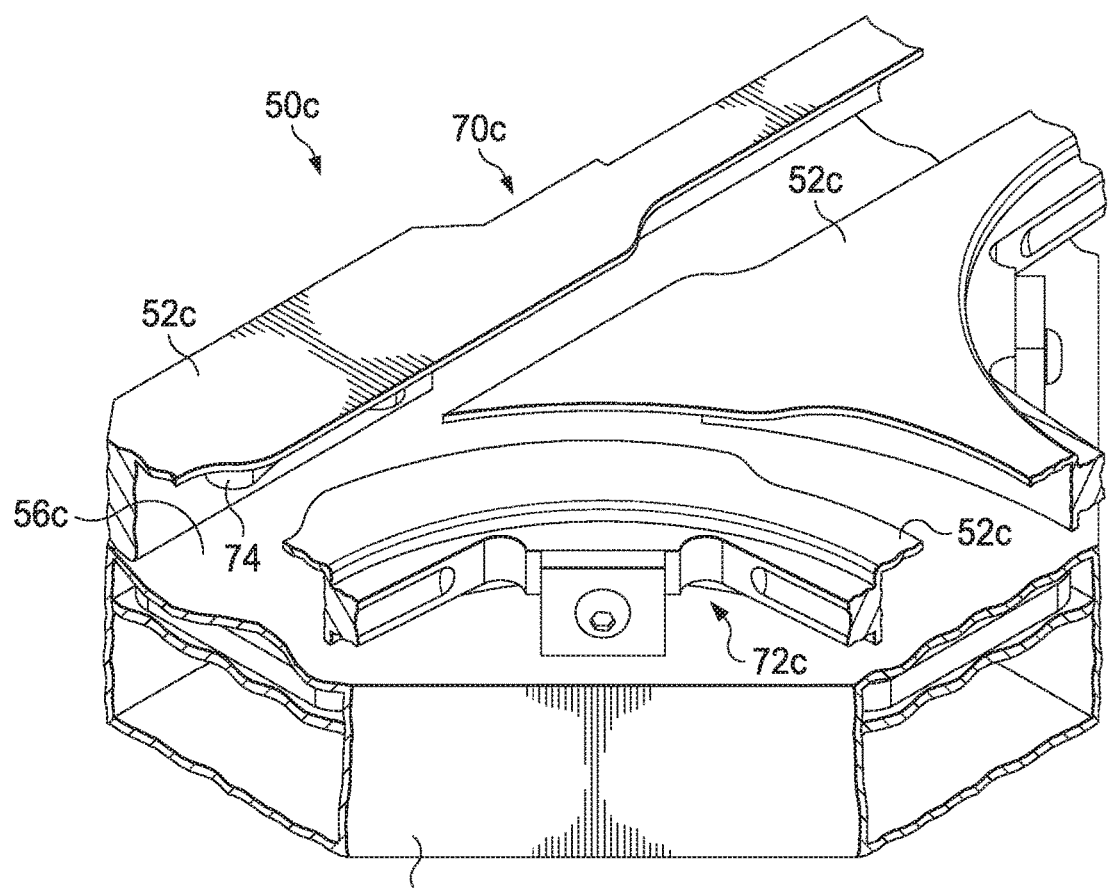
FIG. 6 is an isometric view depicting a transition portion of the track of FIG. 1.

Referring now to FIG. 6, one of the transition portions 50c is illustrated, which is similar to, or the same as in many respects as the straight portion 50a illustrated in FIG. 4. For example, the transition portion 50c can include a plurality of rails 52c that are coupled with a base 54c. The base 54c can include a running surface 56c and a plurality of coils (not shown) that are disposed beneath the running surface 56c. However, the transition portion 50c can have a straight portion 70c and an angled portion 72c that facilitate routing of the vehicles 24 in different directions. In one embodiment, the transition portion 50c can include a flipper member 74 that is pivotable between a retracted position (shown in FIG. 6) and an extended position (not shown). When the flipper member 74 is in the retracted position, a passing vehicle 24 will travel along the straight portion 70c of the transition portion 50c. When the flipper member 74 is in the extended position, a passing vehicle 24 will be routed from the straight portion 70c to the angled portion 72c. The control system 62 can be in electrical communication with the flipper member 74 to facilitate selective control of the routing of passing vehicles 24 to either the straight portion 70c or the angled portion 72c. It is to be appreciated that any of a variety of suitable alternative ingress switches and/or egress switches can be employed to facilitate selective routing of a vehicle between the straight portion 70c and the angled portion 72c. Some examples of these alternative arrangements are described in U.S. Pat. No. 9,032,880 and U.S. Pat. Pub. No. 2007/0044676.

Referring again to FIG. 1, the track 22 can include a primary transport portion 76 and at least one (alternatively, a plurality of) secondary transport portions 78 that are provided around, and extend from, the primary transport portion 76. The primary transport portion 76 can define a primary path P1 for the vehicles 24. Each of the secondary transport portions 78 can define a secondary path P2 for the vehicles 24 that intersects the primary path P1 at an ingress location 80 and an egress location 82. The vehicles 24 can enter and exit each of the secondary transport portions 78 at the associated ingress and egress locations 80, 82, respectively. The vehicles 24 may, and will often, depart from the primary transport portion 76 to another portion of the track, which may be evidenced by a change in the direction of curvature of the track (e.g., secondary transport portions 78) to have an operation performed on an article on the vehicle. The operations can, and will often, be performed in a sequence (or in a non-sequential manner) relative to other articles that is different from the typical sequence in conventional manufacturing processes in which there is a step-by-step series of operations performed on a succession of articles. The track system 20 is, thus, distinguishable from a typical conveyor system in which the articles being manufactured travel along a single conveyor and have steps in the manufacture performed successively from the upstream end of the conveyor to the downstream end.

The vehicles 24 can travel clockwise or counter-clockwise around the primary transport portion 76 and the secondary transport portion(s) 78. In some embodiments, it is possible for some of the vehicles 24 to travel clockwise, and some of the vehicles to simultaneously travel counter-clockwise for a portion of their routes or vice versa, but care must be taken so travel in opposing directions does not result in a collision between the vehicles. In some embodiments, it is also possible for vehicles to travel in opposite directions (or reversibly) on the same section of track, but care must again be taken so travel in opposing directions does not result in a collision between the vehicles.

Depending on the desired throughput of the track system, it may be desirable to incorporate additional primary transport loops to increase the overall throughput of the system. For example, as shown in FIG. 1F, in some embodiments, it is possible to incorporate an additional primary transport loop "ring" 76A within another primary transport loop 76.

Figure 1A:
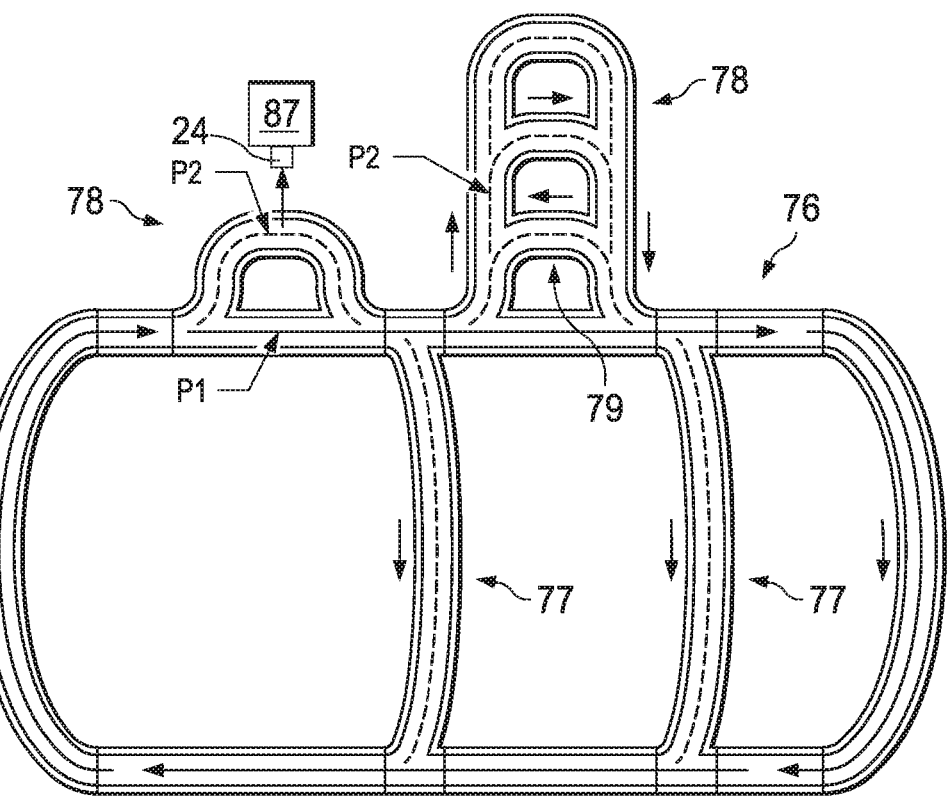
FIG. 1A is a schematic view of a track system having an alternative configuration.
Figure 1B:
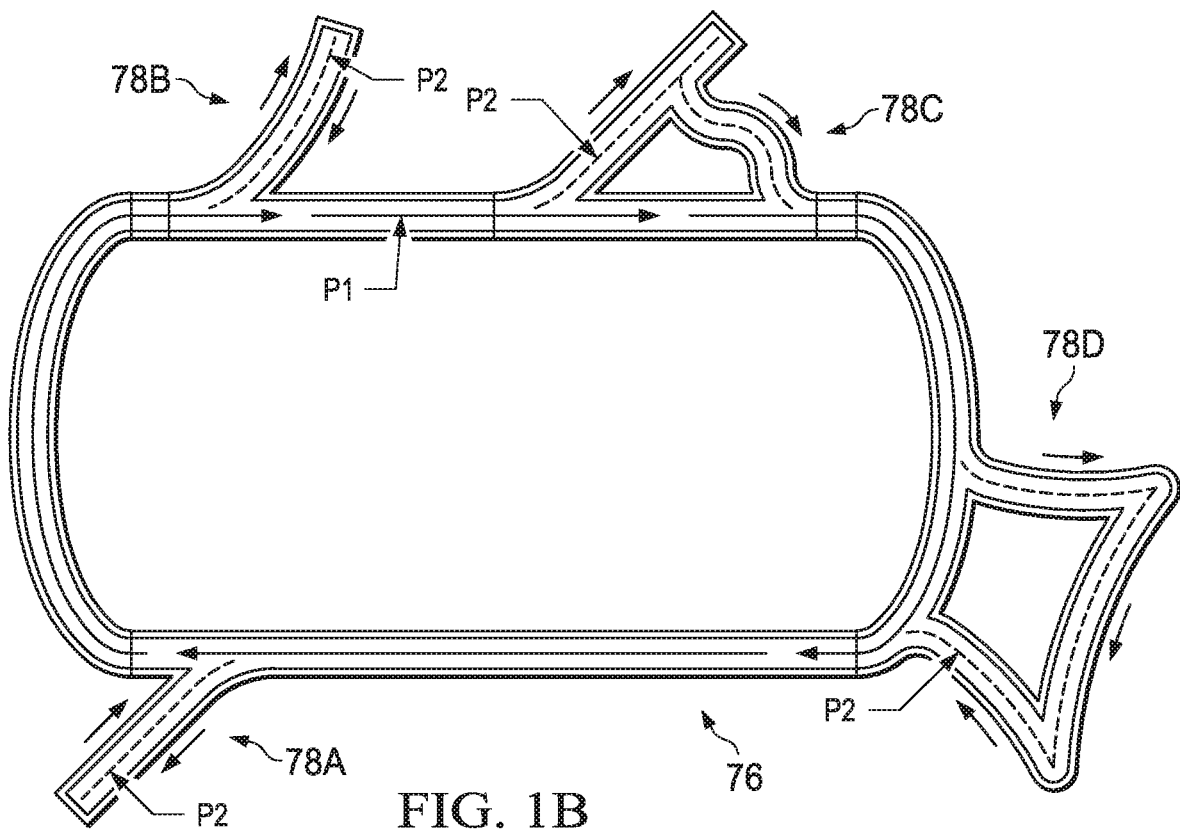
FIG. 1B is a schematic view of a track system having another alternative configuration.
Figure 1C:
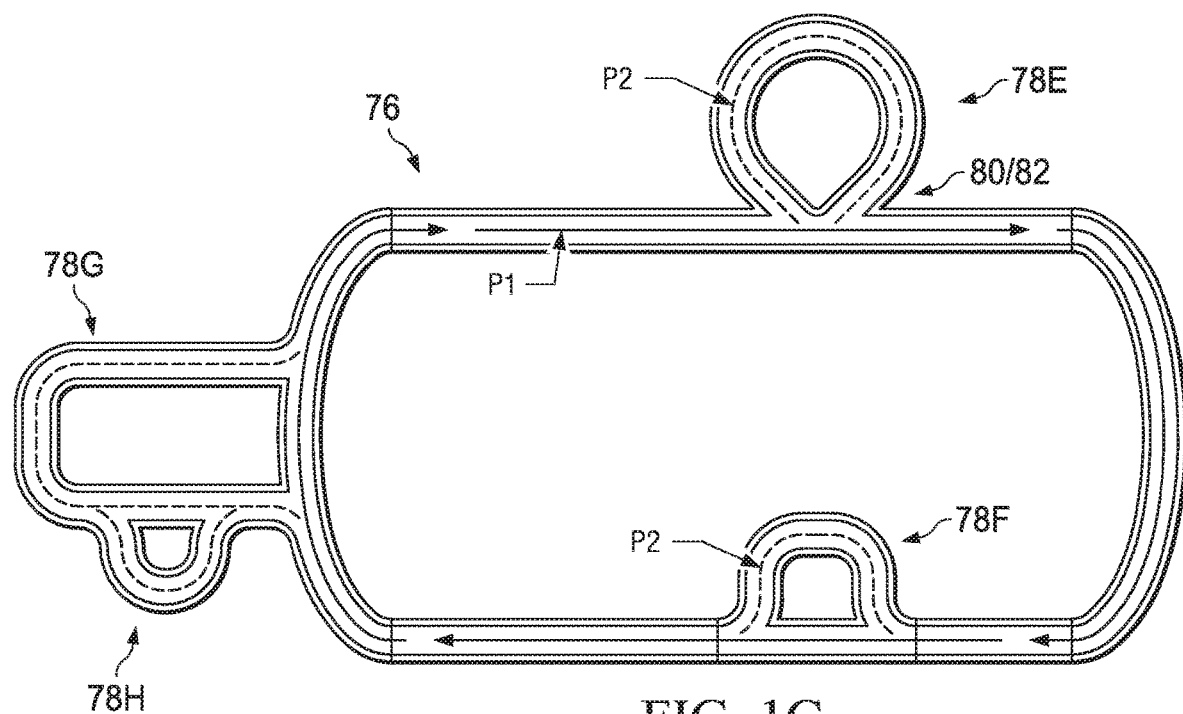
FIG. 1C is a schematic view of a track system having another alternative configuration.
Figure 1D:
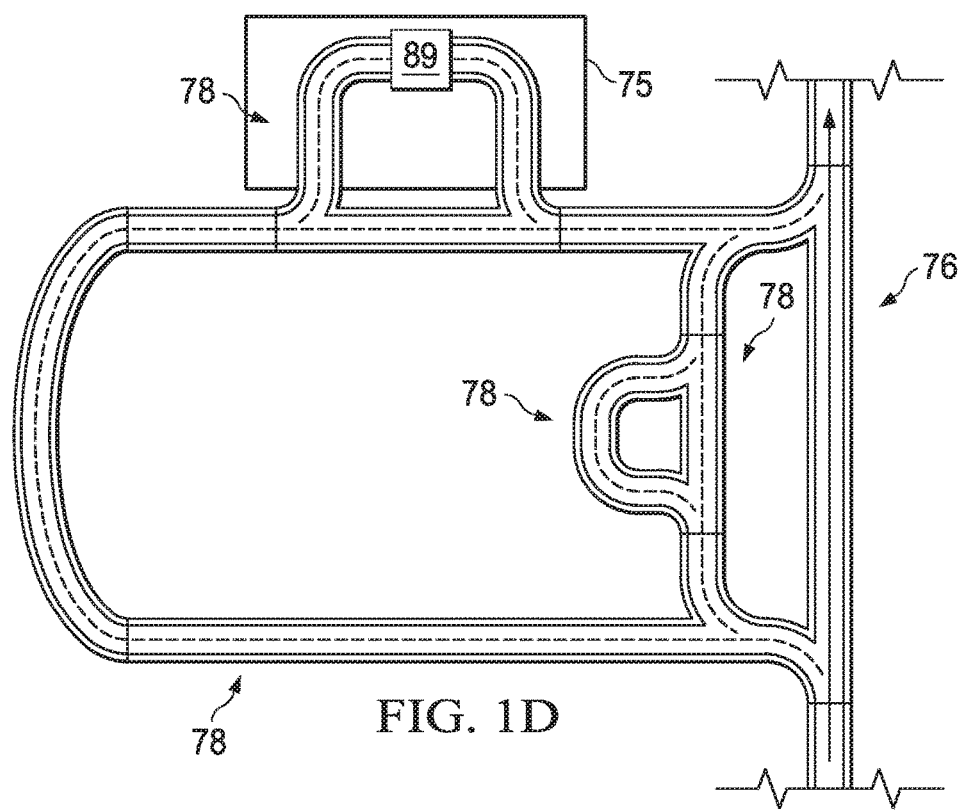
FIG. 1D is a fragmented schematic view of a track system having another alternative configuration.
Figure 1E:
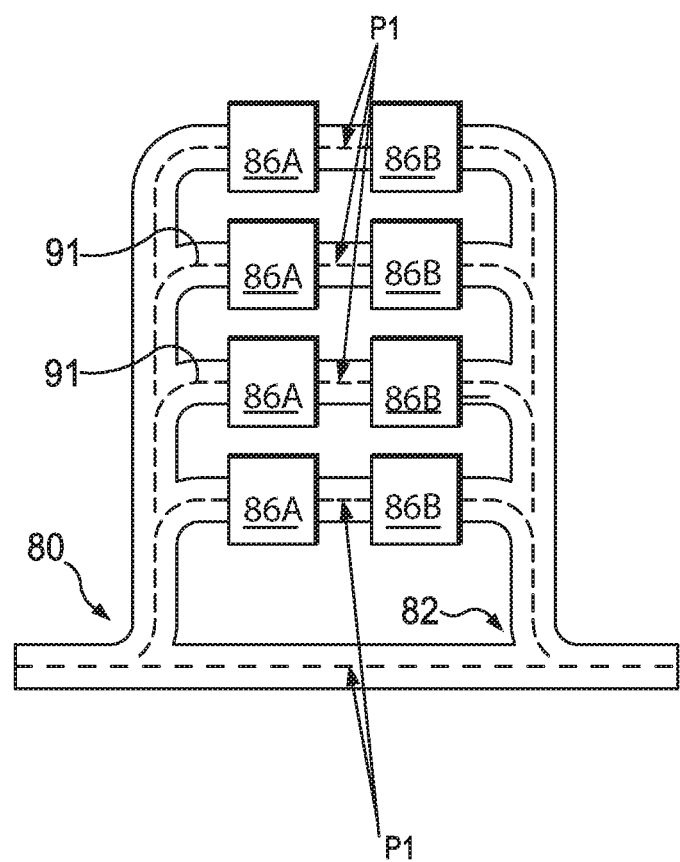
FIG. 1E is a fragmented schematic view of a portion of a track having multiple interface points between unit operation stations.
Figure 1F:
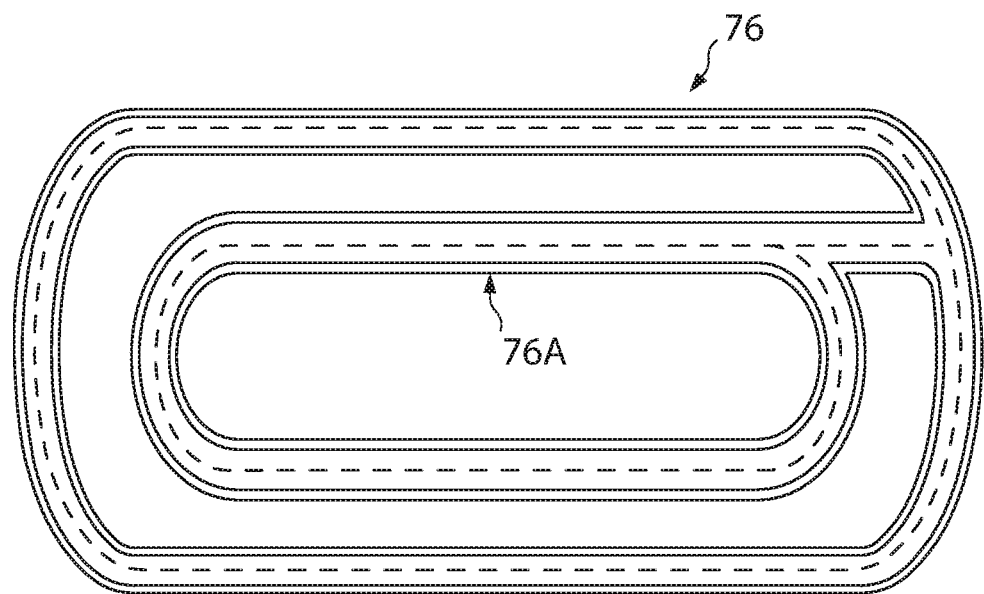
FIG. 1F is a schematic view of a track system having a plurality of primary transport loops.
Figure 1G:
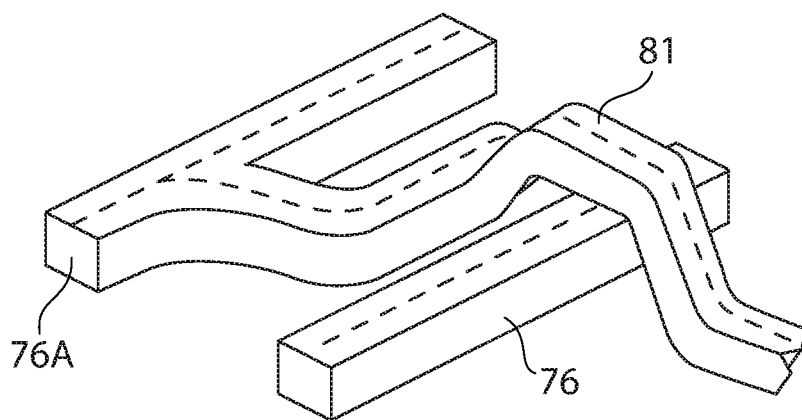
FIG. 1G is a fragmented schematic view of a portion of a track system having adjacent portions of track and an overpass bridging the outer track.

As shown in FIG. 1G, it may be desirable to link the multiple track sections to each other and/or to the various unit operations via one or more overpasses and/or underpasses. The overpasses and underpasses allow portions of the track to cross each other without requiring a connective intersection therebetween. Although FIG. 1G shows an overpass 81 being used to provide a path from one primary transport loop 76A that crosses over another primary transport loop 76, such overpasses and underpasses can be used to cross between any two portions of a track including primary transport loops 76 and secondary transport portions.

Figure 1H:
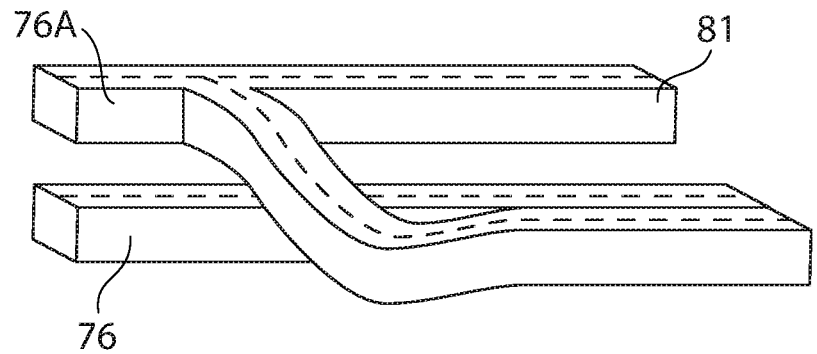
FIG. 1H is a schematic view of a portion of a track system having portions of track that are disposed in different planes.

In other embodiments such as shown in FIG. 1H, there can be additional primary transport loops 76A vertically arranged over another primary transport loop 76. The primary transport loops 76 and 76A may have a common footprint, though the various primary transport loops have varying vertical elevations. In other cases, the primary transport loops 76 and 76A need not have a common footprint. FIG. 1H shows an example of portions of a track that are vertically arranged with respect to each other which are connected by an inclined on ramp or off ramp. It is also possible for secondary transport portions 78 to be similarly vertically arranged with respect to each other; or, with respect to primary transport loops 76. Any of these sections of track can similarly be connected by on ramps and/or off ramps.

Figure 1I:
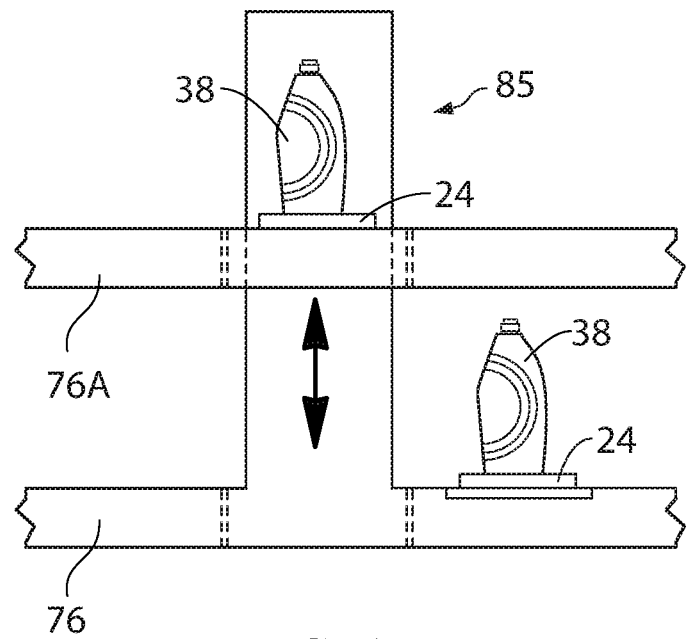
FIG. 1I is a fragmented schematic view of a portion of a track system having portions of track that are disposed in different planes and an elevator to transport articles therebetween.

As shown in FIG. 1I, the system may also include an elevator for moving vehicles with or without articles there substantially vertically from one portion of track to an upper or lower portion of track.

Figure 1J:
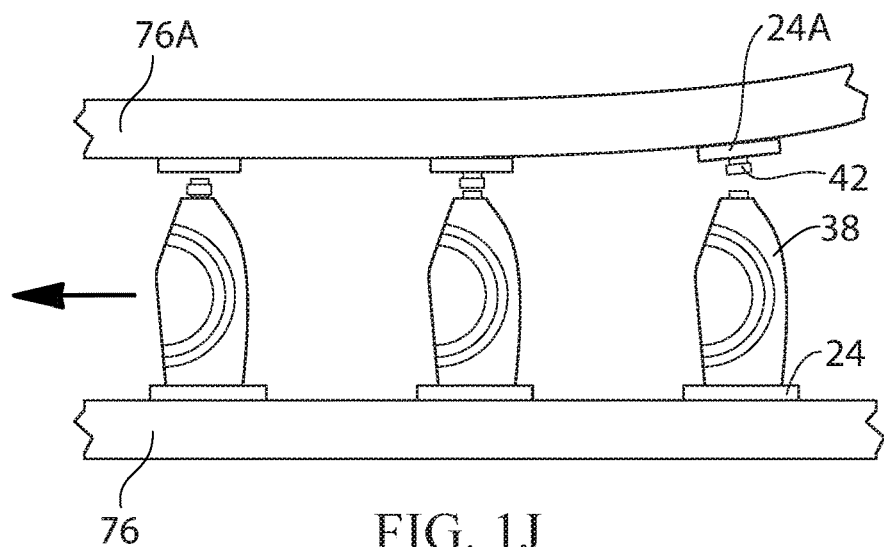
FIG. 1J is a fragmented schematic view of a portion of a track system having portions of track that are disposed in different planes, wherein the lower portion of track is used to convey containers, and the upper portion of track is used to deliver closures for the containers.

Additionally, the track can be formed by a plurality of inclined or declined portions. In addition, inclined or declined track portions may be combined with inverted track portions so that two separate vehicles may approach one another from above and/or below, allowing the articles carried thereon to approach one another and/or be connected. Such a configuration may be advantageous, for example as shown in FIG. 1J, when applying a closure 42 to a container 38 where, the container may be secured to a vehicle 24 in its upright configuration and the closure 42 may be secured to a vehicle 24A in an inverted configuration, and a decline in the track portion 76A carrying the vehicle 24A transporting the closure 42 may be made to approach and contact the container 38, thereby sealing the container.

In still other embodiments, the track can be formed by one or more inverted portions such as a cork-screw or loop-the-loop portion that results in inverting the vehicles and their associated articles. This can be done for mixing fluent compositions, or any other suitable purpose.

As shown in FIG. 1, each of the secondary transport portions 78 can have one or more unit operation stations disposed therealong. These unit operation station(s) can be any of the types of unit operation stations described in the above definition of "unit operation stations" (and the definitions of "transformation" and "inspection" included therein). There can be any suitable number of unit operation stations. Generally, there will be two or more unit operation stations (e.g., 2, 3, 4, 5, . . . up to 100, or more). The unit operation stations may be in any suitable arrangement along the secondary transport portions 78. The unit operation stations can be arranged with a single unit operation station along one or more of the secondary transport portions, or a group of unit operation stations along one or more of the secondary transport portions.

Unit operation stations can include, but are not limited to: loading articles onto vehicles; unloading articles or products from vehicles; filling (such as filling a container with one or more fluent products); capping; uncapping; inspecting; decorating; mixing; assembling (such as assembling components of an article); forming all or a portion of a container (e.g., forming a flexible container from film); bringing together components of a container; and/or components of a container closure; maintenance (that is, performing maintenance on vehicles, or other components of the system);

shrink wrapping; weighing; and vacuum application or discharge. If desired, the function of any two or more unit operations can be combined at a single unit operation station (e.g., filling and capping). The unit operation stations can optionally further comprise one or more additional mechanisms (including, but not limited to sensors) that perform one or more additional operations that are suitable or necessary for carrying out the desired process. In addition, it may be desired to exclude one or more of the foregoing types of unit operations and/or mechanisms. Operations at a given unit operation station may be carried out automatically by any suitable type of mechanism. Alternatively, any operation at a given unit operation station can be carried out manually. Any of these unit operation stations may be described as a unit operation station preceded by the particular operation performed (e.g., loading unit operation station).

As noted above, there can be a vacuum application station (or simply "vacuum station") for drawing a vacuum to hold an article to a vacuum holder (such as a vacuum holder vehicle). There can also be a vacuum recharge station for drawing additional vacuum, if needed to account for any reduction in vacuum holding the article over time. In addition, there can be a vacuum discharge station for releasing the vacuum that is holding an article to a vehicle so that the article can be removed from the vehicle. Such a vacuum discharge station can be a separate station, or it can be a part of another station including, but not limited to a vacuum station.

FIG. 1 shows one non-limiting embodiment of an arrangement of unit operation stations on the secondary transport portions 78. In the embodiment shown in FIG. 1, each of the secondary transport portions 78 comprises one of a plurality of (container) loading stations 84, a plurality of combined filling/capping stations 86, a plurality of decorating stations 88, or a plurality of unloading stations 90 (e.g., collectively "the unit operation stations"). In this embodiment, each of the unit operation stations 84, 86, 88, 90 located at a particular secondary transport portion 78 can be disposed along different unit transport segments 91 that are arranged in parallel. The vehicles 24 can be selectively routed among the secondary transport portions 78 to facilitate bottling of fluent material within a plurality of the containers 38 (and in other embodiments, to carry out the manufacture of assembly of assembled products).

When a vehicle 24 is empty (i.e., devoid of a container 38), the vehicle 24 can first be routed to one of the loading stations 84 where an empty container 38 is loaded onto the vehicle 24. The vehicle 24 can then route the empty container 38 to one of the filling/capping stations 86 where it is filled with fluent material and sealed with one of the closures 40. The vehicle 24 can then route the container 38 to one of the decoration stations 88 to have a decoration applied thereto, and can then route the container 38 to one of the unloading stations 90 where the filled container 38 can be removed from the vehicle 24 for loading into packaging.

It is to be appreciated that there can be significantly more vehicles 24 on the track 22 than are illustrated in FIG. 1. There can also be significantly more vehicles 24 than unit operation stations 84, 86, 88, 90. Each of the vehicles 24 may be independently routable along the track 22 to facilitate simultaneous delivery of at least some of the containers 38 to different ones of the unit operation stations 84, 86, 88, 90. The unit transport segments 91 in the embodiment shown in FIG. 1 can have the appearance of rungs on a ladder. The unit transport segments 91 can have a length that is sufficient to simultaneously accommodate a plurality of vehicles 24. The different unit transport segments 91 can have the same lengths, or alternatively, different lengths. As such, multiple vehicles 24 can be queued on the unit transport segments 91 awaiting delivery to the associated unit operation station 84, 86, 88, 90. Of course, vehicles can also wait on the side rails of the ladder-like structures, but in some cases, this may lead to vehicles blocking other vehicles from reaching downstream unit transport segments 91.

When the vehicles 24 are not stationed at one of the unit operation stations 84, 86, 88, 90, at least one (or more, e.g., 2, 3, 4, 5, . . . up to 100, or more) of the vehicles 24 can continuously circulate around the primary transport portion 76, thus bypassing the secondary transport portions 78 while waiting to be diverted thereto. The primary path P1 can be in the form of a closed loop to facilitate the circulation of the vehicles 24. The primary path P1 may also be described as circuital or continuous. The primary path P1 can be of any suitable configuration. Suitable configurations for the primary path P1 include, but are not limited to: circular paths, elliptical paths, or paths that comprises both linear portions and curvilinear portions. Non-limiting examples of the latter types of paths include: race track configured paths, generally rectangular paths with rounded corners (as shown in FIG. 1), and other closed loop paths. The primary path P1, of course, is not closed to vehicles entering or leaving the primary path, since it does have ingress and egress portions for container-loaded vehicles to be diverted therefrom onto the secondary paths P2.

In some cases, as shown in FIG. 1A, the primary path P1 may further comprise one or more sub-loops 77 that are disposed inside of the main closed loop of the primary transport portion 76, and form a path between portions of the main closed loop. The sub-loop 77 may form a path between opposing portions of the main closed loop 76. However, sub-loops 77 may alternatively form a path between non-opposing portions of the main closed loop 76. There are, of course, ingress and egress portions to the sub-loop(s). The sub-loops 77 provide a path for at least some of the container-loaded vehicles to recirculate without traveling completely around the closed loop of the primary path P1.

There can be any suitable number of secondary paths P2 (e.g., 1, 2, 3, 4, 5, . . . up to 100, or more). In some cases, a single secondary path having a ladder configuration (described below), with two rungs may be sufficient. Generally, there will be two or more secondary paths (in the case of fluent products, for example, at least one for filling and one for unloading). When there is more than one secondary path P2, these can be referred to as first, second, third, etc. secondary paths. Similarly, the ingress locations for the secondary paths may be referred to as a first ingress and egress location for the first secondary path; a second ingress and egress location for the second secondary path, etc. Although as shown in FIG. 1, the different secondary paths 78 all have a single type of unit operation station disposed therealong, this is not a requirement. In other embodiments, the types of unit operation stations disposed along one or more different secondary paths 78 may differ. In addition, in some cases a single type of unit operation station can be disposed along more than one secondary path.

The secondary paths P2 can be of any suitable configuration. The secondary paths P2 may be of the same configurations as each other, or of different configurations. If there are more than two secondary paths P2, two of the secondary paths may have the same configuration, and at least one secondary path may have a different configuration. Suitable configurations for the secondary path P2 include, but are not limited to: linear paths, curvilinear paths, or in a path that comprises both linear portions and curvilinear portions.

There are virtually an unlimited number of possible secondary transport portion (and secondary path) configurations. FIGS. 1A to 1D show several of these. An example of a linear path is one such as secondary transport portion 78A shown in FIG. 1B in which the secondary path P2 forms a linear segment that is joined to the primary path P1 at a combined ingress/egress location. The vehicle loaded with an article (such as a container) can depart from the primary path P1 to enter such a secondary path P2, and then can re-trace its movement along the linear secondary path P2 to re-enter the primary path P1. Non-limiting examples of secondary paths that comprises both linear portions and curvilinear portions include the generally rectangular paths with rounded corners (as shown in FIG. 1). Such secondary paths may appear to have a ladder configuration in plan view. There can be any suitable number of rungs on the ladders (e.g., 1, 2, 3, 4, 5, or more). The secondary path ingress and egress locations 80 and 82 may be spaced apart as shown in FIG. 1, or in other cases the same (not spaced apart on the primary path) as shown on secondary transport portion 78E in FIG. 1C.

The secondary paths P2 may be in any suitable location relative to the primary path P1. One or more secondary paths P2 may extend outward outside of the closed loop of the primary path P1 as shown in FIG. 1. In other cases, as in the case of secondary transport portion 78F shown in FIG. 1C, one or more secondary paths P2 may be located inside of the closed loop of the primary path P1. In other cases, as in the case of secondary transport portions 78G and 78H shown in FIG. 1C, one or more portions of a secondary path, such as 78H, may extend outside of a secondary transport portion (and if desired, form a ladder off of any side or portion of the same). Further, although in the embodiment shown in FIG. 1, in which the primary path P1 is a generally rectangular path having four sides with rounded corners, and there is one branch of secondary paths P2 on each of the sides of the primary path P1, in other cases, there may be a different arrangement. For example, as shown in FIG. 1A, there can be more than one secondary path P2 extending from one or more of the sides of the primary path P1. In some cases, there may be one or more sides of the primary path P1 with no secondary paths P2 extending therefrom.

FIG. 1A shows that a secondary path 78 (on the upper right portion of FIG. 1A) can optionally be provided with a return loop 79. This secondary path 78 is shown in the form of a ladder with an upper rung and a lower rung. In this case, the upper rung may be a conventional rung in which vehicles can travel in the same direction (clockwise for example) as the travel of vehicles on the primary path 76. Another rung, such as the lower rung, can provide a return loop 79 in which vehicles can travel back to the ingress leg of the ladder in the direction of the arrow. This allows vehicles to be sent through more than one unit operation station on this particular secondary path if desired. This also allows vehicles to be sent through one or more unit operation stations more than once on this particular secondary path if desired.

FIG. 1B shows several other secondary path configurations. Secondary path 78B is an example of a secondary path which is similar in function to secondary path 78A, but has a curvilinear configuration. Secondary path 78C contains an additional leg which allows a vehicle to be transported to an egress point that is downstream of the ingress point. A vehicle on secondary path 78C will travel "head first" into the first leg of the secondary path, and then will travel "tail first" when it reverses direction and travels along the second leg of this secondary path. Secondary path 78D contains another additional (third) leg (beyond that of secondary path 78C) which allows a vehicle to be reoriented and travel head first again along this third leg as it proceeds back onto the primary path 76.

FIG. 1D shows another secondary path configuration. As shown in FIG. 1D, it is possible for there to be multiple secondary paths that are nested or cascaded in parallel or in series in any suitable manner.

Figure 1K:
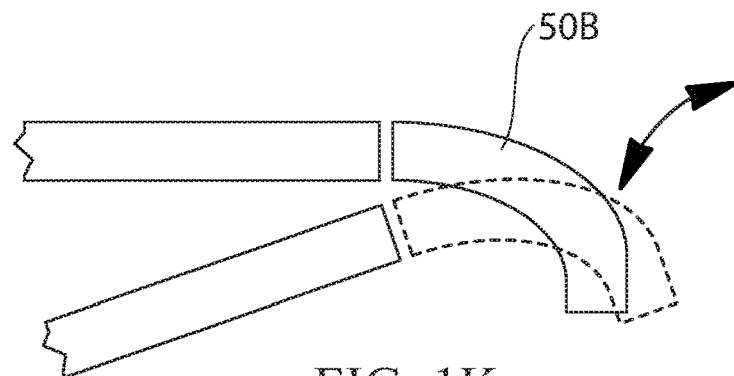
FIG. 1K is a fragmented schematic view of a portion of a track system having a curved section that can be rotated to select between different sections of track on which to transport the vehicles.
Figure 1L:
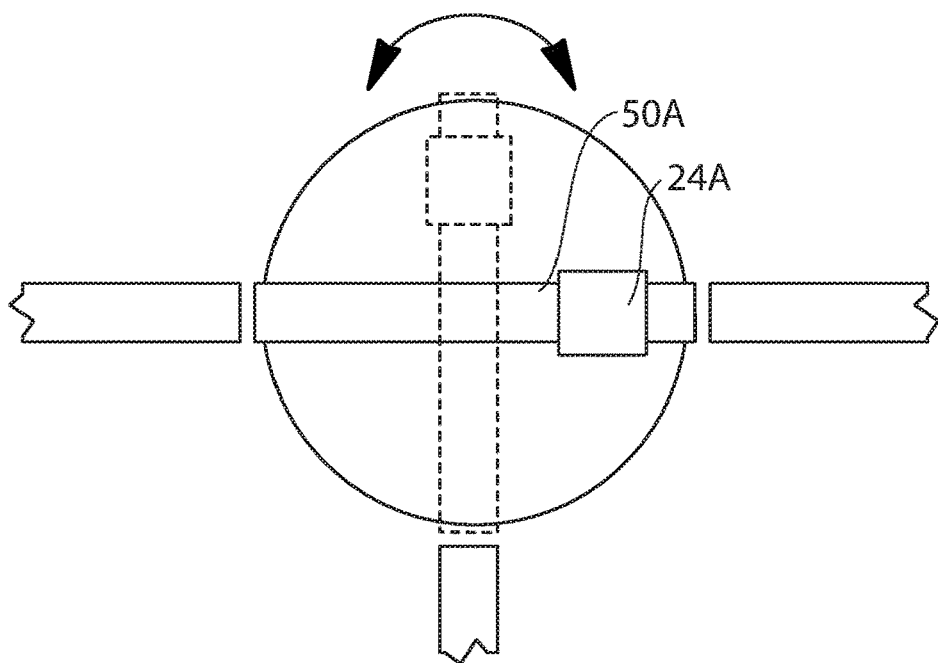
FIG. 1L is a fragmented schematic view of a portion of a track system having a rotatable platform for redirecting vehicles.

In some additional embodiments, segments of track can be physically turned or moved to enable more complex or interconnected layouts. In one specific embodiment, as shown in FIG. 1K, a corner segment (50b) could be rotated to select between two different sections of the layout. In another embodiment, such as shown in FIG. 1L, a straight segment of track (50a) can be rotated with a vehicle 24 aboard to reverse the orientation of the vehicle and contents, or to connect to another section of the layout (like a railroad roundhouse). In yet another embodiment as shown in FIG. 1I (in the dashed outer lines), a section of track 76 can be lifted or lowered with a vehicle 24 on board to move a vehicle between sections of the layout that are stacked above or below each other. These optional embodiments allow for layouts that might be more space efficient or simplify design of external systems such as utilities or material supply.

Circulating the vehicles 24 around the primary transport portion 76 can alleviate congestion on the track 22 which can enhance the throughput of the track system 20. For example, when a vehicle 24 is scheduled to be routed to the next unit operation station 84, 86, 88, 90 of its sequence in the course of producing a finished product, and that unit operation station 84, 86, 88, 90 is occupied (i.e., due to other vehicles 24 occupying the unit operation station 84, 86, 88, 90), the vehicle 24 can circulate around the primary transport portion 76 (i.e., in a holding pattern). Once the scheduled unit operation station 84, 86, 88, 90 becomes ready to receive vehicles, the vehicle 24 can then be diverted to the appropriate transport segment 91 of the scheduled unit operation station 84, 86, 88, 90.

It is possible that one or more types of unit operation stations could be located along the primary transport portion 76. However, to alleviate congestion on the primary transport portion 76 and allow one or more of the vehicles 24 to continuously circulate along the primary path P1, the primary transport portion 76 can be devoid of some or all unit operation stations (i.e., 84, 86, 88, 90), and the unit operation stations can instead be located at the secondary transport portions 78, as described above. Alternatively, the primary transport portion 76 may only have fast cycle stations located along the same. The vehicles 24 are therefore diverted off of the primary transport portion 76 to undergo the operations performed by the unit operation station 84, 86, 88, 90 and thus do not interfere with the flow of traffic on the primary transport portion 76. (Of course, in other embodiments, one or more unit operation stations can be located along the primary transport portion 76, and other unit operation stations may be located on the secondary transport portions 78.)

Operating the track system 20 in this manner can allow for more efficient production of products than conventional conveyor systems. As will be described in further detail below, the control system 62 can coordinate operation of the track 22, routing of each of the vehicles 24, as well as operation of each of the unit operation stations 84, 86, 88, 90 to efficiently and effectively fulfill an order of finished products. The control system is, thus, in communication with the track 22, the vehicles 24, and the unit operation stations 84, 86, 88, 90. The coordination of the operation of these components can include, for example, vehicle identification, vehicle scheduling, vehicle speed (which can be varied in any suitable manner including speeding up, slowing down, and stopping a vehicle), vehicle direction (including changing direction to a different path, and reversing direction), collision avoidance, route selection, outage reporting, and the like.

Each of the unit operation stations 84, 86, 88, and 90 in the embodiment shown in FIG. 1 will now be more fully described.

The container loading stations (or simply "loading stations") 84 can be configured to facilitate loading of an empty container (e.g., 38) and/or a closure 42 therefor onto a vehicle 24 located at the container loading station 84. It is to be appreciated that the container loading station 84 can comprise any of a variety of automated and/or manual arrangements that facilitate loading of a container and/or a closure 42 onto a vehicle. Loading can be done manually, statically such as by a gravity feed chute with optional gate, or with a mechanical motion device. Suitable mechanical motion devices include, but are not limited to: independently actuatable automatic arms, pneumatic arms, robots, transfer wheels, and other mechanical moving elements. In one embodiment, the container loading stations 84 can each include a robotic arm (not shown) that retrieves the container 38 and/or a closure from a storage area and places the container 38 and/or a closure on the vehicle 24. To facilitate grasping of the containers 38 and/or closures, each robotic arm can have a robotic mandible, a suction end, or any of a variety of suitable additional or alternative arrangements that enable grasping of the containers 38 and/or closures. Once the container 38 and/or a closure are in place on the vehicle 24, if the vacuum holder shown in FIG. 2 is used, a vacuum line (not shown) can be inserted either manually or automatically in the primary port 46 (FIG. 2) to draw a vacuum on the vacuum port 44 thereby temporarily securing the container 38 and/or a closure to the vehicle 24. The vacuum line can then be removed from the primary port 46, thereby allowing the associated valve (not shown) to close to maintain the vacuum on the container 38 and/or a closure. A vacuum station such as that described above may also be remote from the loading and/or unloading station(s) for the purpose of re-charging the vacuum at other times.

A filling unit operation station 86A is used to dispense fluent material into at least some of the containers. A filling unit operation station is not required to fill the containers to any particular level (such as to a "full" level). The filling unit operation station can dispense any suitable fluent material into the container. In some cases, the filling unit operation station can dispense a composition into the container that comprises all of the ingredients of the finished product. Alternatively, the filling unit operation station can dispense a base composition into the container, and the container can be sent to one or more other filling unit operation stations to have other ingredients (or several other ingredients in the form of pre-mix additions) added thereto in order to form a finished product. In other cases, the separate ingredients and/or pre-mix additions can be initially added to the container at a filling unit operation station, and then the remainder of the ingredients or base composition may be subsequently added at other filling unit operation stations. Thus, some filling unit operation stations may only dispense portions of the finished product composition. Such portions include, but are not limited to: water, silicone (such as for use as a conditioning agent, or the like), dyes, perfumes, perfume microcapsules, enzymes, flavors, bleach, anti-foam agents, surfactants, structurants, stabilizers such as solvents, anti-microbials, aesthetic enhancers such as opacifiers, mica and the like, etc. If the ingredients are separately added, they can be added in any suitable order, and mixed together at any suitable unit operation station.

In addition, although some filling unit operation stations may only be configured to dispense one type of fluent material, the filling unit operation stations are not limited to dispensing only one type of fluent material (e.g., one color of dye, etc.). In some cases, one or more of the filling unit operation stations can be configured to dispense different ingredients (such as through a different fluent material supply and nozzle). For example, the same filling unit operation station could dispense a green finished composition, a blue finished composition, and a red finished composition; or, it could dispense a green dye, a blue dye, and a red dye. In such cases, at least two different types of containers (e.g., a first, a second, a third, etc. container) may receive one or more (or all) of the ingredients for their finished compositions from the same fluent material dispensing unit operation station, or from the same type of fluent material dispensing unit operation station.

A filling unit operation station may, therefore, comprise a plurality of independently controllable nozzles for dispensing fluent material into the containers. Such independently controllable nozzles may take a number of different forms. In some cases, a single nozzle can be used to dispense more than one different fluent material. In other cases, filling unit operation station may comprise a bank of nozzles which comprises a plurality of nozzles, each of which may be configured to dispense the same or different fluent materials. In still other cases, one or more nozzles can be movable upward and downward to accommodate containers of different heights.

Mixing unit operation stations can comprise any suitable type of mixing device. Suitable types of mixing devices include, but are not limited to: mixers having a static geometry such as static mixers, orifice mixers, orifice and plate mixers, turbulent or laminar mixing in pipe, injection/jet mixing in pipe, liquid whistle cavitation, dynamic mixers such as mills/agitators, in-bottle mixing devices and in-nozzle mixing devices, and other in situ mixing devices. The mixing unit operation station can be located adjacent to the track, and the product to be mixed can be mixed while the container is on (a vehicle on) the track. In other embodiments, the mixing station may be configured so that the container can be removed from the (vehicle and the) track; mixed at a location that is displaced from the track; and, then returned to the track (e.g., vehicle).

Suitable types of in situ mixing methods are described in PCT Patent Application Serial No. CN2017/087537 (P&G Case AA 1227). This patent application describes methods for in situ mixing of two or more different liquid compositions by employing a dynamic flow profile characterized by a ramping-up section and/or a ramping-down section. In this in situ liquid mixing method, i.e., two or more liquid raw materials are mixed directly inside a container (e.g., a bottle, a pouch or the like) that is designated for housing a finished liquid consumer product during shipping and commercialization of such product, or even during usage after such product has been sold. This mixing method employs a dynamic filling profile for filling the container, which can help to reduce splashing, rebounding, and associated negative effects (such as aeration) inside the container caused by high-speed filling, and/or to improve thoroughness of the mixing and to ensure that the finished liquid consumer product so formed has satisfactory homogeneity and stability. More importantly, with the splashing and rebounding under control, it is possible to push the filling speed even higher, thereby significantly reducing the filling time and improving the system throughput. In one aspect, the method of filling a container with liquid compositions includes the steps of: (A) providing a container that has an opening, wherein the total volume of the container ranges from about 100 ml to about 10 liters; (B) providing a first liquid feed composition and a second liquid feed composition that is different from the first liquid feed composition; (C) partially filling the container with the first liquid feed composition to from about 0.01% to about 50% of the total volume of the container; and (D) subsequently, filling the remaining volume of the container, or a portion thereof, with the second liquid feed composition, while the second liquid feed composition is filled through the top opening into the container by one or more liquid nozzles, while such one or more liquid nozzles are arranged to generate one or more liquid flows characterized by a dynamic flow profile, which includes an increasing flow rate at the beginning of step (D) and/or a decreasing flow rate at the end of step (D) in combination with a peak flow rate during the middle of step (D).

Other suitable types of methods for in situ mixing of two or more different liquid compositions in a container are described in PCT Patent Application Serial No. CN2017/087538 (P&G Case AA 1228). This patent application describes a method of employing one or more liquid influxes that are offset by 1-50° from a longitudinal axis of the container. In this in situ liquid mixing method, two or more liquid raw materials are mixed directly inside a container (e.g., a bottle, a pouch or the like) that is designated for housing a finished liquid consumer product during shipping and commercialization of such product, or even during usage after such product has been sold. This method employs one or more liquid influxes for filling the container that are not aligned with the longitudinal axis of the container, but are offset from such longitudinal axis by a sufficiently large offset angle ($\alpha$), e.g., from about 1° to about 50°. Such offset or angled liquid influxes function to increase the impact of available kinetic energy on the mixing result and in turn improve homogeneity and stability of the finished liquid consumer product so formed. In one aspect, this method of filling a container with liquid compositions, comprises the steps of: providing a container that has an opening with a centroid, a supporting plane, and a longitudinal axis that extends through the centroid of the opening and is perpendicular to such supporting plane, while the total volume of the container ranges from 10 ml to 10 liters; (B) providing a first liquid feed composition and a second liquid feed composition that is different from the first liquid feed composition; (C) partially filling the container with the first liquid feed composition to from about 0.01% to about 50% of the total volume of such container; and (D) subsequently, filling the remaining volume of the container, or a portion thereof, with the second liquid feed composition, while during step (D), the second liquid feed composition is filled through the opening into the container by one or more liquid nozzles that are positioned immediately above the opening or inserted into the opening, and while such one or more liquid nozzles are arranged to generate one or more liquid influxes that are offset from the longitudinal axis of the container by an offset angle ($\alpha$) ranging from about 1° to about 50°.

Figure 7:
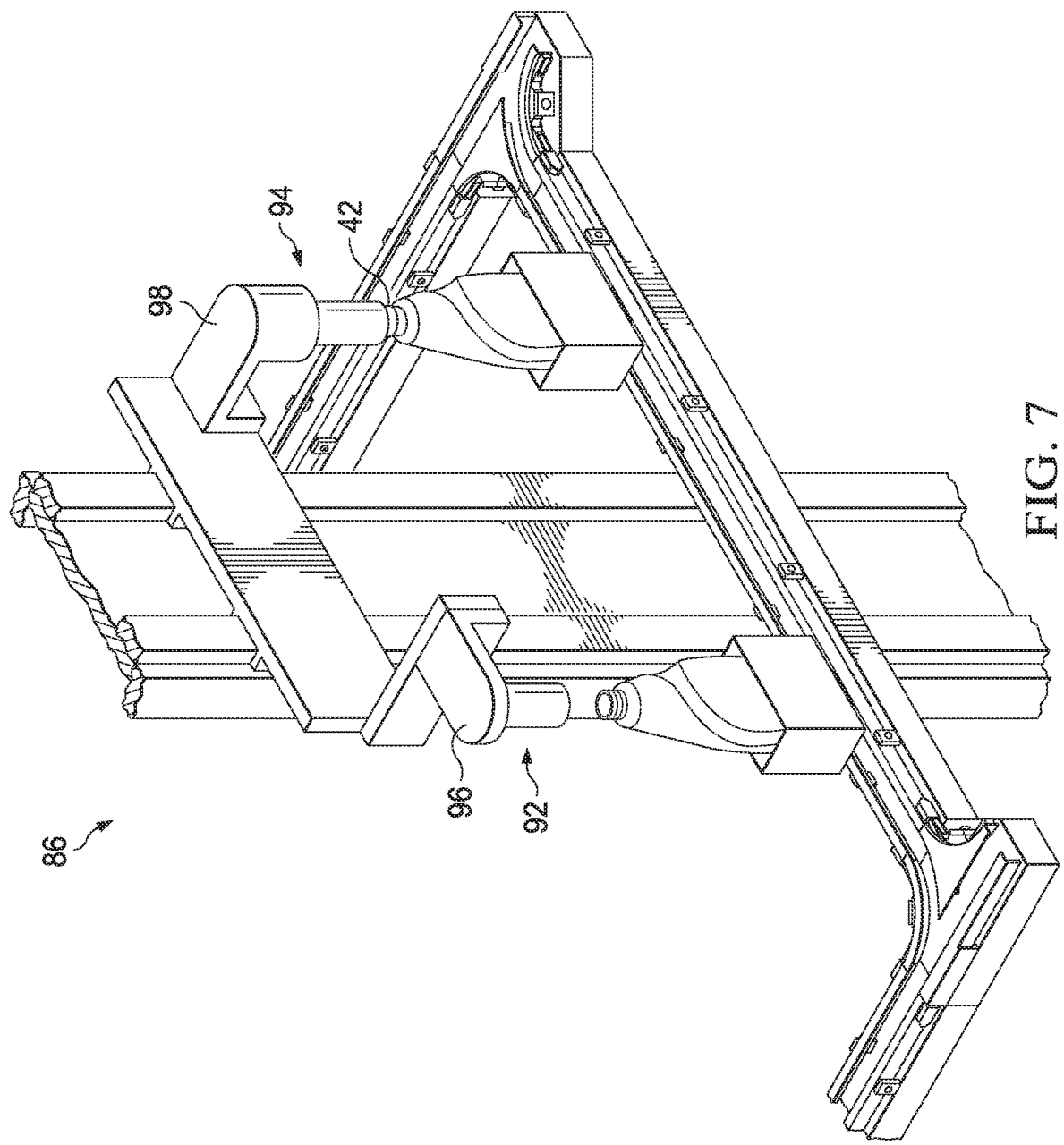
FIG. 7 is an isometric view depicting a filling/capping station of the track of FIG. 1.

The combined filling/capping stations 86 can be configured to dispense fluent material into containers 38 and to apply a closure to the containers 38 once they are filled. One example combined filling/capping station 86 is illustrated in FIG. 7 and is shown to include a filling portion 92 and a capping portion 94. The filling portion 92 can include a filler arm 96 which can move vertically between a retracted position (FIG. 7) and an extended position (not shown). The capping portion 94 can include a capping arm 98 that can move vertically between a retracted position (not shown) and a capping position (FIG. 7). To begin filling the container 38, the vehicle 24 can be routed to the filling portion 92 with the empty container 38 located beneath the filler arm 96. The filler arm 96 can then be moved from the retracted position to the extended position and into engagement with the opening 40 of the container 38. The filler arm 96 can then dispense fluent material into the container 38. Once the fluent material has been dispensed, the filler arm 96 can stop dispensing fluid and can move back to the retracted position. The vehicle 24 can then be routed to the capping portion 94 with the closure 42 positioned beneath the capping arm 98. The capping arm 98 can then extend to the closure 42, grasp the closure 42, and then return to the retracted position. The vehicle 24 can then move the opening 40 of the container 38 beneath the capping arm 98. The capping arm 98 can move to the capping position and can screw, or otherwise attach, the closure 42 to the container 38. The closure 42 may be removable or openable by a consumer to access the contents.

In some embodiments, the closure 42 may be transported on the container 40. In such embodiments, when the vehicle 24 arrives at the filling/capping station 86, the vehicle 24 can first be routed to the capping portion 94. The capping arm 98 can remove the closure 42 from the container 38 and can move to the retracted position while holding the closure 42. The vehicle 24 can then be routed to the filling portion 92 for filling of the container 38 with fluid. Once the container is filled, the vehicle 24 can return to the capping station 94 where the capping arm 98 secures to the closure 42 to the container 38. In other embodiments, the closure 42 can be transported to the filling/capping station 86 on the same vehicle as the container 38, but not on the container (for example, on the same vehicle but adjacent to the container). In other embodiments, the closure 42 can be transported to the filling/capping station 86 on a different vehicle (e.g., a separate vehicle) from the vehicle transporting the container 38. When the closure is transported on a vehicle, it can be held by vacuum (or in some other suitable manner) and sent to any of the finished product unit operation stations, if desired. For example, it may be desirable to send the closure 42 to a decoration station for decorating the closure. In yet other embodiments, the closure 42 might not be transported with the empty container 38, but instead can be provided to the container 38 upon its arrival at the capping portion 94 (i.e., after the container 38 is filled with fluent material). It is to be appreciated that the filling/capping stations 86 can include any of a variety of additional or alternative automated and/or manual arrangements that facilitate filling and capping of a container.

Figure 8:
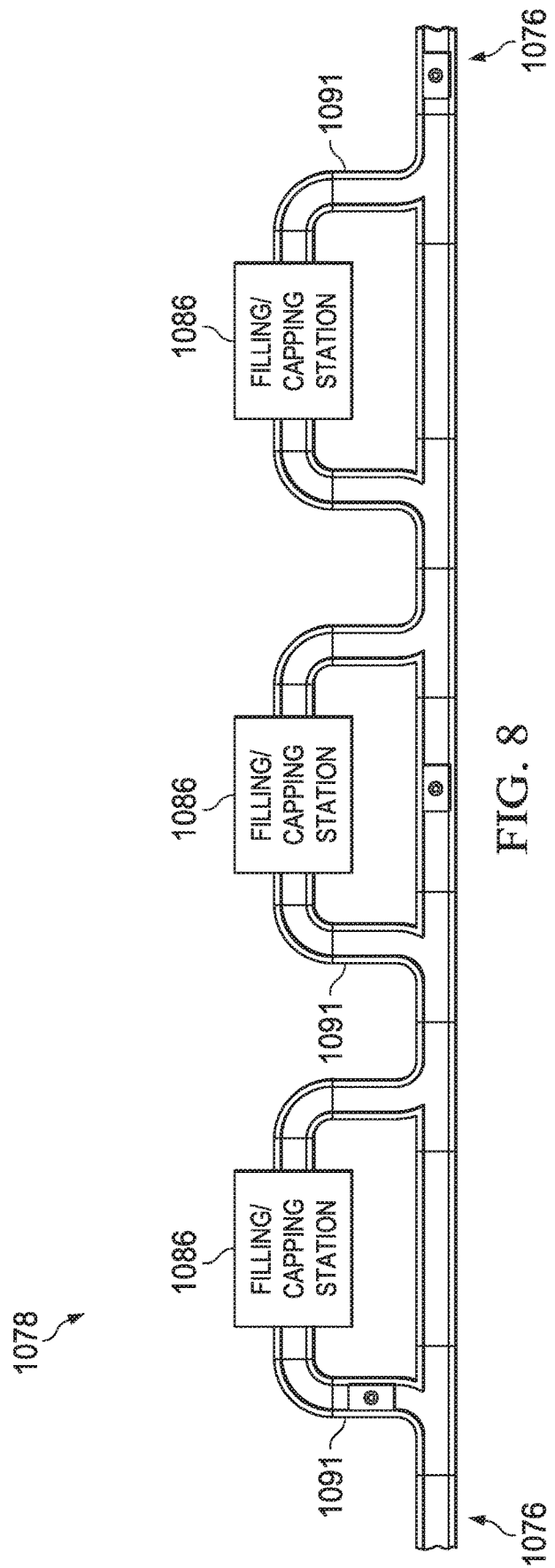
FIG. 8 is an enlarged schematic view of a secondary transport portion, in accordance with another embodiment.

An alternative embodiment of a secondary transport portion 1078 is illustrated in FIG. 8 and is shown to include a plurality of filling/capping stations 1086 that are similar to or the same as in many respects as the filling/capping stations 86 shown in FIGS. 1 and 7 and described above. However, the filling/capping stations 1086 can be disposed along different unit transport segments 1091 that are arranged in series along a primary transport portion 1076 of a track (e.g., 22). It is to be appreciated that the other unit operation stations can additionally or alternatively be disposed along different unit transport segments 1091 that are arranged in series.

The decoration stations 88 can be configured to facilitate labelling, printing, spray-coating (i.e., spray-painting), or otherwise decorating the containers 38 (and optionally also doing the same to their closures). In one embodiment, at least one of the decoration stations 88 can include a printer (not shown) that prints labels for application to the containers 38. In such an embodiment, the printer can print the label on a sticker that is on a backing substrate. A spooling assembly (not shown) can receive the sticker and the backing substrate. When the vehicle 24 carrying the container 38 passes the spooling assembly, the movement of the container 38 past the spooling assembly can facilitate application of the sticker to the container 38.

In other embodiments, the printer can print ink onto a transfer component, and an adhesive can be applied onto the ink to form a composite structure. The ink and adhesive composite structure can then be transferred from the transfer component onto an article (such as a product, or portion thereof, or a container) to form a label or decoration (without using a separate sticker). The transfer component may be flexible and may comprise a flexible sheet material capable of conforming to the article over a variety of concave and convex surface features. In some cases, the adhesive may be separate from the ink and intermediate the ink and the article. In other cases, the adhesive may be integral with the ink. Additionally, the transfer component may be treated with a release coating that may be intermediate the transfer component and the ink and adhesive composite. Suitable transfer processes are described in the following patent applications belonging to The Procter & Gamble Company: US 2017/0182756 A1; US 2017/0182704 A1; US 2017/0182513 A1; US 2017/0182705 A1; and, US 2017/0183124 A1.

In other embodiments the printer can print ink onto a sleeve or wrap such as a shrink-sleeve that encompasses the perimeter of the container or article. The sleeve may be then made to conform at least in part to the container or article, such as by heating the shrink-sleeve.

Such arrangements can facilitate "on-demand" decorating whereby different decorations (such as labels) can be printed for the different types of articles and/or containers 38 (and/or fluids in such containers) that are being carried by the vehicles 24. These labels can include various types of decorations and product information such as, for example, characters, graphics, branding, ingredients, SKU (stock keeping unit) information, or other visual elements for when the article (e.g., a container 38) is displayed for sale. If desired, the article (e.g., containers 38) can be customized, or even be personalized for and/or in response to orders from retailers or from individual consumers.

The unloading stations 90 can be configured to facilitate removal of the articles (such as filled containers 38) from the vehicles 24. In one embodiment, each of the unloading stations 90 can include a robotic arm (not shown) that retrieves the article (e.g., container 38) from each vehicle 24 for loading into packaging (e.g., a store display or a shipping container). To facilitate grasping of the articles (such as filled containers 38), the robotic arm can have a robotic mandible, a suction end, or any of a variety of suitable additional or alternative arrangements that enable grasping of the container 38. In certain cases, at least a portion or component of the vehicle may be unloaded concurrent with the article/container. For instance, a portion of the vehicle 24 can be configured to facilitate grasping an article. For example, the vehicle may comprise a puck to secure the article/container to the vehicle 24, which puck is removable and replaceable.

Once the article (e.g., container 38) is removed from the vehicle 24, the vehicle 24 can be routed to the loading station 84 to receive another article (such as an empty container 38) for filling (or component of an article for making an assembled product). It is to be appreciated that the unloading station 90 can include any of a variety of additional or alternative automated and/or manual arrangements that facilitate unloading of a container finished product into packaging.

In some embodiments, the finished products (e.g., filled containers 38) can be placed into packaging that is designed to present the finished products for sale at a merchant. In such packaging, the finished products (e.g., finished fluent products) can be offered for sale individually or packaged with one or more other products, which together form an article of commerce. The finished products can be offered for sale as a primary package with or without a secondary package. The finished products can be configured to be displayed for sale while lying down or standing up on a store shelf, while presented in a merchandising display, while hanging on a display hanger, or while loaded into a display rack or a vending machine. When the finished products comprise containers 38 containing fluent product(s), they can be configured with a structure that allows them to be displayed in any of these ways, or in any other way known in the art, as intended, without failure. In some embodiments, the unloading stations 90 can facilitate packaging ("bundling") of different types of products within the same packaging without requiring manual handling of the articles as is oftentimes required in conventional operations.

The track system 20 can comprise any suitable number and/or type of inspection station(s). For example, in FIG. 1, the track system 20 can include a first scanner 100 and a second scanner 102 that are each configured to scan passing articles (e.g., containers 38). The scanners can be in any suitable location around the track system 20. For example, the first scanner 100 can be located between one of the ingress locations 80 and the filling/capping station 86 and can scan each passing vehicle 24 to determine if the container 38 is present. The second scanner 102 can be located between the decoration stations 88 and the unloading stations 90 and can scan each passing vehicle 24 to determine whether the article (e.g., container 38) disposed thereon is ready for packaging by the unloading stations 90.

If the article (e.g., container 38) is not ready for packaging by one of the unloading stations (such as due to a defect in the contents and/or the container), the article can be unloaded at the unloading station of its destination. In other cases, the vehicle with the article thereon can be sent to an alternative unloading station. At the destination or alternative unloading station, one or more of the following actions can take place: the defect in the article (such as in the container and/or its contents) can be remedied; the container can be emptied and recycled; and/or the article (e.g., container and/or its contents) can be disposed of. The article is unloaded from the unloading station, and the vehicle becomes ready for a new route assignment.

The first and second scanners 100, 102 can be any of a variety of scanners for obtaining information from the vehicles 24 and/or the articles (e.g., containers 38) such as, for example, an infrared scanner. The first and second scanners 100, 102 can also be configured to facilitate reading of a variety of data from the container 38 such as QR codes, UPC barcodes, or RFID tags, for example.

It is to be appreciated that the track system 20 can facilitate dispensing different types of fluent materials into various types of different containers at the same time. (Of course, the start time and finish time of dispensing into the different containers may, but need not, coincide exactly. The dispensing into the different containers may only at least partially overlap in time.) If the track system 20 is being used to make products other than fluent products, the track system 20 can be used to make customized products intermixed with mass produced products at the same time. Similarly to fluent products, the start and finish time of producing and/or assembling such products may, but need not, coincide exactly. The start and finish time may only at least partially overlap in time.

In addition, in the case of fluent products, one or more containers may not be filled with fluent material that is used to make a finished product. For example, one or more containers may be used to receive fluent material that is cleaned or flushed from one or more nozzles at a filling unit operation station, and this fluent material can thereafter be disposed of or recycled.

As will be described in more detail below, the particular type of article (e.g., container types and fluent materials) provided for each vehicle 24 can be selected by the control system 62 to fulfill a particular production schedule, and each vehicle 24 can be independently and simultaneously routed along a unique route among the unit operation stations (such as 84, 86, 88, 90) to facilitate making a particular product (e.g., loading and filling of the containers 38). The unique route for each vehicle 24 can be selected by the control system 62 based, at least in part, upon the vehicle type (i.e., the type of container or containers the vehicle 24 is configured to accommodate), the unique routes selected for the other vehicles 24, and/or the type of finished product(s) needed by the unloading station 90 for packaging, for example. It is to be appreciated that the track system 20 can facilitate filling of different types of containers with different types of fluid more efficiently and effectively than conventional arrangements. For example, conventional arrangements, such as linear conveyor or rotary filling lines, typically only allow for filling of one type of container with one type of fluid at a time. As such, individual systems are oftentimes required for each container and fluid being manufactured which can be expensive and time consuming. In addition, converting these systems to use a different container and/or fluid can also be expensive and time consuming. The track system 20 can therefore be a solution that allows for manufacture of different types of filled containers less expensively and in a less time consuming manner than these conventional arrangements.

It should be understood that the operations that take place at the different unit operation stations may take the same amount of time, but often do not. These time periods may be referred to as a first duration, a second duration, a third duration, etc. The first, second, third, etc. durations can be the same, or one can be greater than the other(s). For instance, some unit operation stations perform operations that are relatively fast compared to other unit operation stations; some unit operation stations may be relatively slow; and, some unit operation stations may carry out some operations that are relatively fast and some that are slower (e.g., a filling station that can dispense one ingredient and that can also dispense a larger quantity comprising a complete composition). Therefore, although FIG. 1 shows an equal number of filling/capping unit operation stations and decoration stations, this is not required. Thus, the system may, for example, have fewer of the relatively fast unit operation stations than the slower unit operation stations.

It should also be understood that the time it takes to create different types of finished products from start to finish (throughput time) may be the same, or different for the different types of finished products. The time it takes to create finished products may also be the same, or different for the same types of finished products. The time it takes to create finished products can be measured beginning at a starting point that occurs when an empty vehicle arrives at a loading station and ends at a destination point when the finished product is unloaded at an unloading station.

Figure 14:
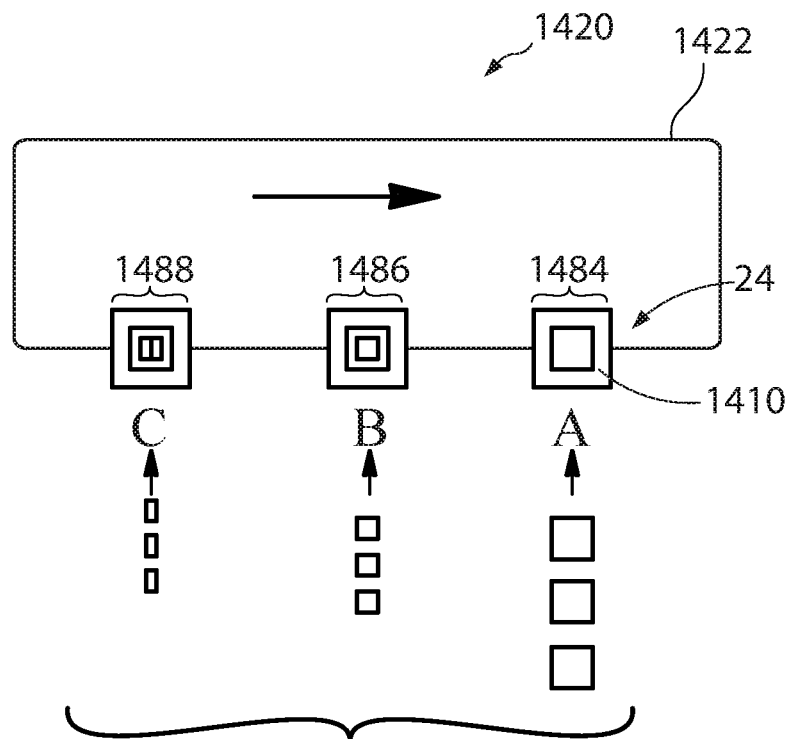
FIG. 14 is a schematic view of a track system used for making assembled products.
Figure 15:
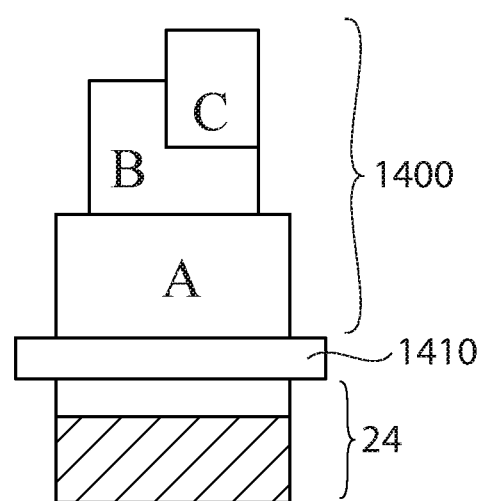
FIG. 15 is a schematic side view of a vehicle carrying an assembled product.

FIGS. 14-15 show one non-limiting example of a system and method for producing assembled products. FIG. 14 shows a system for making assembled products which comprises a holder 1410 on which a product 1400 will be assembled, a track system 1420 comprising a track 1422, a plurality of unit operation stations 1484, 1486, and 1488 disposed along the track system configured to assemble components A, B, and C to create a finished product, and a plurality of vehicles 24 propellable along the track system. Each holder 1410 is disposed on one of the vehicles 24 (only one vehicle is shown), and each vehicle 24 is independently routable along the track system to deliver the holders 1410 to at least one unit operation station where an assembly operation is performed. Components (e.g., A, B, and C) for assembly can be supplied to the unit operation stations 1484, 1486, and 1488 by an external supply system as shown in FIG. 14, or delivered by one of the plurality of vehicles 24. The finished product is shown in FIG. 15. It should be understood that, although a greatly simplified version of a track system is shown in FIG. 14, systems and methods for producing assembled products can utilize any of the track configurations and features for such systems contained in this description.

Numerous alternative embodiments and features of the systems and methods described herein are possible.

In some embodiments, as shown in FIG. 1A, one or more of the unit operation stations 87 may be disconnected/unconnected from the track. In such an embodiment, the entire vehicle 24 (including the article and the magnet) may be removed from the track such that the magnet is no longer in electromagnetic communication with the track. Once the vehicle is outside of electromagnetic communication with the track, any kind of unit operation can be performed. This can include, but is not limited to: external mixing, such as tumbling, filling, and/or labeling and decoration. Upon the completion of this unit operation, the entire vehicle 24 and magnet can be brought back into electromagnetic communication with the track and conveying of the vehicle via the magnet can resume.

The unit operation stations may be located in the same contiguous open space, or as shown in the case of unit operation 89 in FIG. 1D, they may be separated by walls 75 so as to be located in separate rooms, connected only by means of an opening or pass-through including a connecting portion of track. The pass-through would be large enough to allow passage of the vehicles and containers/articles. The pass-through may be open or may include a gate or door. The pass through may be fully closed at times when a vehicle is not passing through it. The different rooms may be maintained under different conditions. For example, the addition of a composition comprising a light-sensitive ingredient may be reserved for a darkroom or a temperature/humidity sensitive ingredient reserved for a controlled temperature-room and/or controlled-humidity room. Likewise, addition of compositions that may constitute a human-safety risk such as acids, bases, enzymes and the like may be reserved for a room with additional controls such as personal protective measures. Likewise, packing a shipping of the containers once they have been sealed may be reserved for a room with limited controls.

In the case of forming flexible containers such as those described in The Procter & Gamble Flexible Inflatable Container patent publications, partially-formed containers can be supplied to the system described herein in the form of individual container blanks. The individual container blanks can be conveyed on vehicles having appropriate holders for the same. The container blanks can then be conveyed to one or more stations for performing one or more of the following operations: decorating the container blanks; filling the product volume of the container blanks with fluent products; closing the product volume after filling; inflating the structural support volumes; and sealing the inflated structural support volumes.

A quality assurance (QA) station can be a station that evaluates the state of a given article/package to ensure that various specifications (related to the efficacy of the product/package/fluent material) are within certain targets or limitations. Such quality assurance stations can include non-invasive imaging methods to check for package quality (ex: no scuff marks or liquid drips on the bottle), or for the quality of the fluent material (homogeneity in the package or fill level or weight in the package), among others. Quality assurance stations can also involve invasive testing—direct sampling of fluent product within a container, say, for microbial testing or homogeneity testing. Quality assurance stations can also be used for in process measures and control. For example, when several portions are added separately to the bottle, the bottle can be weighed between ingredient additions to verify the additions and potentially make necessary adjustments to the addition systems for future bottles.

A station for weighing articles (that is, a checkweigher) can stop the vehicles and weigh the articles, however, it is more desirable to weigh the articles when the vehicles 24 carrying the articles are in motion, in order to increase the throughput of the system. A weigh-in-motion scale system and method for a linear synchronous motor conveyor has been developed for this purpose. The weigh-in-motion system comprises: a) a support structure for supporting the following: a weigh cell, a section of a linear synchronous motor conveyor track, a vehicle for transporting an object, and an object; and b) a weigh cell on the support structure on which a section of a linear synchronous motor conveyor track rests directly or indirectly, wherein the weigh cell is configured to weigh vehicles and objects while in motion. The weigh cell can be any suitable type of weigh cell. Weigh cells include but are not limited to strain gage and electromagnetic force restoration (EMFR) weigh cells. In one example, the weigh cell is an EMFR weigh cell. EMFR weigh cells have the ability to handle large dead loads (such as those of the section of the track containing propulsion coils) without losing accuracy, and a fast response time. A suitable EMFR weigh cell is available from Wipotec of Roswell, Ga., U.S.A. Such a system is described further in a U.S. patent application that is filed on the same date as the present application.

If desired, the checkweigher may tare itself with no vehicles on it periodically (e.g., every 5 minutes). That is to say that the "dead load" weight may be re-established periodically. This is advantageous to compensate for changes in the "dead load" weight caused, for example, by wear, contamination on the linear synchronous motor track 22 or other part of the "dead load", removal of contamination, or other factors that may change the apparent weight of the "dead load" equipment. If the "dead load" tare result is significantly different from a previous result, an alarm may alert an operator and the control system may prevent further weighing until action is taken.

In some cases, there are multiple vehicles 24 and each vehicle has a tare weight. If the tare weight of the vehicles 24 are sufficiently similar, the method may comprise subtracting a fixed tare weight (that approximates the tare weight of all the vehicles) from the reading on the weigh cell. In other cases, the method may further comprise: assigning an identification designation to each vehicle; and the step of weighing further comprises identifying which vehicle is carrying an object being weighed (such as by using the controller) and subtracting the identified vehicle's tare weight from the reading on the weigh cell. In the latter case, it may be desirable to occasionally, periodically, or continually, send the empty vehicles to the checkweigher to check the tare weight of the vehicles to ensure that the vehicles' tare weights have not changed due to wear, spillage, or other events. Also, each type of vehicle may have a minimum and maximum acceptable tare weight. If a vehicle's empty weight measurement is outside of that range, the vehicle may be directed to a designated location other than on the checkweigher (such as a maintenance station), where an operator may be alerted. This is useful to prevent blocking use of the checkweigher when a problem occurs with a vehicle.

The controller can also periodically send "calibration vehicles" (or "calibration cars") to the checkweigher in order to verify weigh cell accuracy. This particular conveyance system also provides the ability to permit periodic, or if desired continual, checking of the vehicle identification (vehicle ID) and assigned tare weight.

Figure 9:
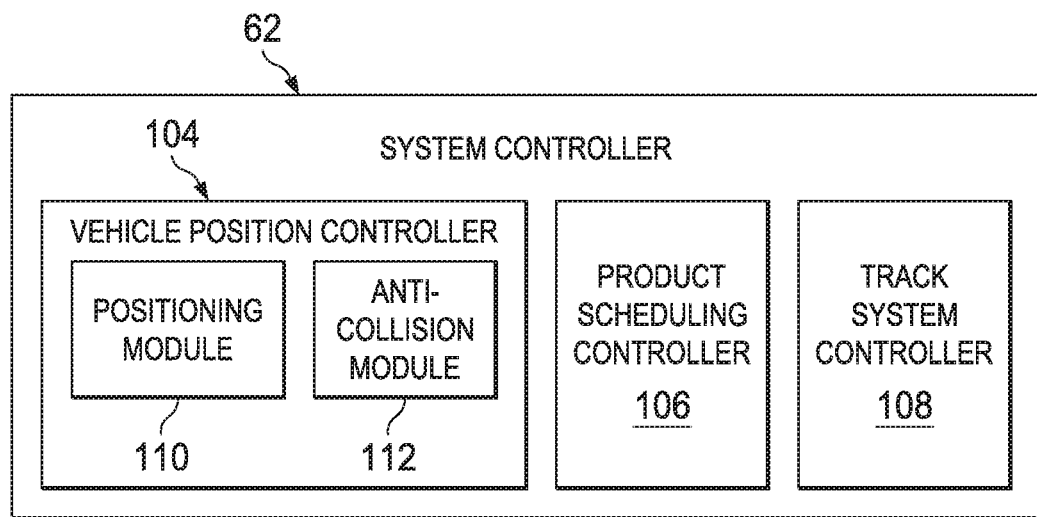
FIG. 9 is a schematic view of the control system of FIG. 1.

Referring now to FIG. 9, the control system 62 can include a vehicle position controller 104, a product scheduling controller 106, and a track system controller 108, that are communicatively coupled with each other and can cooperate to facilitate producing finished products. The vehicle position controller 104 can include a positioning module 110 and an anti-collision module 112. The positioning module 110 can facilitate positioning of the vehicles 24 at designated locations along the track 22. Each of the vehicles 24 can have a unique identifier associated with it (uniqueness only needs to be relative to the other vehicles on the track) and with which the vehicle positioning module 110 can identify it. As will be described in further detail below, the vehicle position controller 104 can receive desired location coordinates from the track system controller 108 for the vehicles 24. The vehicle position controller 104 can move the vehicles 24 along the track 22 based upon the location coordinates for each vehicle 24.

Referring now to the coordinates provided to the vehicle position controller 104 by the track system controller 108 as described above, the coordinates provided comprise a specified position to which a pre-defined centerline of the vehicle 24 should be directed. In one example, in an embodiment where the track 22 comprises a linear motor system and the vehicle 24 comprises a magnet, the pre-defined vehicle 24 centerline may be defined as the midpoint of the magnet. In some instances, such coordinates may be provided by the track system controller 108 to the vehicle position controller 104 when the vehicle 24 needs to be moved to a unit operation station so as to undergo an operation at the unit operation station. Such an operation may require aligning a part of the vehicle 24 or a part of the container or other payload carried by the vehicle 24 in a particular position in relation to equipment designed to execute the operation at the unit operation station. Examples of this positioning for operations include, but are not limited to: positioning the centerpoint of the mouth of a bottle or other container underneath a fill nozzle; positioning a cap-carrying feature of the vehicle 24 underneath a capping apparatus; or positioning the centerpoint of a desired position for a cap on a container underneath a capping apparatus. In these operations, the track system controller 108 must provide to the vehicle position controller 104 a set of coordinates that, as described above, corresponds to the position where the pre-defined vehicle 24 centerline must be so that the desired alignment is achieved. Such alignment sometimes achieves, but often does not achieve, positioning the pre-defined vehicle 24 centerline in a position directly in relation to equipment that will perform an operation. Often, such alignment involves positioning the pre-defined vehicle 24 centerline in a different position to achieve aligning another feature of the vehicle or its payload with equipment that will perform a transformation, thereby typically positioning the pre-defined vehicle 24 centerline in a position that is offset from the position of equipment that will perform a transformation. The aforementioned offset is related to the difference in position of the feature on the vehicle 24 to be aligned and the position of the pre-defined vehicle 24 centerline. It is to be appreciated that, even when aligning the same particular feature (e.g. the mouth of a container carried by a vehicle 24) with the same particular equipment (e.g. a filler nozzle) that will perform a transformation, the aforementioned offset may vary depending on features of the vehicle 24, features of the payload carried by the vehicle 24, the positioning of the payload carried by the vehicle 24 on the same vehicle 24, or a combination thereof.

To mitigate the problem of the variation in the aforementioned offset, the track system controller 108 may be configured to store configuration parameters. Some of these configuration parameters may comprise a single parameter related to each unit operation station, where said single parameter specifies a selection of what sub-feature of a vehicle 24 should be aligned with the unit operation station when the vehicle 24 is to be directed to the unit operation station so as to undergo an operation. For example, a particular parameter for a particular unit operation station may specify that the center of the fill mouth of a container be aligned when a vehicle 24 is directed to a unit operation station so as to undergo an operation. Furthermore, additional configuration parameters may exist. Such additional configuration parameters may comprise information regarding the relationship between a sub-feature of a type of vehicle 24 and the pre-defined vehicle 24 centerline, or information regarding the relationship between a sub-component of a container or other material and a pre-defined centerline of the same component. Examples of relationships between sub-components of a container and a pre-defined centerline of the same component include, but are not limited to, fill mouth position of a container with respect to a container centerline, or desired cap position of a container with respect to container centerline. Examples of relationship between a sub-feature of a type of vehicle 24 and the pre-defined vehicle 24 centerline include, but are not limited to, the expected position of the centerline of a container with respect to the pre-defined vehicle 24 centerline, or the expected position of a cap-carrying feature with respect to the pre-defined vehicle 24 centerline. Such additional configuration parameters may be configured in the track system controller 108, or may be configured in the product scheduling controller 106, or may be configured elsewhere. In the case where the additional configuration parameters are configured in the product scheduling controller 106, information relating to the relevant additional configuration parameters may be communicated to the track system controller 108 with each route that is communicated from the product scheduling controller 106 to the track system controller 108. The problem of variation in the aforementioned offset can therefore be mitigated by the track system controller 108 performing a calculation, where the calculation applies a shift to a position of a unit operation station, where the shift is based on a configuration parameter selecting a desired sub-feature of a vehicle 24 or its payload to align with equipment at said unit operation station, and where the resulting shifted unit operation station position is used to generate coordinates to provide to the vehicle position controller 104 so as to cause the vehicle 24 to move to a position where the desired sub-feature of the vehicle 24 or its payload is properly aligned with equipment at the unit operation station. Such a calculated shift in unit operation station position coordinates is advantageous so as to avoid the need to store a set of coordinates for every unit operation station for every possible combination of type of vehicle 24 and its various possible payloads. In this way, the amount of unit operation station position coordinates that must be configured in the track system controller 108 is minimized, as is the effort required when introducing a new type of vehicle 24, or new possible payloads to be carried by vehicles 24. It is to be appreciated that the calculated shift in unit operation station may also be calculated based on additional information. For example, additional information may comprise information that was measured. As a specific example, the additional information may comprise a measured position of a container on a vehicle 24 with respect to a pre-defined vehicle 24 centerline of the same vehicle 24.

The control system 62 can be a software-based control system or a computer-based (or computing device-based) control system. Any suitable computing device or combination of computing devices (not shown), as would be understood in the art can be used, including without limitation, a custom chip, an embedded processing device, a tablet computing device, a personal data assistant (PDA), a desktop, a laptop, a microcomputer, a minicomputer, a server, a mainframe, or any other suitable programmable device. Of course, it is understood that software will run on such devices. In various embodiments disclosed herein, a single component can be replaced by multiple components and multiple components can be replaced by a single component to perform a given function or functions. Except where such substitution would not be operative, such substitution is within the intended scope of the embodiments.

The computing device can include a processor that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuit (ASIC), a programmable logic devices (PLD), and a field programmable gate array (FPGA), among others. The computing resources can also include distributed computing devices, cloud computing resources, and virtual computing resources in general.

The computing device can also include one or more memories, for example read only memory (ROM), random access memory (RAM), cache memory associated with the processor, or other memories such as dynamic RAM (DRAM), static ram (SRAM), programmable ROM (PROM), electrically erasable PROM (EEPROM), flash memory, a removable memory card or disk, a solid state drive, and so forth. The computing device can also include storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor, or memories are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces can be configured to transmit to, or receive data from, other computing devices across a network. The network and communication interfaces can be an Ethernet interface, a radio interface, a Universal Serial Bus (USB) interface, or any other suitable communications interface and can include receivers, transmitters, and transceivers. For purposes of clarity, a transceiver can be referred to as a receiver or a transmitter when referring to only the input or only the output functionality of the transceiver. Example communication interfaces can include wired data transmission links such as Ethernet and TCP/IP. The communication interfaces can include wireless protocols for interfacing with private or public networks. For example, the network and communication interfaces and protocols can include interfaces for communicating with private wireless networks such as a WiFi network, one of the IEEE 802.11x family of networks, or another suitable wireless network. The network and communication interfaces can include interfaces and protocols for communicating with public wireless networks, using for example wireless protocols used by cellular network providers, including Code Division Multiple Access (CDMA) and Global System for Mobile Communications (GSM). A computing device can use network and communication interfaces to communicate with hardware modules such as a database or data store, or one or more servers or other networked computing resources. Data can be encrypted or protected from unauthorized access.

In various configurations, the computing device can include a system bus for interconnecting the various components of the computing device, or the computing device can be integrated into one or more chips such as a programmable logic device or application specific integrated circuit (ASIC). The system bus can include a memory controller, a local bus, or a peripheral bus for supporting input and output devices, and communication interfaces. Example input and output devices include keyboards, keypads, gesture or graphical input devices, motion input devices, touchscreen interfaces, one or more displays, audio units, voice recognition units, vibratory devices, computer mice, and any other suitable user interface.

The processor and memory can include non-volatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Referring again to FIG. 9, to facilitate routing of the vehicles 24 along the track 22, the vehicle position controller 104 can control operation of the plurality of coils 58a and the transition portions 50c (e.g., the flipper members 74). The vehicle position controller 104 can also prevent collisions between the vehicles 24 as they are positioned along the track 22. For example, the vehicle position controller 104 can track the positions and/or speed of the vehicles 24 on the track 22. If a vehicle 24 begins approaching another vehicle 24 in a manner that could cause a collision, the vehicle position controller 104 can adjust the speed (increasing or decreasing the speed) of the approaching vehicle 24 and/or the approached vehicle 24 to prevent a collision. It is to be appreciated that the vehicle position controller 104 can be an on-board controller that is original to the track 22 and built together with the track 22. In one embodiment, the vehicle controller 104 can be provided with the track from the manufacturer of the track 22 (e.g., MagneMotion, Inc. of Devens, Mass., U.S.A.).

The control system 62 may be configured to receive orders in one or more of the following manners: via post office mail, via e-mail, via a website, via an application on a smart phone, via manual entry, and via production demand software (such as SAP software available from SAP SE).

The product scheduling controller 106 can be configured to assign a container type and fluent material type (e.g., a finished product) for each empty vehicle 24. The product scheduling controller 106 can also be configured to assign a desired route that achieves the assigned finished product. The track system controller 108 can be configured to route the vehicles 24 around the track 22 and operate the unit operation stations 84, 86, 88, 90 based upon the finished product and route assigned to the vehicles 24.

The control system 62 may be configured as a central assignment mechanism that pre-assigns independent routes for the vehicles based on demand data. The control system 62: receives demand for finished products to be made on the track system; determines a route for a vehicle, wherein the route is determined based on a status of one or more unit operation stations; and causes a vehicle to be propelled to progress along the determined route to create one or more of the demanded finished products, and delivers the finished products to an unloading station. It should be understood that these steps can be taking place in the above order, or in any order, provided that at least some demand for finished products to be made is first received. Generally, when there are multiple vehicles being routed, the control system can be performing such steps for the different vehicles. These vehicles may be at different stages of going through these steps at any given time (and the control system can be executing any of these steps for the various vehicles at any given time).

The status of the unit operation station(s) can comprise: (a) the state of readiness of a unit operation station (whether the unit operation station is broken down, or not); (b) one or more capabilities of the unit operation station (that is, a description of the unit operation(s)); (c) information concerning operations expected or scheduled to be completed at one or more unit operation stations in the future (including the progress of other vehicles along their routes); (d) information concerning the capacity utilization of the unit operation station (that is, how much of its capacity is used relative to its full capacity, or conversely how often it is idle relative to its full capacity); (e) information concerning the capacity utilization of other unit operation stations (utilization of other unit operation stations (similar or dissimilar)); (f) information concerning the availability of raw materials (e.g., fluent material(s), labels, etc.) to the unit operation station; and (g) information concerning expected maintenance activities involving the unit operation station.

The determined route may, in some cases, have one or more constraints on arriving at one or more unit operation stations before one or more other vehicles or after one or more other vehicles. In other cases, the determined route may not have any constraints on arriving at one or more unit operation stations before one or more other vehicles or after one or more other vehicles. The determined route is determined based on status information of a vehicle. Such status information may include: the vehicle's container-holding interface type, maximum velocity of the vehicle, maximum acceleration of the vehicle, maximum container weight that can be held by the vehicle, maximum container size, and any other relevant information about the vehicle. The determined route can be selected from a subset of all possible routes, and more particularly is selected from a set of all possible routes that will result in creating a demanded finished product. The determined route is selected by comparing potential routes where such comparison takes into account the utilization or capacity of one or more unit operation stations and the selected route may be selected to best utilize the capacity of one or more unit operation stations.

The determined route may take into consideration the routes assigned to other vehicles 24, including the extent to which the other vehicles have actually progressed along their planned routes, so as to avoid congestion caused by excessive vehicles reaching a similar location at a similar time, and so as to ensure vehicles will arrive in a desired sequence where appropriate.

The determined route may be determined using an algorithm (described as follows), where the algorithm may comprise a recursive method so as to be applicable to a wide range of track configurations and unit operation station configurations without requiring modifications to the algorithm's recursive method. The algorithm may implement a system where unit operation stations demand partially or completely finished products from other unit operation stations so as to enable the unit operation stations to contribute towards creating finished products specified in the step of receiving demand for finished products to be made. The demand from the unit operation stations may describe needed products and times when those products may be needed. (The loading unit operation stations will, however, typically receive demand for vehicles, rather than partially or completely finished products.) The demand from the unit operation stations makes it possible for the route-determining algorithm to only consider routes connecting unit operation stations with appropriate demand, substantially reducing the time and processing power required to determine a route as compared to an algorithm that would evaluate the merits of every possible way to route a vehicle along the track. Such an algorithm could solve the problem of determining a best route from many possible ways to route a vehicle along a track (100 billion, 1 trillion, or many more ways being possible in some embodiments) in a short period of time (e.g., less than one second), or a very short period of time (100 milliseconds, 50 milliseconds, 5 milliseconds, or less in some embodiments). Such an algorithm may take the form of several embodiments, some of which may also assign a quantity or priority to the demanded products at unit operation stations, and some of which may calculate such a priority based on attributes of an order. Such attributes of an order may comprise a selected shipping method or requested delivery time.

An example of the vehicle position controller 104, the product scheduling controller 106, and the track system controller 108 cooperating to create a finished product will now be described. First, when the vehicle 24 is empty (either due to system start-up or being emptied at the unloading station), the track system controller 108 can request, from the product scheduling controller 106, the next finished product to be assigned to the vehicle 24. The product scheduling controller 106 can assign a finished product to the vehicle 24 and can provide the desired route for the vehicle 24 to take to complete the finished product. The track system controller 108 can then provide coordinates to the vehicle position controller 104 that will route the vehicle 24 to one of the container loading stations 84. The vehicle position controller 104 then routes the vehicle 24 to the container loading station 84 (via the designated coordinates) and notifies the track system controller 108 when the vehicle 24 has reached its destination. The track system controller 108 can then facilitate operation of the container loading station 84. After the container 38 is loaded onto the vehicle 24, the track system controller 108 can provide coordinates to the vehicle position controller 104 that will route the vehicle 24 to one of the filling/capping stations 86. The vehicle position controller 104 then routes the vehicle 24 to the filling/capping station 86 (via the designated coordinates) and notifies the track system controller 108 when the vehicle 24 has reached its destination. The track system controller 108 can then facilitate operation of the filling/capping station 86. After the container 38 is filled and capped, the track system controller 108 can provide coordinates to the vehicle position controller 104 that will route the vehicle 24 to one of the decoration stations 88. The vehicle position controller 104 then routes the vehicle 24 to the decoration station 88 (via the designated coordinates) and notifies the track system controller 108 when the vehicle 24 has reached its destination. The track system controller 108 can then facilitate operation of the decoration station 88. After the container 38 is decorated, the track system controller 108 can provide coordinates to the vehicle position controller 104 that will route the vehicle 24 to one of unloading stations 90. The vehicle position controller 104 then routes the vehicle 24 to the unloading station 90 (via the designated coordinates) and notifies the track system controller 108 when the vehicle 24 has reached its destination. The track system controller 108 can then facilitate operation of the unloading station 90. After the container 38 is removed from the vehicle 24, the track system controller 108 can request, from the product scheduling controller 106, the next finished product to be assigned to the vehicle 24.

In some embodiments, the track system controller 108 can deviate the vehicle 24 from the desired path (assigned by the product scheduling controller 106) to overcome certain problems, such as a traffic jam, sequencing violation (sequencing is described below), and/or a defect or reject condition (e.g., bottle missing, cap missing, cap misaligned, etc.). The deviated path can be determined by the product scheduling controller 106 and/or the track system controller 108.

It is to be appreciated that the vehicle position controller 104, the product scheduling controller 106, and the track system controller 108 can facilitate simultaneous routing of the vehicles 24 around the track 22 such that the containers 38 are at various stages of production. To facilitate effective and efficient simultaneous routing of the vehicles 24, the vehicle position controller 104, the product scheduling controller 106, and the track system controller 108 can share information about the vehicles 24 and/or containers 38. For example, the track system controller 108 can share, with the product scheduling controller 106, the positions of the vehicles 24, the production status of each container 38, and/or any route deviations. The product scheduling controller 106 can share, with the track system controller 108, the finished product and route assignments for the vehicles 24.

As described above, the product scheduling controller 106 can assign a container type, a closure type, a fluent material type, a decoration type, and a route for each empty vehicle 24 identified by the track system controller 108. It is to be appreciated that although this embodiment describes assignment of a container type, a closure type, a fluent material type, and a decoration type, other embodiments may specify other finished product attributes. Other finished product attributes may include values related to the dimensions of a container or any part or parts thereof, values related to the mass of one or more parts of the product at one or more stages of completion including the finished product, fill quantity or level, or additional attributes similar to those previously or subsequently described such as a front label type and a back label type. Still more other finished product attributes may include targets or acceptable ranges of values for any one or more of the aforementioned finished product attributes or other finished product attributes. Furthermore, other finished product attributes may include parameters related to setup of unit operation stations to be used during operating on the finished product specified (for example, bottle height will dictate the height to which a filler nozzle will be adjusted).

Figure 12:
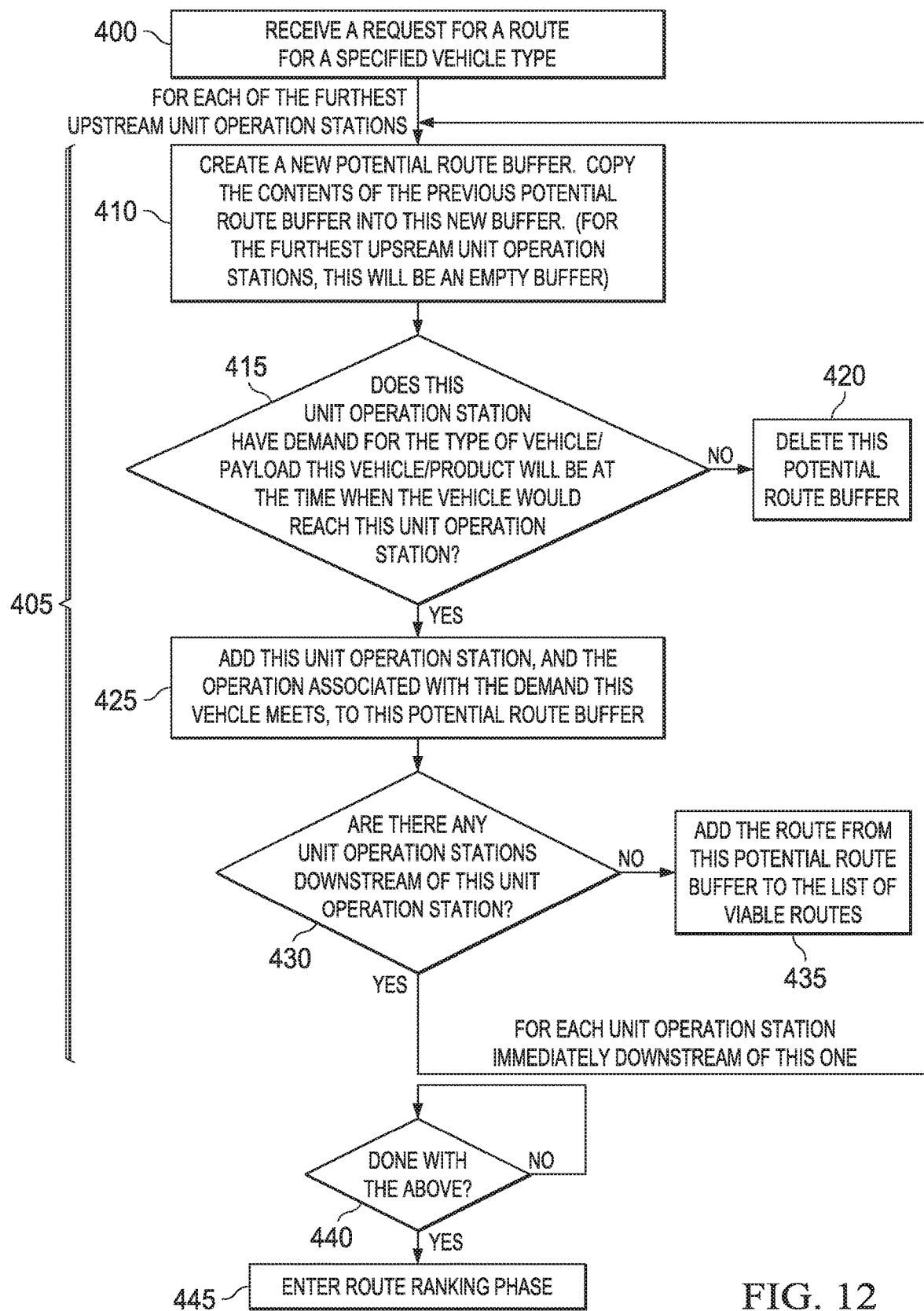
FIG. 12 is a flow chart depicting an Effective Route Identification Phase of the control routine implemented by the control system of FIG. 1, according to one embodiment.
Figure 13A:
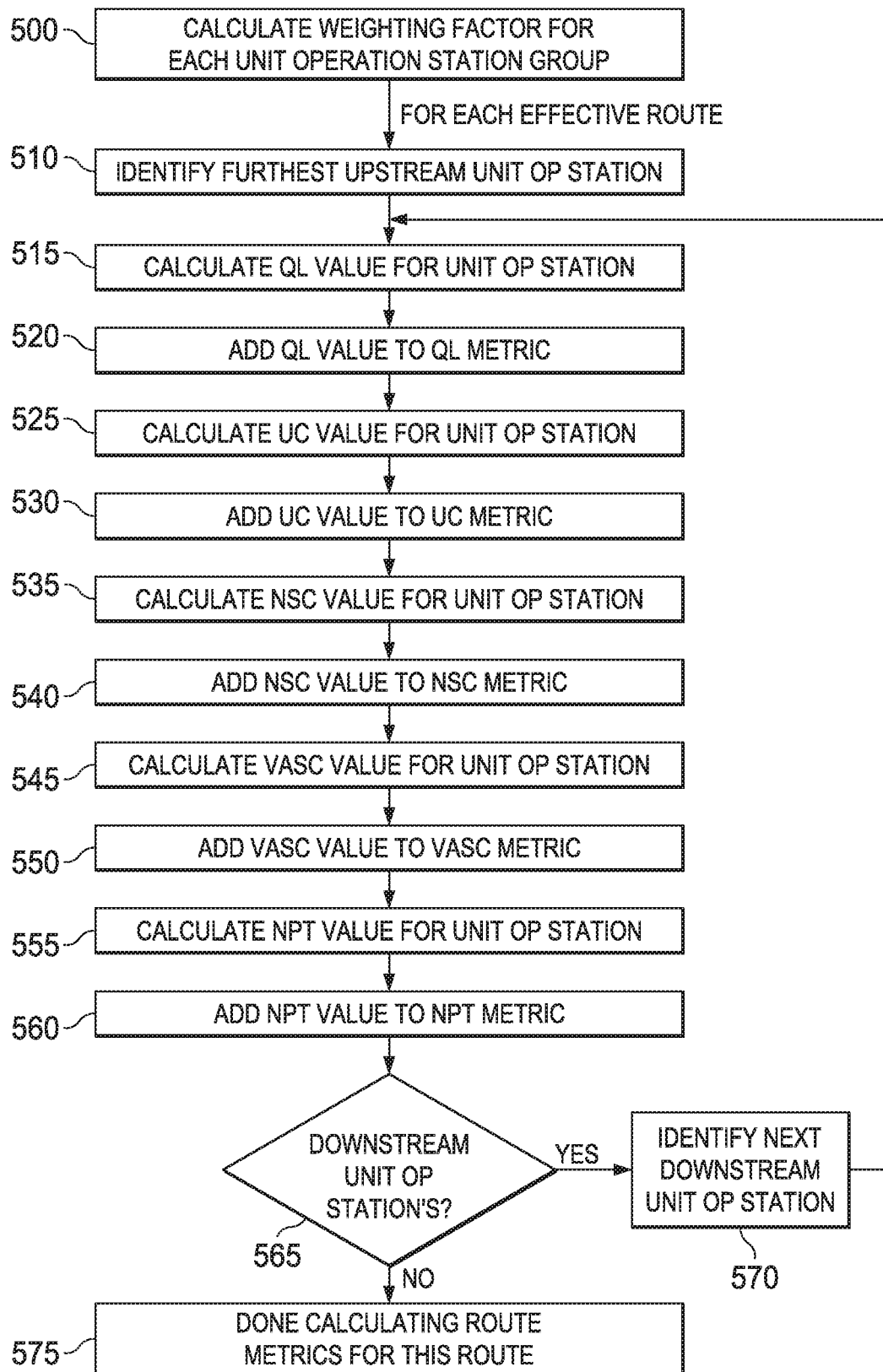
FIGS. 13A and 13B are flow charts depicting parts of a Route Ranking Phase of the control routine implemented by the control system of FIG. 1, according to one embodiment.
Figure 13B:
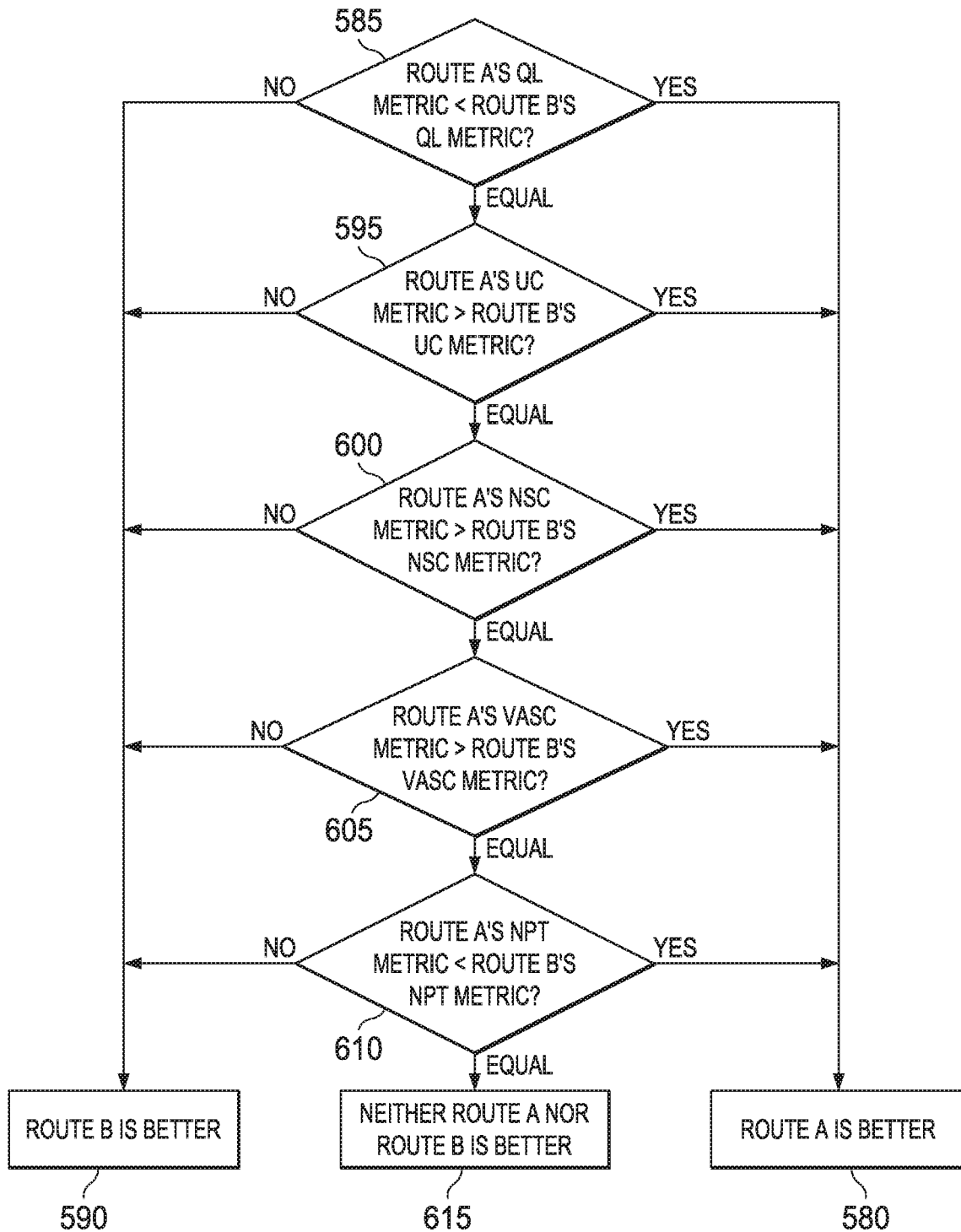

One embodiment of a control routine implemented by the product scheduling controller 106 in assigning a container type, a closure type, a fluent material type, a decoration type, and a route for each empty vehicle 24 is generally illustrated in FIGS. 10, 11, 12, 13A, and 13B which will now be discussed. The product scheduling process can be separated into four phases—a Sequencing Phase (FIG. 10), a Demand Propagation Phase (FIG. 11), an Effective Route Identification Phase (FIG. 12), and a Route Ranking Phase (FIGS. 13A and 13B). Generally, during the Sequencing Phase, production schedules can be assigned to each unloading station 90. During the Demand Propagation Phase, unit operation stations are identified that have or will have demand so as to contribute to one or more of the finished products specified by each unloading station's 90 production schedule. During the Effective Route Identification Phase, a plurality of effective routes for the current vehicle 24 are identified based on the unit operation stations' demand information. During the Route Ranking Phase, the best route and related finished product can be selected from the plurality of effective routes that are generated during the Effective Route Identification Phase.

Figure 10:
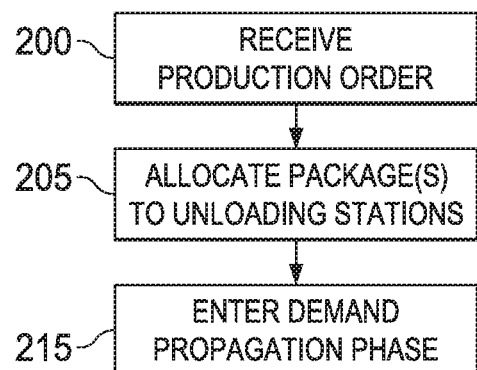
FIG. 10 is a flow chart depicting a Sequencing Phase of a control routine implemented by the control system of FIG. 1, according to one embodiment.
Figure 11:
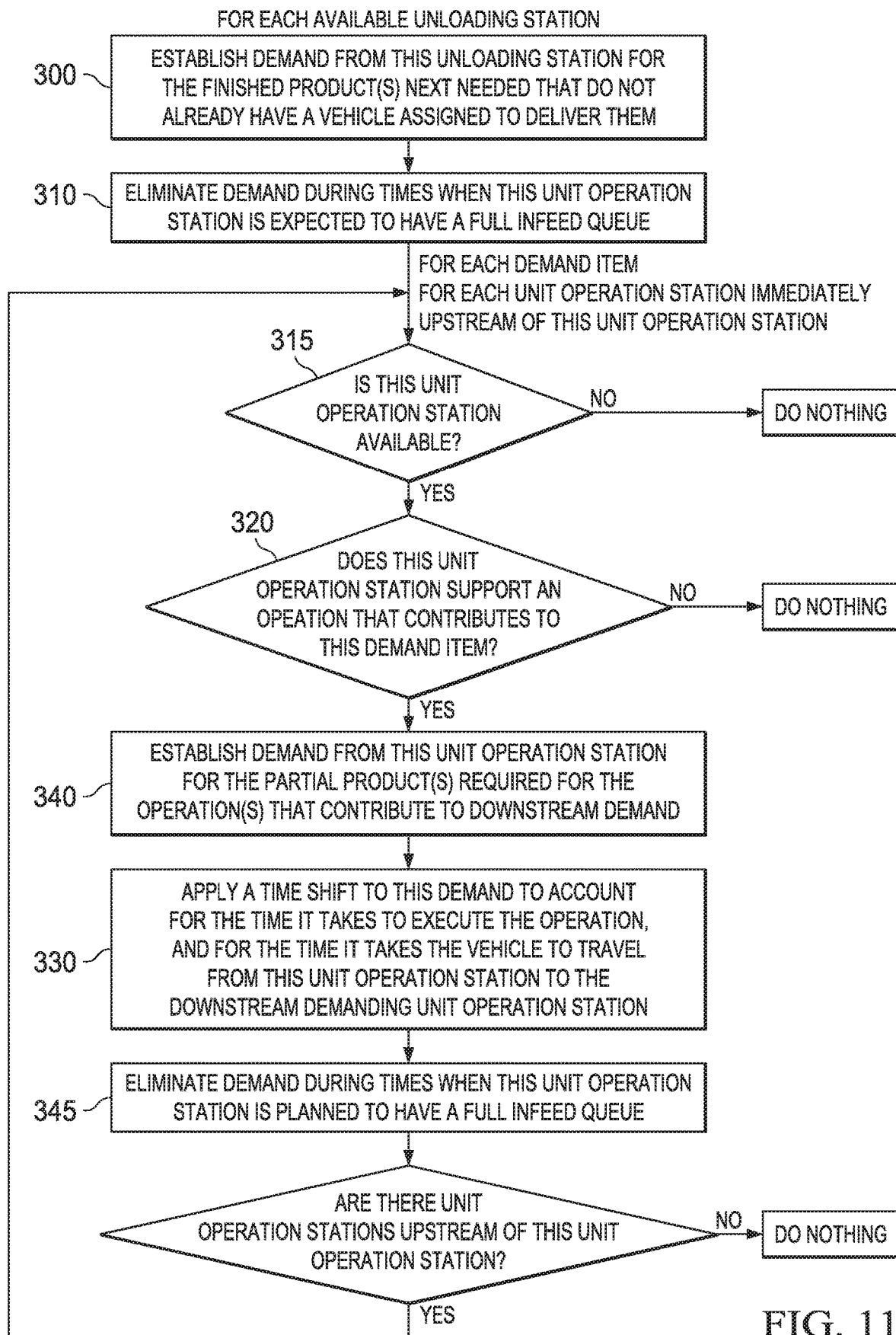
FIG. 11 is a flow chart depicting a Demand Propagation Phase of the control routine implemented by the control system of FIG. 1, according to one embodiment.

Referring now to FIG. 10, the Sequencing Phase will now be discussed in greater detail. First, a production order can be provided to the product scheduling controller 106 (step 200). The production order can include the quantity of packages that are desired and the types of finished products that are to be provided in each package. Further, the production order can be made in units larger than an individual package such as in units of cases or pallets. It is understood that a case or pallet may contain the same or different packages. The sequencing phase can sequence and prioritize the production of specific packages to support the overall production order. Prioritization may take into account the sequence of packages required to assemble a case or pallet. In addition, prioritization may take into account the urgency of each unit of larger order. Each package may include different types and/or quantities of finished products. In describing the types of finished products that are to be provided within a package, the production order may additionally specify sequencing information. This sequencing information may either specify an explicit sequence of arrival of products, or specify that the sequence of product arrivals for the package is unimportant, or specify a combination thereof in which for example one or more first products must arrive before one or more second products but in any sequence with respect to one or more third products. In one embodiment, the production order can be generated from a customer order that is received at an upstream computer system (e.g., from a procurement software program). The upstream computer system can convey the production order to the product scheduling controller 106 which can then allocate packages to the unloading stations 90 for fulfillment (205). Packages are assigned to an unloading station 90 in a specific sequence, thusly establishing a production schedule for each unloading station 90. This sequence specifies the order of production of packages at each unloading station 90, but does not specify the sequence of production of packages by the overall track system 20.

To further explain using a specific example, if a production order describes packages 1, 2, 3, 4, 5, and 6, packages may be assigned to a first unloading station 90 in the sequence of 2, 1, 5, and packages may be assigned to a second unloading station 90 in the sequence of 3, 6, 4, but the track system 20 may produce the packages in order 2, 1, 3, 5, 6, 4 or order 2, 3, 1, 6, 5, 4 or order 3, 6, 4, 2, 1, 5 or any other order that does not violate the package sequencing of a particular unloading station 90. It should be noted that in the previously described specific example, even though package production is described as a sequenced process, finished products feeding multiple packages can be produced simultaneously, such that more than one package is in the process of being produced at the same time, so the sequence described refers to the completion of the process of producing a package, and it is possible that more than one package may be completed at nearly the exact same moment in time.

Once at least one of the unloading stations 90 has been assigned a package, the track system controller 108 can select a vehicle 24 for assignment of a route and associated finished product thereto (the current vehicle). The vehicle 24 can be selected from among a plurality of vehicles 24 on the track 22 (e.g., when the track system 20 is first initialized/started up) or when the vehicle 24 has completed the previously assigned finished product (e.g., after leaving the unloading station 90). Most typically, the selected vehicle is empty. In some cases, however, a vehicle 24 may have aborted a previous route during route execution (e.g. because a unit operation station breaks down), so that vehicle 24 may be selected for assignment of a new route even though it is not empty. Once the vehicle 24 has been selected, the track system controller 108 can request, from the product scheduling controller 106, the route and associated finished product that is to be assigned to that vehicle 24. Each route request describes the type of vehicle and any operations that have already been completed on that vehicle on a previous route that included loading a container but did not include unloading the container.

The Demand Propagation Phase (215) will now be discussed in greater detail and with reference to FIG. 10 and the other drawing figures. In one embodiment, hereafter referred to as the Assignment-Time Calculated Demand Embodiment, the Demand Propagation Phase (215) is entered upon receiving the route request from the track system controller 108. In another embodiment, hereafter referred to as the Pre-Calculated Demand Embodiment, the Demand Propagation Phase (215) can be entered without waiting for a route request from the track system controller 108, so that a route can be assigned in response to a route request from the track system controller 108 in less time, because the Demand Propagation Phase (215) will have already been completed. This is possible because the Demand Propagation Phase (215) does not depend on having previously selected a vehicle 24 for route assignment. A disadvantage of the Pre-Calculated Demand Embodiment is that it may require more computing overall, since the Demand Propagation Phase (215) may be executed more times than needed. Although the events triggering the Assignment-Time Calculated Demand Embodiment and the Pre-Calculated Demand embodiment differ, the Demand Calculation process is the same and will next be described in greater detail.

First, the product scheduling controller 106 can identify all of the finished products that are needed next at each of the available (e.g. not broken down) unloading stations 90 to fulfill the unloading station's 90 production schedule in the order specified by the unloading station's 90 production schedule, and establishes demand items corresponding to these products (300). These demand items can be understood to describe the finished products that are currently assigned to each unloading station 90 and which can next be loaded into the package without interfering with the order of the overall package as defined by the production schedule, and where no vehicle 24 has already been assigned a route and associated finished product to thereby fulfill. The demand items may also be partially finished products that have completed one or more, but not all, of the steps in the process of creating the finished products, or empty vehicles (in the case of loading unit operation stations). Thusly, it can be understood that demand items 300 comprise descriptions of products which may be finished products or partially finished products.

Furthermore, each demand item also describes a time span. The time span described by each demand item specifies the time range during which such a product should arrive at the unit operation station, in this case the unit operation station being an unloading station 90. This time range ensures that the demand item does not describe a need for a product that would arrive earlier than a prerequisite product, nor later than a postrequisite product. Through additional processing to be described below, this time range can more generally be described as representing a time range when the arrival of the described product would not violate any system constraints.

Each demand item is furthermore associated with a particular unit operation station, such that it could be said that the unit operation station has one or more demand items, or that the unit operation station has no demand items. Each demand item is furthermore associated with a particular type of operation which would be performed at the associated unit operation station. Once the product scheduling controller 106 has completed establishing all appropriate demand items for each unloading station 90, the furthest downstream unit operation station group is selected for demand propagation, hereafter referred to as the Unit Operation Station Group Projecting Demand. The demand items associated with the Unit Operation Station Projecting Demand now undergo a refinement (310) so as to not include any time during which the previously scheduled vehicles 24 are expected to result in the Unit Operation Station Projecting Demand's infeed queue being at full capacity, wherein this refinement (310) may result in any of the following: no modification to the demand items; splitting demand items into two or more additional demand items wherein the additional demand items are identical to their original demand item in all but time span; shortening the associated time spans by adjusting one or both of the beginning or end times; or eliminating demand items altogether. Next, each of the demand items associated with each of the unit operation stations in the Unit Operation Station Group Projecting Demand is evaluated. The product scheduling controller 106 can then identify the furthest downstream unit operation station group that is upstream of the Unit Operation Station Group Projecting Demand (i.e., the unit operation stations a vehicle 24 might encounter immediately before proceeding to a unit operation station in the Unit Operation Station Group Projecting Demand), hereafter referred to as the Unit Operation Station Group Propagating Demand.

Each unit operation station group may also have associated therewith a representation of a non-existent unit operation station (a virtual unit operation station). Since not every container needs to receive a treatment at every unit operation station group, the virtual unit operation station is merely a mechanism in the computer program to allow the container to by-pass one or more unit operation station groups, or to not have a treatment performed by such unit operation station. For example, if the containers provided into the system comprise pre-labeled bottles, there will be no need for the container to be labeled at a decoration station.

In the example of FIG. 1, the furthest downstream unit operation station group that is upstream of the unloading stations 90 that have demand items can be the decoration stations 88. The product scheduling controller 106 can then select one unit operation station from the Unit Operation Station Group Propagating Demand, hereafter referred to as the Unit Operation Station Propagating Demand. The product scheduling controller 106 can then determine whether the Unit Operation Station Propagating Demand is currently available (315) or if it supports one or more operations that will establish one or more attributes of the product described by the demand item currently being evaluated (320). If the Unit Operation Station Propagating Demand is currently unavailable or if it does not support one or more operations that will establish one or more attributes of the product described by the demand item currently being evaluated, the evaluation of this demand item being processed by the Unit Operation Station Propagating Demand is complete. If the Unit Operation Propagating Demand is currently available and supports one or more operations that will establish one or more attributes of the product described by the demand item, the product scheduling controller 106 can calculate the time delay (330) which can be the time it takes for the Unit Operation Station Propagating Demand to complete its operation on the container (e.g., the operation time) in addition to the travel time from the Unit Operation Station Propagating Demand to a downstream interface point on primary transport portion 76 in addition to the travel time from an upstream interface point on primary transport portion 76 to the unit operation station associated with the demand item. Thusly, the time span specified by the demand item being evaluated having been offset by the above-described time delay (330) can be taken to mean the time range during which the operation can begin at the unit operation station.

The interface points are advantageous, because they reduce the number of required configurations that must be established and maintained by the product scheduling controller. Without the interface points, the product scheduling controller must store a configuration for expected travel time to move a vehicle from every unit operation station in a unit operation station group to every unit operation station in an adjacently downstream unit operation station group. For the track configuration shown in FIG. 1, considering only such configurations for unit operation stations 86, there being four unit operation stations 88 in the adjacently downstream unit operation station group, each of the four unit operation stations 86 would require four expected travel time configurations, totaling 16 expected travel time configurations. With interface points, the product scheduling controller only stores configurations for expected travel time to the next interface point, and from interface points to unit operation stations in the adjacently downstream unit operation station group. Thus, in the example of the unit operation stations 86, only eight configurations need to be stored, comprising four expected travel times to I3 (1 from each unit operation station 86) and four expected travel times from I3 (1 to each unit operation station 88). The benefits of using interface points are even greater on larger track systems. For example, if there were 100 unit operation stations 86 and 90 unit operation stations 88, there would be 9,000 configurations required without interface points, but only 190 configurations required with interface points.

A new demand item can then be created (340), where the new demand item is associated with the Unit Operation Station Propagating Demand, has a time span specified as the time span of the demand item being evaluated minus a time delay (330). The new demand item's described product is the product described by the demand item being evaluated minus the attribute or attributes established by the operation to be completed at the Unit Operation Station Propagating Demand. The new demand item's time span will then undergo a first refinement (345) so as to not include any time during which the previously scheduled vehicles 24 are expected to result in the Unit Operation Station Propagating Demand's infeed queue being at full capacity, wherein this first refinement (345) may result in any of the following: no modification to the new demand item; splitting the new demand item into two or more additional demand items wherein the additional demand items are identical to the new demand item in all but time span; shortening the time span by adjusting one or both of the beginning or end times; or eliminating the new demand item altogether.

This first refinement (345) and the refinement (310) are useful, because they accomplish avoiding demand during times when assigning a vehicle 24 to meet that demand would result in exceeding the capacity of the Unit Operation Station Propagating Demand's infeed queue. This could cause vehicles 24 to block portions or all of track section (secondary transport portion) 78 and/or portions or all of track section (primary transport portion) 76. Furthermore, this first refinement can similarly refine the time span of the new demand item so as to avoid demand during times when assigning a vehicle 24 to meet that demand would result in that vehicle 24 causing the Unit Operation Station Propagating Demand's infeed queue to exceed its capacity, wherein such a capacity violation would be caused either directly by the arrival of that vehicle 24 or indirectly by the cascading impact of previously scheduled but subsequently arriving other vehicles 24, and where such capacity is represented by a configuration parameter associated with the Unit Operation Station Propagating Demand.

Upon completion of the first refinement (345), the set of any remaining of the new demand item or additional demand items, hereafter collectively referred to as the Set of Remaining Demand Items, can be understood to represent time spans when beginning the operation on the described product would not violate any system constraints. The Set of Remaining Demand Items is again time shifted, this time to adjust according to previously scheduled vehicles 24 so that the resulting time spans represent time spans when arrival of the described product at the Unit Operation Station Propagating Demand's infeed queue would not violate any system constraints, thusly taking into account time when a vehicle 24 would be waiting in the Unit Operation Station Propagating Demand's infeed queue prior to beginning the operation, which can be known based on previously assigned routes to other vehicles 24 combined with vehicle 24 position information shared from the track system controller 108 with the product scheduling controller 106. This time shift applied to the Set of Remaining Demand Items marks the completion of the evaluation of this demand item being processed by the Unit Operation Station Propagating Demand.

When the evaluation of this demand item being processed by the Unit Operation Station Propagating Demand is complete (e.g. the Unit Operation Station Propagating Demand has been found to either be unsuitable for this demand item or else new demand items were created and refined), the product scheduling controller 106 can then proceed to evaluate this demand item being processed by each of the other unit operation stations in the Unit Operation Station Group Propagating Demand by the same process as was used to evaluate this demand item being processed by the Unit Operation Station Propagating demand.

When the evaluation of this demand item being processed by each of the unit operation stations in the Unit Operation Station Group Propagating Demand is complete, the product scheduling controller 106 proceeds to continue evaluating each demand item associated with the Unit Operation Station Projecting Demand being processed by each of the unit operation stations in the Unit Operation Station Group Propagating Demand.

When the evaluation of each demand item associated with the Unit Operation Station Projecting Demand by each of the unit operation stations in the Unit Operation Station Group Propagating Demand has been completed, the product scheduling controller 106 evaluates each of the demand items associated with each of the other unit operation stations in the Unit Operation Station Group Projecting Demand being processed by each of the unit operation stations in the Unit Operation Station Group Propagating Demand. When this is completed, demand propagation for the demand items associated with the unit operation stations in the Unit Operation Station Group Projecting Demand is complete, and new demand items may have been created that are associated with unit operation stations in the Unit Operation Station Group Propagating Demand. Next, the Demand Propagation Phase continues with the product scheduling controller 106 selecting the Unit Operation Station Group Propagating Demand as the Unit Operation Station Group Projecting Demand, and selecting the furthest downstream unit operation station group that is upstream of the Unit Operation Station Group Propagating Demand as the Unit Operation Station Group Propagating Demand, and similarly completing demand propagation for any demand items associated with the new Unit Operation Station Group Projecting Demand. This process repeats until the furthest upstream unit operation station group would be selected as the Unit Operation Station Group Projecting Demand, at which point the Demand Propagation Phase is complete.

In another embodiment of the Demand Propagation Phase, an additional demand aggregation step may be executed in between processing demand for each unit operation station group (e.g. each time a different unit operation station group is selected as the Unit Operation Station Group Projecting Demand). The demand aggregation step will examine the demand items associated with each unit operation station in the newly selected Unit Operation Station Group Projecting Demand, and, after accounting for differences in travel time from an upstream interface point, creates a set of new demand items based on this set of existing demand items, where the set of new demand items describes time periods when products arriving at the interface point would not violate any system constraints. In establishing the set of new demand items, duplicate time spans for similar products can be eliminated, and adjacent demand items can be merged, reducing the number of demand items to process. This is advantageous to reduce the processing time required to complete the Demand Propagation Phase. When such an additional demand aggregation step is used, the set of new demand items is projected to the Unit Operation Station Group Propagating Demand instead of the demand items associated with the Unit Operation Station Group Projecting Demand, and the calculated time delay 330 does not factor in the travel time from the interface point to the Unit Operation Station Projecting Demand, since this travel time was already accounted for.

In yet another embodiment of the Demand Propagation Phase, demand items may also specify a quantity of the described product. When these quantities are propagated with their associated demand items, additional demand information is available to the subsequent phases of the product scheduling process, which can help to better optimize production efficiency, and can be used to assign more than one route without executing the Demand Propagation Phase in between route assignments as would normally be required. This can be advantageous so as to reduce the amount of computing the product scheduling controller 106 must perform.

The Effective Route Identification Phase will now be discussed in greater detail with reference to FIG. 12. Upon receiving the route request 400 from the track system controller 108, the route request 400 including a description of the type of vehicle and state of assembly, the product scheduling controller 106 can enter the Effective Route Identification Phase. Firstly, if the Demand Propagation Phase has not already been completed as in the case of the pre-calculated demand embodiment, the Demand Propagation Phase is now completed. A projected route time is established as the time when the route request 400 was received by the product scheduling controller 106. A current product type is established as the vehicle and state of assembly described by the route request. For each unit operation station in the furthest upstream unit operation station group, the iterative route identification process 405 is completed.

The iterative route identification process 405 starts with the product scheduling controller 106 establishing a potential route buffer, and copying into it the contents of the previous potential route buffer if one exists 410. The iterative route identification 405 process continues with the product scheduling controller 106 modifying the projected route time by adding the time it takes to travel from an upstream interface point to the current unit operation station. The iterative route identification process continues with the product scheduling controller 106 determining if the current unit operation station has a demand item describing the current product type where the associated time span includes the projected route time 415, where such a demand item is hereafter referred to as the Relevant Demand Item. If a Relevant Demand Item does not exist, the potential route buffer is deleted 420 and no further action is taken by this instance of the iterative route identification process 405. If a Relevant Demand Item does exist, the iterative route identification process 405 continues by adding information describing the current unit operation station and the operation specified by the Relevant Demand Item to the potential route buffer 425.

If the current unit operation station is not part of the furthest downstream unit operation station group 430, a new instance of the iterative route identification process 405 is started for each unit operation station in the unit operation station group immediately downstream of the unit operation station group to which the current unit operation station belongs, where the new instances of the iterative route identification process 405 are provided with projected route times that have been amended to add the time a vehicle would spend waiting at the current unit operation station's infeed queue during execution of this route wherein this time is based on previously scheduled vehicles 24 and information shared from the track system controller 108, the time a vehicle would spend undergoing the operation specified by the Relevant Demand Item at the current unit operation station, and the travel time from the current unit operation station to a downstream interface point. Likewise, the new instances of the iterative route identification process are provided with this instance's potential route buffer to copy into their new potential route buffers. Likewise, the product type considered by the new instances of the iterative route identification process are taken to be the product type considered by this instance of the iterative route identification process, modified to include the one or more attributes established by the operation specified by the Relevant Demand Item. If the current unit operation station belongs to the furthest downstream unit operation station group, the potential route buffer is added to a list of effective routes 435, which completes this instance of the iterative route identification process 405.

Once each instance of the iterative route identification process 405 has completed, the list of effective routes comprises a list of all potential routes the vehicle 24 specified in the route request 400 may be assigned, which is to say the list of all potential routes that will deliver a product to a package specified by the production order without violating any system constraints. Once each instance of the iterative route identification process 405 has completed 440, the Effective Route Identification Phase is complete and the Route Ranking Phase begins 445. In one embodiment, the Effective Route Identification Phase would only continue as long as the number of routes in the list of effective routes is less than a specified number. This would have the effect of identifying no more than a specified number of routes, which can be beneficial to reduce the worst-case processing time for the Effective Route Identification Phase, although this embodiment does pose a risk of not identifying the best route as an effective route. The specified number of routes may be a fixed number, or a number calculated based on parameters related to processor utilization of the product scheduling controller 106.

The Route Ranking Phase will now be discussed in greater detail with reference to FIGS. 13A and 13B. The Route Ranking Phase comprises first undergoing the Route Metric Generation Sub-Phase and subsequently the Route Sorting Sub-Phase.

The Route Metric Generation Sub-Phase will now be discussed in greater detail. First, the product scheduling controller 106 can calculate a weighting factor (510) for each unit operation station group based on the utilization of each unit operation station within the unit operation station group, where unit operation station groups that have less unused capacity will yield larger weighting factor values. This weighting factor enables better production optimization because it allows calculations subsequently described to prioritize optimizing capacity utilization of the busiest unit operation stations.

For each route in the list of effective routes, the product scheduling controller 106 will perform the following calculations to identify a Queue Length (QL) metric, an Unused Unit Count (UC) metric, a Nearly Starved Unit Count (NSC) metric, a Vehicles Already Scheduled Count (VASC) metric, and a Non-Productive Time (NPT) metric. The QL metric is related to the sum of infeed queue lengths at each unit operation station along the current effective route at the time this vehicle 24 would arrive if this route is selected. The UC metric is related to the number of unit operation stations along the current effective route that will have been idle and starved for a specified period of time before this vehicle's 24 arrival if this route is selected. The NSC metric is related to the number of unit operation stations along the current effective route that will become idle if not for the selection and execution of this route by this vehicle 24. The VASC metric is related to the number of previously scheduled vehicles 24 scheduled to in the future arrive at the unit operation stations along the current effective route. The NPT metric is related to the time this vehicle 24 would spend travelling or waiting at unit operation station infeed queues along the current effective route. The product scheduling controller 106 can initially set to zero each of a QL metric, a UC metric, an NSC metric, a VASC metric, and an NPT metric.

For each unit operating station along the current effective route, the following calculations are performed to update the route's QL metric, UC metric, NSC metric, VASC metric, and NPT metric. The product scheduling controller 106 can calculate a QL value (515) by multiplying the weighting factor with the infeed queue length at the time the vehicle 24 is expected to arrive at the unit operation station. The QL value can be added to the QL metric (520). The product scheduling controller 106 can then calculate a UC value (525). If this unit operation station has no other vehicles 24 scheduled for operations during a specified period of time immediately preceding the expected arrival of this vehicle 24 at this unit operation station, the UC value is the weighting factor. Otherwise, the UC value is zero. The UC value can be added to the UC metric (530). The product scheduling controller 106 can then calculate a NSC value (535). If this unit operation station will become idle if not for the arrival of this vehicle and its ensuing associated operation, the NSC value is the weighting factor. Otherwise, the NSC value is zero. The NSC value can be added to the NSC metric (540). The product scheduling controller 106 can then calculate a VASC value (545) by multiplying the weighting factor with the number of previously scheduled vehicles 24 scheduled to in the future arrive at the unit operation station. The VASC value can be added to the VASC metric (550). The product scheduling controller 106 can then calculate an NPT value (555) by multiplying the weighting factor with the sum of: 1) the travel time from an upstream interface point on the primary transport portion 76 to this unit operation station, 2) the time the current vehicle is expected wait in the infeed queue of this unit operation station, and 3) the travel time from this unit operation station to a downstream interface point on the primary transport portion 76. The NPT value can be added to the NPT metric (560). When the QL metric, UC metric, NSC metric, VASC metric, and NPT metric have all been calculated for all routes in the list of effective routes, the Route Metric Generation Sub-Phase is complete and the product scheduling controller 106 begins the Route Sorting Sub-Phase.

Referring to FIG. 13B, the Route Sorting Sub-Phase will now be described in greater detail. The Route Sorting Sub-Phase will compare the metrics generated during the Route Metric Generation Sub-Phase to identify the best route for the current vehicle 24 from the list of effective routes identified in the Effective Route Identification Phase. Each route in the list of effective routes is compared to the other routes in the list of effective routes on the basis of the metrics generated during the Route Metric Generation Sub-Phase. A route with a smaller QL metric is a better route 585. If the QL metrics are identical, a route with a higher UC metric is a better route 595. If the QL and UC metrics are identical, a route with a higher NSC metric is a better route 600. If the QL, UC, and NSC metrics are identical, a route with a higher VASC metric is a better route 605. If the QL, UC, NSC, and VASC metrics are identical, a route with a lower NPT metric is a better route 610. If the QL, UC, NSC, VASC, and NPT metrics are identical, neither route is better than the other 615, so a route is arbitrarily selected.

Once the product scheduling controller 106 has identified the best route from the list of effective routes, the specifics of the route are communicated to the track system controller 108 so as to enable the track system controller 108 to cause the vehicle 24 to move as specified by the route and operate unit operation stations as specified by the route.

It is to be appreciated that, on some occasions, the list of effective routes 435 may be empty at the completion of the Effective Route Identification Phase. This may occur for numerous reasons, including but not limited to: there are no outstanding production orders; one or more unit operation stations required to contribute to a given product are not available or not existent; infeed queues are planned to be full at one or more unit operation stations at times when proposed routes would have a selected vehicle 24 arrive; there are otherwise no demand items resulting from the Demand Propagation phase associated with the unit operation stations of the furthest upstream unit operation station group; or the selected vehicle 24 is no compatible with any demand items associated with the unit operation stations of the furthest upstream unit operation station group. In such a situation, there is no effective route available to be assigned to the selected vehicle 24 at the present time. The product scheduling controller 106 and the track system controller 108 may be configured to handle a lack of effective routes in a variety of embodiments, some of which will now be discussed in greater detail, and which will hereafter be referred to as No Route Available Embodiments.

In a first No Route Available Embodiment, the product scheduling controller 106 may be configured to assign no route to the selected vehicle 24. In this first No Route Available Embodiment, the track system controller 108 having no route associated with the selected vehicle 24 will cause the vehicle 24 to remain stationary on the track indefinitely. In this first No Route Available Embodiment, the product scheduling controller may periodically re-execute one or more of the route assignment phases, either in a time-based manner, or based upon receiving repeated route requests from the track system controller 108. During such re-execution of one or more route assignment phases, one or more effective routes may be identified that were not identified during previous executions of one or more phases of the route assignment, due to a variety of reasons including but not limited to: a new production order was provided to the product scheduling controller 106, a unit operation station that was previously unavailable becomes available, or the progress or lack of progress of other vehicles 24 along their previously assigned routes has changed the expectation of the fullness of infeed queues of one or more unit operation station.

In a second No Route Available Embodiment, the product scheduling controller 106 may be configured to create a route comprised solely of executing no operations while visiting a virtual unit operation station of each unit operation station group. Such a route would be communicated to the track system controller 108 and would result in the track system controller 108 routing the vehicle to each virtual unit operation station before the vehicle 24 could again become eligible to be selected for route assignment. In a common example of this embodiment, the selected vehicle 24 would be routed along the primary transport portion in a continuously moving manner. In this way, unlike the first No Route Available Embodiment, the selected vehicle 24 would not continuously obstruct the movement of other vehicles 24, and thus would not continuously prevent the system from producing products when there are no effective routes available for a particular vehicle 24 at a particular time. In one variation of the second No Route Available Embodiment, the product scheduling controller 106 may be configured to create a route involving visiting only one or a subset of virtual unit operation stations. In this variation, the virtual unit operation station or virtual unit operation stations may exist only to support such route assignments in the event of there being no effective routes available, such that the virtual unit operation station or virtual unit operation stations do not belong to a unit operation station group and cannot be selected as part of an effective route. This variation is useful when it would be advantageous to define a specific route for all vehicles 24 when they are selected for route assignment, but no compatible effective routes exist. In either variation of the second No Route Available Embodiment, the route that is generated by the product scheduling controller 106 is hereafter referred to as a Bypass Route.

A third No Route Available Embodiment involves the product scheduling controller 106 being configured exactly as described in the second No Route Available Embodiment. In this third No Route Available Embodiment, the track scheduling controller 108 identifies whether a route assigned by the product scheduling controller 106 is an effective route or a Bypass Route. If the assigned route is a Bypass Route, the track system controller 108 will make a determination whether to direct the vehicle 24 as described by the specific Bypass Route, or whether to direct the vehicle 24 to a holding area. This determination may be made in a variety of ways, including but not limited to: there having been immediately previously assigned a specified number of consecutive routes that were all Bypass Routes, there having been assigned immediately previously assigned to other vehicles 24 similar to the selected vehicle 24 a specified number of consecutive routes that were all Bypass Routes, the availability of a holding area, or configuration parameters dictating the eligibility for the selected 24 or vehicles like the selected vehicle 24 for being routed to a holding area. If the track system controller 108 has determined that the selected vehicle 24 should be routed to a holding area, the track system controller 108 will next select a holding area. Eligible holding areas may include portions of track designated as holding areas, or sections of track serving unit operation stations that are currently not available. Using track sections associated with unavailable unit operation stations is advantageous to allow holding areas to be available on the track, without requiring the cost and physical space of installing dedicated holding areas. In the case of sections of track serving unit operation stations that are currently not available serving as holding area, there may be a configuration parameter in the track scheduling controller 108 associated with the unit operation station specifying a maximum number of vehicles that may be directed to that unit operation station when the associated track section is being used as a holding area. In this way, if the associated configuration parameter is set to 0, a unit operation station may be configured to be ineligible to act as a holding area, even when the unit operation station is unavailable. When a vehicle 24 is directed to a holding area by the track scheduling controller 108, the track scheduling controller 108 will direct the vehicle 24 to leave the holding area after a specified amount of time so that it may again become eligible for selection to be assigned a route. Such specified amount of time may be a fixed time, a fixed time dependant on the vehicle 24 or a configuration for vehicles similar to the particular vehicle 24, a fixed time related to the selected holding area, a calculated time based on how many immediately previously assigned routes were Bypass Routes, a calculated time based on how many immediately previously assigned routes to vehicles similar to the specific vehicle 24 were Bypass Routes, determined by other means, or a combination thereof. In one particularly advantageous application of the third No Route Available Embodiment, the specified time is calculated so as to increase with each consecutive Bypass Route assigned to vehicles similar to the selected vehicle 24. For example, a first vehicle 24 assigned a Bypass Route may be directed to a holding area for 30 seconds, a second vehicle 24 similar to the first vehicle 24 assigned a Bypass Route may be directed to a holding area for 60 seconds, a third vehicle 24 similar to the first vehicle 24 assigned a Bypass Route may be directed to a holding area for 90 seconds, and so forth, up to a maximum of 300 seconds. This particularly advantageous application allows the track to be self-optimizing in its use of vehicles, particularly when there are different types of vehicles 24 on the same track. For example, if vehicles of a specific type are not useful to produce the products described by currently outstanding production orders, those vehicles will automatically be directed to a holding area without operator intervention. This is advantageous to significantly reduce the extent to which vehicles 24 that are not currently engaged in producing a product obstruct vehicles that are engaged in producing products. Furthermore, in the same example, if a new production order would make use of the previously non-productive vehicles, the vehicles will automatically become eligible for route assignment within minutes, again without requiring operator intervention.

Numerous alternative embodiments of the Route Sorting Sub-Phase are possible. One alternative embodiment of the Route Sorting Sub-Phase could compute an overall route score for each route as the sum of the products of some or all of the QL, UC, NSC, VASC, and NPT metrics and a weighting factor for each metric. This embodiment would take each metric into account to degrees alterable by modifying the weighting factor associated with each metric.

So as to determine the best route for each vehicle, the route determination may consider configurations for expected time required to travel along the track or expected time required to complete operations. When the track system controller observes completion of a vehicle's movement along a portion of the track, it may automatically cause an update to a configuration for expected time required to travel along that portion of the track, or a configuration associated with the degree of variability in said time, for example a standard deviation of a set of said times observed in the past. Likewise, when the track system controller observes completion of an operation, it may automatically cause an update to a configuration for the expected time required for that operation as that unit operation station, or a configuration associated with the degree of variability in said time, for example a standard deviation of a set of said times observed in the past. In this manner, the determination of a route can be self-optimizing, such that the route determination step becomes more effective with each use without requiring manual effort, and adapts to changes in track performance or unit operation station performance without manual effort.

In some embodiments, the ongoing application of the invention described herein may necessitate performing periodic maintenance tasks on the vehicles 24, or components situated thereon or otherwise coupled thereto. Such maintenance tasks may include, but not be limited to, inspecting components for damage, verifying all required components are present, cleaning components, testing seals for leaks, and the like. To alleviate the burden of manually tracking when each vehicle is due for different types of maintenance tasks, the track scheduling controller 108 may be configured with parameters describing maintenance tasks. The parameters may comprise a description of the task, location where the task is to be performed, and a frequency at which the task must be conducted on each vehicle. The frequency may be described as a time, a distance of travel for the vehicle, a number of products produced by the vehicle, or another metric or calculation, or a combination thereof. The parameters may furthermore specify which types of vehicles 24 the task is applicable to. Using such parameters, after the track scheduling controller 108 selects a vehicle to be assigned a route, the track scheduling controller 108 may be configured to determine if one or more maintenance tasks are due for the selected vehicle 24 before requesting a route from the product scheduling controller 106. If the track scheduling controller 108 is thusly configured and determines that the selected vehicle 24 is currently due for one or more maintenance tasks, the track scheduling controller may direct the vehicle 24 to the appropriate location so as to have the maintenance performed, rather than requesting a route assignment for the vehicle from the product scheduling controller. Upon the arrival of a vehicle 24 at a location specified for maintenance, the track scheduling controller 108 may indicate to an operator or automated equipment the nature of the maintenance task or tasks to be performed on this vehicle. In this way, an automated system to schedule time, distance, or condition-based maintenance on vehicles may be simply implemented.

In other embodiments, it may be desirable to have the priority of production based on the desired date of delivery of the finished product to a customer or consumer.

Test Methods

The degree of mixing achieved by in situ mixing methods, or other mixing methods, can be determined by a digital image processing method and device for holistic evaluation of subtle irregularities in a digital image of a non-homogeneously mixed liquid product as described in PCT Patent Application Ser. No. CN2017/087539 (P&G Case AA 1232F). This method comprises the following steps:

1. Extracting an area of interest from a digital image to be analyzed by excluding background areas. Specifically, when the digital image is the image of a transparent or translucent bottle that is partially filled by a liquid mixture, only the section containing the liquid mixture should be extracted, while the background areas outside of the bottle as well as the section of the bottle that does not contain the liquid mixture need to be excluded.

2. Conducting scale space analysis of the extracted area of interest to detect points of interest, i.e., extrema that each represents a local maximum or minimum, and to provide at least an intensity value and a size or scale for each point of interest. In the context of liquid mixtures, any of such points of interest with a sufficiently high intensity and/or a sufficiently large size is indicative of a significant local irregularity, i.e., evidence of poor mixing. Therefore, by selecting extrema having intensities and/or scales that are above a minimal threshold value, areas of significant local irregularities indicative of poor mixing can be readily and effectively detected.

3. Calculating a total irregularity score by summing up contributions from all local irregularities so detected. In the context of liquid mixtures, such a total irregularity score functions as a single quantitative measure for how good the mixing is, irrespective of color and luminosity variations in the liquid mixtures. This single quantitative measure allows objective comparison across liquid mixtures of different colors under very different luminosity conditions.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

The dimensions and/or values disclosed herein are not to be understood as being strictly limited to the exact numerical dimensions and/or values recited. Instead, unless otherwise specified, each such dimension and/or value is intended to mean the recited dimension and/or value and a functionally equivalent range surrounding that dimension and/or value. For example, a dimension disclosed as "40 mm" is intended to mean "about 40 mm".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for producing products based on demand data, said system comprising:
   a plurality of vehicles for articles;
   a track system comprising a track on which article-loaded vehicles are propellable;
   a plurality of unit operation stations disposed along the track system and configured to cooperate to create at least one finished product;
   wherein each article is disposed on a vehicle and the plurality of vehicles are independently routable along the track system to deliver at least some of the articles to at least one unit operation station;
   a control system comprising one or more controller units which are in communication with said track system and said unit operation stations, and which control system:
   receives demand for finished products to be made;
   determines a route for a vehicle, where said route is determined based on a status of one or more unit operation stations; and
   causes a vehicle to be propelled to progress along said determined route so as to create one or more of said demanded finished products and delivers said one or more finished products to an unloading station;
   wherein the demanded finished products comprise a description of packages, wherein each package may comprise a unique set of finished products,
   wherein the status of the one or more unit operation stations comprises information concerning the capacity utilization of the unit operation station and wherein the capacity can be based on a size of an infeed queue and information concerning progress of other vehicles along routes.

2. The system of claim 1 wherein the status of the one or more unit operation stations comprises a state of readiness of a unit operation station.

3. The system of claim 1 wherein the status of the one or more unit operation stations comprises one or more capabilities of the unit operation station.

4. The system of claim 3 wherein the capabilities comprise a plurality of operations that can be performed by the unit operation station.

5. The system of claim 1 wherein the status of the one or more unit operation stations comprises information concerning operations expected to be completed at one or more unit operation stations in the future.

6. The system of claim 5 wherein the information reflects progress of other vehicles along routes.

7. The system of claim 1 wherein the status of the one or more unit operation stations comprises information concerning the capacity of other unit operation stations.

8. The system of claim 1 wherein the status of the one or more unit operation stations comprises information concerning availability of raw materials to the unit operation station.

9. The system of claim 1 wherein the status of the one or more unit operation stations comprises information concerning expected maintenance activities involving the unit operation station.

10. The system of claim 1 wherein the control system establishes a sequence in which said demanded finished products will be created.

11. The system of claim 1 wherein the determined route is determined based on one or more constraints on arriving at one or more unit operation stations before one or more other vehicles or after one or more other vehicles.

12. The system of claim 1 wherein the determined route is determined based on status information of a vehicle, wherein such status information is selected from the following information: container-holding interface type, maximum vehicle velocity, maximum vehicle acceleration, maximum container weight, and maximum container size.

13. The system of claim 1 wherein the description of a package further comprises information concerning the sequence of unloading of the finished products.

14. The system of claim 1 wherein the determined route is selected from a subset of all possible routes.

15. The system of claim 1 wherein the determined route is selected from a set of all possible routes that will result in creating a demanded finished product.

16. The system of claim 1 wherein the demand for finished products comprises demand for a first finished product and a second finished product, wherein the product to be produced is a fluent product within a container, and wherein the first finished product differs from the second finished product in one or more of: container volume, container shape, container size, contained material volume or mass, contained material composition, decoration, label or label contents, closure type, closure color, closure composition, container composition, container color, or other finished product attribute.

17. The system of claim 1 wherein the determined route is selected by comparing potential routes where such comparison takes into account the utilization or capacity of one or more unit operation stations and the selected route is selected so as to best utilize the capacity of one or more unit operation stations.

18. The system of claim 1 wherein the step of determining a route for a vehicle comprises a recursive method.

19. The system of claim 1 wherein the control system is self-optimizing.

20. The system of claim 1 wherein the step of determining a route for the vehicle takes less than 1 second to complete.

21. The system of claim 1 wherein the step of determining a route for the vehicle considers partially finished products demanded from unit operation stations.

22. The system of claim 21 wherein the partially finished products demanded are assigned a time span.

23. The system of claim 21 wherein the partially finished products demanded are assigned a priority.

24. The system of claim 21 wherein the partially finished products demanded are assigned a quantity.

25. A system for producing products based on demand data, said system comprising:
a plurality of vehicles for articles;
a track system comprising a track on which article-loaded vehicles are propellable;
a plurality of unit operation stations disposed along the track system and configured to cooperate to create at least one finished product;
wherein each article is disposed on a vehicle and the plurality of vehicles are independently routable along the track system to deliver at least some of the articles to at least one unit operation station;
a control system comprising one or more controller units which are in communication with said track system and said unit operation stations, and which control system:
receives demand for finished products to be made;
determines a route for a vehicle, where said route is determined based on a status of one or more unit operation stations; and
causes a vehicle to be propelled to progress along said determined route so as to create one or more of said demanded finished products and delivers said one or more finished products to an unloading station;
wherein the demanded finished products comprise a description of packages, wherein each package may comprise a unique set of finished products and wherein the status of the one or more unit operation stations comprises information concerning availability of raw materials to the unit operation station.

26. The system of claim 25 wherein the status of the one or more unit operation stations comprises a state of readiness of a unit operation station.

27. The system of claim 25 wherein the status of the one or more unit operation stations comprises one or more capabilities of the unit operation station.

28. The system of claim 27 wherein the capabilities comprise a plurality of operations that can be performed by the unit operation station.

29. The system of claim 25 wherein the status of the one or more unit operation stations comprises information concerning operations expected to be completed at one or more unit operation stations in the future.

30. The system of claim 29 wherein the information reflects progress of other vehicles along routes.

31. The system of claim 25 wherein the status of the one or more unit operation stations comprises information concerning the capacity utilization of the unit operation station.

32. The system of claim 31 wherein the capacity can be based on a size of an infeed queue and information concerning progress of other vehicles along routes.

33. The system of claim 25 wherein the status of the one or more unit operation stations comprises information concerning the capacity of other unit operation stations.

34. The system of claim 25 wherein the status of the one or more unit operation stations comprises information concerning expected maintenance activities involving the unit operation station.

35. The system of claim 25 wherein the control system establishes a sequence in which said demanded finished products will be created.

36. The system of claim 25 wherein the determined route is determined based on one or more constraints on arriving at one or more unit operation stations before one or more other vehicles or after one or more other vehicles.

37. The system of claim 25 wherein the determined route is determined based on status information of a vehicle, wherein such status information is selected from the following information: container-holding interface type, maximum vehicle velocity, maximum vehicle acceleration, maximum container weight, and maximum container size.

38. A system for producing products based on demand data, said system comprising:
a plurality of vehicles for articles;
a track system comprising a track on which article-loaded vehicles are propellable;
a plurality of unit operation stations disposed along the track system and configured to cooperate to create at least one finished product;
wherein each article is disposed on a vehicle and the plurality of vehicles are independently routable along the track system to deliver at least some of the articles to at least one unit operation station;
a control system comprising one or more controller units which are in communication with said track system and said unit operation stations, and which control system:
receives demand for finished products to be made;
determines a route for a vehicle, where said route is determined based on a status of one or more unit operation stations; and
causes a vehicle to be propelled to progress along said determined route so as to create one or more of said demanded finished products and delivers said one or more finished products to an unloading station;
wherein the demanded finished products comprise a description of packages, wherein each package may comprise a unique set of finished products, and wherein the status of the one or more unit operation stations comprises information concerning expected maintenance activities involving the unit operation station.

39. A system for producing products based on demand data, said system comprising:
a plurality of vehicles for articles;
a track system comprising a track on which article-loaded vehicles are propellable;
a plurality of unit operation stations disposed along the track system and configured to cooperate to create at least one finished product;
wherein each article is disposed on a vehicle and the plurality of vehicles are independently routable along the track system to deliver at least some of the articles to at least one unit operation station;
a control system comprising one or more controller units which are in communication with said track system and said unit operation stations, and which control system:
receives demand for finished products to be made;
determines a route for a vehicle, where said route is determined based on a status of one or more unit operation stations; and
causes a vehicle to be propelled to progress along said determined route so as to create one or more of said demanded finished products and delivers said one or more finished products to an unloading station;

wherein the demanded finished products comprise a description of packages, wherein each package may comprise a unique set of finished products, and wherein the determined route is determined based on status information of a vehicle, wherein such status information is selected from the following information: container-holding interface type, maximum vehicle velocity, maximum vehicle acceleration, maximum container weight, and maximum container size.

40. The system of claim 39 wherein the status of the one or more unit operation stations comprises a state of readiness of a unit operation station.

41. The system of claim 39 wherein the status of the one or more unit operation stations comprises one or more capabilities of the unit operation station.

42. The system of claim 41 wherein the capabilities comprise a plurality of operations that can be performed by the unit operation station.

43. The system of claim 39 wherein the status of the one or more unit operation stations comprises information concerning operations expected to be completed at one or more unit operation stations in the future.

44. The system of claim 43 wherein the information reflects progress of other vehicles along routes.

45. The system of claim 39 wherein the status of the one or more unit operation stations comprises information concerning the capacity utilization of the unit operation station.

46. The system of claim 45 wherein the capacity can be based on a size of an infeed queue and information concerning progress of other vehicles along routes.

47. The system of claim 39 wherein the status of the one or more unit operation stations comprises information concerning the capacity of other unit operation stations.

* * * * *